(12) United States Patent
Yahata et al.

(10) Patent No.: US 8,170,400 B2
(45) Date of Patent: May 1, 2012

(54) INFORMATION RECORDING MEDIUM, AND MULTIPLEXING DEVICE

(75) Inventors: Hiroshi Yahata, Oaska (JP); Tomoyuki Okada, Nara (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1123 days.

(21) Appl. No.: 11/660,394

(22) PCT Filed: Aug. 17, 2005

(86) PCT No.: PCT/JP2005/014981
§ 371 (c)(1),
(2), (4) Date: Feb. 16, 2007

(87) PCT Pub. No.: WO2006/019103
PCT Pub. Date: Feb. 23, 2006

(65) Prior Publication Data
US 2007/0242577 A1    Oct. 18, 2007

(30) Foreign Application Priority Data

| Aug. 17, 2004 | (JP) | 2004-237160 |
| Sep. 29, 2004 | (JP) | 2004-283896 |
| Sep. 29, 2004 | (JP) | 2004-283897 |

(51) Int. Cl.
*H04N 5/917* (2006.01)
(52) U.S. Cl. ........................................ 386/328
(58) Field of Classification Search ............... None
See application file for complete search history.

(56) References Cited

U.S. PATENT DOCUMENTS 5,729,649 A    3/1998  Lane et al.
5,805,762 A    9/1998  Boyce et al.
5,881,203 A    3/1999  Fujinami et al.
(Continued)

FOREIGN PATENT DOCUMENTS
CN    1259735    7/2000
(Continued)

OTHER PUBLICATIONS

English Translation of Detailed Description for Japanese Application Publication 2003-502704.*

(Continued)

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

The present invention provides an information recording medium in which an access unit including basic data and extension data is recorded, so as to allow a decoder that decodes only basic data to process the access unit which includes the basic data and the extension data for the next generation.

The information recording medium is an information recording medium on which a stream including plural TS packets is recorded, and includes a first access unit which has a first packet that includes basic data as well as a second packet which includes extension data related to the basic data, the basic data being data that can be decoded in a completed state without using the extension data and the extension data being data for improving the quality of data generated from the basic data; wherein the first packet and the second packet are assigned with time stamps indicating relative times at which the first packet and the second packet are respectively inputted to buffers, so that a buffer model of a first decoder does not fail and a buffer model of a second decoder does not fail, the first decoder decoding only the basic data, and the second decoder decoding the basic data and the extension data.

7 Claims, 46 Drawing Sheets

U.S. PATENT DOCUMENTS

| | | |
|---|---|---|
| 5,956,088 A | 9/1999 | Shen et al. |
| 6,088,506 A | 7/2000 | Yoshio et al. |
| 6,167,192 A | 12/2000 | Heo |
| 6,222,983 B1 | 4/2001 | Heo |
| 6,226,616 B1 | 5/2001 | You et al. |
| 6,473,561 B1 | 10/2002 | Heo |
| 6,560,403 B1 | 5/2003 | Tanaka et al. |
| 6,996,327 B1 | 2/2006 | Park et al. |
| 6,999,827 B1 | 2/2006 | Yong |
| 7,386,223 B2 | 6/2008 | Yagi et al. |
| 7,409,627 B2 | 8/2008 | Kim et al. |
| 7,480,441 B2 | 1/2009 | Klausberger et al. |
| 7,581,019 B1 * | 8/2009 | Amir et al. .......... 709/235 |
| 7,680,814 B2 | 3/2010 | Mercer et al. |
| 7,908,639 B2 | 3/2011 | Hamada et al. |
| 2002/0034248 A1 | 3/2002 | Chen |
| 2003/0014768 A1 | 1/2003 | Ishihara et al. |
| 2003/0058560 A1 * | 3/2003 | Yamaji ............... 360/39 |
| 2003/0072384 A1 * | 4/2003 | Chen et al. ............. 375/295 |
| 2003/0169368 A1 | 9/2003 | Hamada et al. |
| 2003/0204668 A1 * | 10/2003 | Wilcox et al. .......... 711/105 |
| 2004/0062530 A1 | 4/2004 | Tsumagari et al. |
| 2004/0184764 A1 | 9/2004 | Yagi et al. |
| 2004/0221143 A1 | 11/2004 | Wise et al. |
| 2004/0240856 A1 | 12/2004 | Yahata et al. |
| 2005/0013583 A1 | 1/2005 | Itoh |
| 2005/0185937 A1 | 8/2005 | Comer et al. |
| 2005/0220441 A1 | 10/2005 | Comer et al. |
| 2005/0271068 A1 | 12/2005 | Hetzel et al. |
| 2006/0056520 A1 | 3/2006 | Comer et al. |
| 2006/0123450 A1 | 6/2006 | Wei et al. |
| 2007/0030893 A1 | 2/2007 | Chen |
| 2007/0143784 A1 | 6/2007 | Kubota et al. |
| 2007/0242577 A1 | 10/2007 | Yahata et al. |
| 2007/0271492 A1 | 11/2007 | Yahata et al. |
| 2008/0180677 A1 | 7/2008 | Gordley |
| 2008/0273702 A1 | 11/2008 | Foster et al. |
| 2009/0010614 A1 | 1/2009 | Yahata et al. |
| 2009/0010621 A1 * | 1/2009 | Yahata et al. ........... 386/126 |
| 2009/0285282 A1 * | 11/2009 | Amir et al. ............ 375/240.02 |
| 2010/0105865 A1 | 4/2010 | Telford et al. |

FOREIGN PATENT DOCUMENTS

| | | |
|---|---|---|
| EP | 0 737 975 | 10/1996 |
| EP | 0 800 174 | 10/1997 |
| EP | 0 869 496 | 10/1998 |
| EP | 0 883 125 | 12/1998 |
| EP | 0 993 193 | 4/2000 |
| JP | 8-339637 | 12/1996 |
| JP | 9-102932 | 4/1997 |
| JP | 9-282848 | 10/1997 |
| JP | 10-275420 | 10/1998 |
| JP | 11-134812 | 5/1999 |
| JP | 11-306666 | 11/1999 |
| JP | 11-345457 | 12/1999 |
| JP | 2000-115787 | 4/2000 |
| JP | 2002-344889 | 11/2002 |
| JP | 2003-032598 | 1/2003 |
| JP | 2003-502704 | 1/2003 |
| JP | 2003-518354 | 6/2003 |
| JP | 2003-228922 | 8/2003 |
| JP | 4481991 | 6/2010 |
| KR | 2002-27364 | 4/2002 |
| TW | 200301061 | 6/2003 |
| WO | 00/79520 | 12/2000 |
| WO | 01/46954 | 6/2001 |
| WO | 02/23914 | 3/2002 |
| WO | 03/047250 | 6/2003 |
| WO | 2004/008747 | 1/2004 |
| WO | 2004/059645 | 7/2004 |
| WO | 2006/019106 | 2/2006 |

OTHER PUBLICATIONS

U.S. Office Action issued Aug. 23, 2010 in related U.S. Appl. No. 11/659,959.

European Search Report issued May 18, 2010 in corresponding European Application No. 05772771.1.

European Search Report issued May 18, 2010 in corresponding European Application No. 05772763.8.

European Search Report issued May 18, 2010 in corresponding European Application No. 05772736.4.

European Search Report issued May 28, 2010 in corresponding European Application No. 05772769.5.

"Information technology-Generic coding of moving pictures and associated audio information: Systems; H.222.0 Amendment 2(06/03); Support of IPMP on MPEG-2 systems", ITU-T Standard in Force (I), International Telecommunication Union, Geneva, CH, No. H.222.0 Amendment 2, Jun. 29, 2003, XP017401305.

Herpel C et al: "MPEG-4 Systems: Elementary Stream Management" Signal Processing. Image Communication, Elsevier Science Publishers, Amsterd, NL, vol. 15, Jan. 1, 2000, pp. 299-320, XP000885367, ISSN: 0923-5965.

Schroeder E F et al: "DER MPEG-2-Standard: Generische Godierung Fuer Bewegtbilder Und Zugehoerige Audio-Information. Audio-Codierung (TE1L4)" FKT Fernseh Und Kinotechnik, Fachverlag Schiele 7 Schon GMBH., Berlin, DE, vol. 48, No. 7/08, Aug. 30, 1994, pp. 364-368, 370, XP000460964, ISSN: 1430-9947 (with English translation).

European Search Report issued May 31, 2010 in corresponding European Application No. 05772735.6.

U.S. Office Action issued in U.S. Appl. No. 11/659,036 dated Mar. 11, 2010.

Office Action issued Jan. 12, 2011 in U.S. Appl. No. 11/659,038.
Office Action issued Feb. 18, 2011 in U.S. Appl. No. 11/659,022.
Office Action issued Oct. 19, 2011 in U.S. Appl. No. 11/659,038.
Office Action issued Jun. 23, 2011 in U.S. Appl. No. 11/659,022.
Office Action issued May 25, 2011 in U.S. Appl. No. 11/659,038.
Office Action issued Jan. 13, 2012 in U.S. Appl. No. 11/659,022.

* cited by examiner

FIG. 12
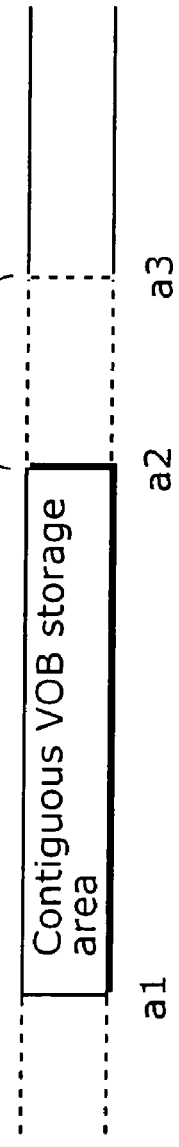
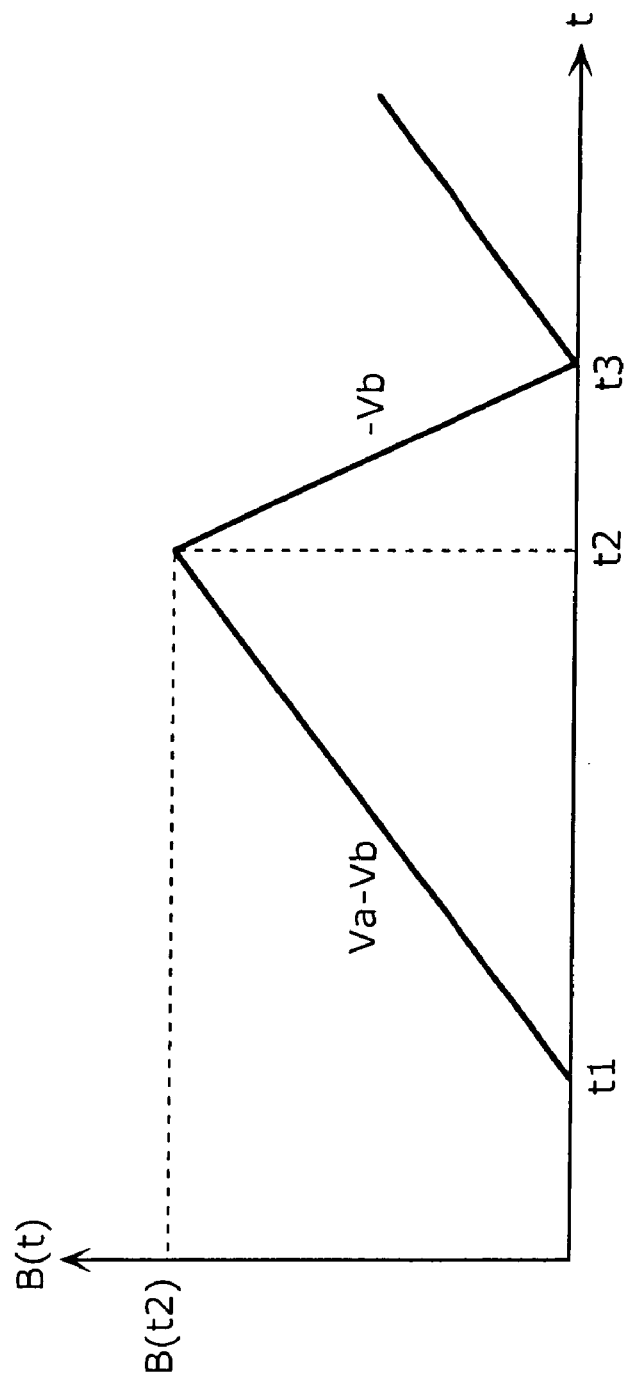

FIG. 24    Player variable (System parameter)

| 0 | Language Code | 11 | Player audio mixing mode for Karaoke | 22 | reserved |
|---|---|---|---|---|---|
| 1 | Audio stream number | 12 | Country code for parental management | 23 | Player status |
| 2 | Subtitle stream number | 13 | Parental level | 24 | reserved |
| 3 | Angle number | 14 | Player configuration for Video | 25 | reserved |
| 4 | Title number | 15 | Player configuration for Audio | 26 | reserved |
| 5 | Chapter number | 16 | Language code for AST | 27 | reserved |
| 6 | Program number | 17 | Language code ext. for AST | 28 | reserved |
| 7 | Cell number | 18 | Language code for STST | 29 | reserved |
| 8 | Key name | 19 | Language code ext. for STST | 30 | reserved |
| 9 | Navigation timer | 20 | Player region code | 31 | reserved |
| 10 | Current playback time | 21 | reserved | 32 | reserved |

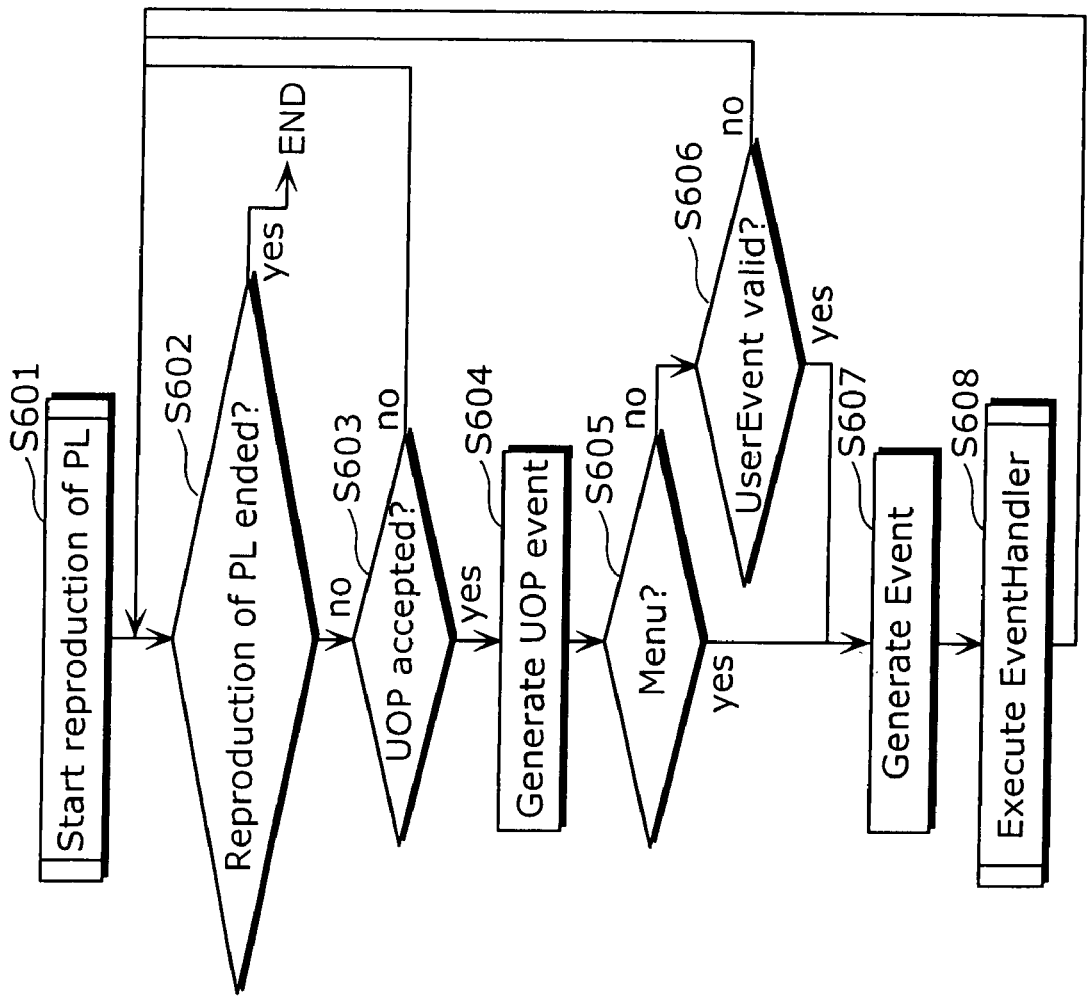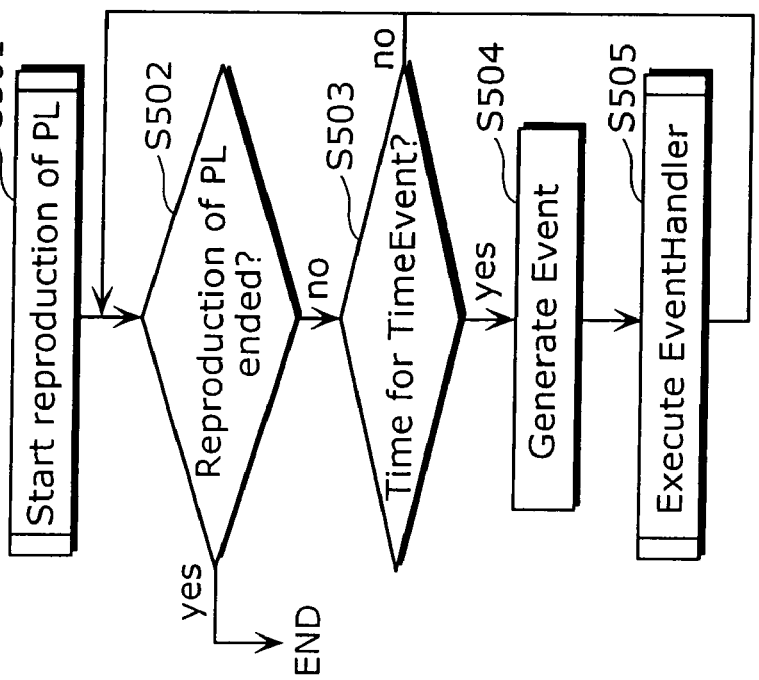
FIG. 29

FIG. 39

| Level | Q value | Frequency | Channel | Speaker layout |
|---|---|---|---|---|
| 1 | 16bit | 48KHz | 2ch | L/R |
| 2 | 16bit | 48KHz | 5.1ch | L/R/C/RL/RR/LFE |
| 3 | 24bit | 96KHz | 7.1ch | L/R/C/RL/RR/LFE/SL/SR |
| ... | ... | ... | ... | ... |

L : Left
R : Right
C : Center
RL : Rear Left
RR : Rear Right

LFE : Low Frequency Effect
SL : Surround Left
SR : Surround Right

FIG. 41

| | Channel configuration | | | |
|---|---|---|---|---|
| | 2ch | 5.1ch(2+3.1) | 7.1ch(2+3.1+2) | 5.1ch | 7.1ch |
| 2ch decoder | 2 | 2 | 2 | — | — |
| 5.1ch decoder | 2 | 5.1 | 5.1 | 5.1 | — |
| 7.1ch decoder | 2 | 5.1 | 7.1 | 5.1 | 7.1 |

INFORMATION RECORDING MEDIUM, AND MULTIPLEXING DEVICE

TECHNICAL FIELD

The present invention relates to an information recording medium in which video data and audio data are recorded, a multiplexing device that multiplexes data, and the like.

BACKGROUND ART

The following describes a conventional DVD-Video disc (hereinafter referred to as a "DVD").

FIG. 1 is a diagram showing the structure of a DVD. As shown at the bottom of FIG. 1, the DVD includes a logical address space in between the lead-in area and the lead-out area. In the logical address space, volume information for the file system is stored at the top, and application data such as video and audio is stored in the subsequent areas.

The file system of the DVD is a file system compliant with ISO9660 and the Universal Disc Format (UDF). The file system is a mechanism for representing data on a disc by units called directories and files. In a personal computer (PC), a file system called FAT or NTFS is used. This kind of file system allows a computer to process data recorded in the hard disk in the form of directories and files. Usability is thereby enhanced.

Both UDF and ISO9660 are used in DVDs as their file systems. UDF and ISO9660 are sometimes referred to collectively as "UDF Bridge". Data recorded on a DVD can be read out by the file system driver of either UDF or ISO9660. Of course, for DVD-RAM/R/RW, which are rewritable DVDs, data reading, writing and deletion are physically possible via the file systems.

Data recorded on a DVD exists as directories or files as shown in the upper left of FIG. 1 via the file system. A directory called "VIDEO_TS" is placed immediately below the root directory ("ROOT" in FIG. 1), where application data for the DVD is recorded. The application data is divided and recorded as plural files. The following are some of the major files.

VIDEO_TS.IFO A disk reproduction control information file
VTS_01_0_0.IFO Video title set #1 reproduction control information file
VTS_01_0_0.VOB Video title set #1 stream file
. . .

Two extensions are prescribed. "IFO" is an extension which indicates that a file with this extension stores reproduction control information. "VOB" is an extension indicating that a file with this extension stores an MPEG stream, which is AV data. The reproduction control information is information that includes information for implementing interactivity (techniques for dynamically changing the reproduction state according to a user operation) used by the DVD, as well as information that is attached to a title or an AV stream, such as meta data. The reproduction control information in the DVD is generally called navigation information.

The reproduction control information files include "VIDEO_TS. IFO", which manages the entire disc, and "VTS_01_0_0.IFO" which is reproduction control information for individual video title sets. "01" in the body of the filename indicates the number of the video title set. For example, when the number in a video title set is #2, the filename of the video title set is "VTS_02_0.IFO". Note that a single DVD can store plural titles, that is, plural movies with different content and plural movies with the same content, but which have different versions.

The upper right of FIG. 1 shows a DVD navigation space in the application layer of the DVD, i.e., a logical structure space where the reproduction control information mentioned above is expanded. Information in "VIDEO_TS.IFO" is shown in the DVD navigation space as Video Manager Information (VMGI). The reproduction control information, which exists for each video title set, such as "VTS_01_0.IFO", is shown in the DVD navigation space as Video Title Set Information (VTSI).

Program Chain Information (PGCI), which is information about a reproduction sequence called a Program Chain (PGC), is described in VTSI. The PGCI is made up of groups of cells and a kind of programming information called a command. Each cell represents partial or whole segments in a Video Object (VOB; MPEG stream). Cell reproduction means reproducing segments in a VOB that are specified by the cell.

Commands are processed by a DVD-capable virtual machine and are similar to a Java (registered trademark) Script executed in a browser. Java (registered trademark) Script performs window and browser controls (for example, opens a new browser window), in addition to logical operations. Meanwhile, a DVD command performs only reproduction control for AV titles (for example, the specification of a chapter to be reproduced), in addition to logical operations. This is a difference between a DVD command and Java® Script.

Each cell includes information about the start address and end address (logical recording address on the disc) of a VOB recorded on the disc. A player reads out data using information described in the cell concerning the start address and end address of the VOB, and reproduces the read out data.

FIG. 2 is a diagram for describing the navigation information in the AV stream. The interactivity which is characteristic to DVDs is not implemented by the navigation information alone recorded in the above-described "VIDEO_TS.IFO" and "VTS_01_0_.IFO" and so on. Several pieces of important information for realizing interactivity are multiplexed in the VOB with video data and audio data, using dedicated carriers called navigation packs (hereinafter referred to as "navi pack(s)" or "NV_PCK").

Here, a description is given of a menu as a simple example of interactivity. Several buttons appear on the menu screen. For each of the buttons, the details of a process to be performed when the button is pressed are defined. One button is selected on the menu. Highlighting, which is a semitransparent image to be overlaid on the selected button, indicates to the user that the button on which it is overlaid is being selected. The user can shift the highlighting to any of the buttons located above, below, right or left of the currently selected button, using the Up/Down/Right/Left key on the remote control. Using the Up/Down/Right/Left key on the remote control, the user shifts the highlight to a button corresponding to the process the user wishes to execute, and then presses the Determination key. Accordingly, a program for the command corresponding to the selected button is executed. For example, the reproduction of a title or a chapter is executed by a command (for example, refer to Japanese Laid-Open Patent application No. 09-282848).

The upper left of FIG. 2 shows an overview of the control information stored in NV_PCK.

NV_PCK includes highlight color information and button information for each button and so on. Color palette information is described in the highlight color information. The color palette information specifies a semitransparent color for a highlight to be overlaid. Within the button information, the following information is described: rectangular area information, i.e. information about the position of each button; shift information indicating a shift from one button to another button (specification of a destination button corresponding to the user selecting one of the Up/Down/Right/Left keys on the remote control); and button command information (a command to be executed when the button is selected).

As shown in the upper right center of FIG. 2, a highlight on the menu is created as an overlay image. The overlay image is an image generated by giving a color specified by the color palette information to a button specified by the rectangular area information in the button information. The overlay image is displayed on the screen, superimposed on the background image shown on the right of FIG. 2.

The menu of the DVD is displayed in the above-described manner. In order to allow menu information to be dynamically updated in synchronization with the stream, a part of the navigation data is embedded in the stream using the NV_PCK. This is done for example, to allow the menu to be displayed for only five to ten minutes during movie reproduction. A second reason is to allow the stream and the menu information to be displayed in synchronization with each other even for application data, for which synchronous display of the stream and menu information is difficult. Another major reason is to improve user operability. For example, by storing, in NV_PCK, information for supporting special reproduction, it becomes possible to smoothly decode and reproduce AV data stored on a DVD even when the AV data is reproduced in a special manner such as fast forward and rewind reproduction.

FIG. 3 is a diagram that shows an image of a VOB, which is a DVD stream. Types of data such as video data, audio data, and subtitle data shown in FIG. 3(A) are each packetized and packed, as shown in FIG. 3(B), based on the MPEG system standard (ISO/IEC13818-1), and multiplexed respectively as shown in FIG. 3(C) to be generated as a single MPEG program stream. NV_PCK, which includes a button command for realizing interactivity, is multiplexed together with the packets and the packs.

Data multiplexing in the MPEG system is characterized in that, while each data to be multiplexed forms a bit string based on the decoding order, data to be multiplexed, i.e., video data, audio data and subtitle data is not necessarily arranged in the order of reproduction, i.e., decoding order. This is attributable to the fact that a decoder model for MPEG system streams (generally referred to as a "System Target Decoder" or an "STD" (refer to FIG. 3(D)) has decoder buffers corresponding to the respective elementary streams obtained by demultiplexing the multiplexed data, and the demultiplexed data are temporarily stored in the respective decoder buffers until the time of decoding. The size of decoder buffers specified by the DVD-Video standard differs per elementary stream. The size of the buffer for video data is 232 KB, the size of the buffer is for audio data is 4 KB, and the size of the buffer for subtitle data is 52 KB.

In other words, the subtitle data that is multiplexed together with the video data is not necessarily decoded or reproduced with the same timing as the timing with which the video data is decoded and reproduced.

[Patent Reference 1] Japanese Laid-Open Patent Application No. 9-282848

DISCLOSURE OF INVENTION

Problems that Invention is to Solve

Conventionally, there are four audio codec standards employed for DVDs: "Dolby Digital (AC-3)", "MPEG Audio", "LPCM", and "DTS". "DTS" is a player option function, and therefore some DVD players are equipped with a DTS decoder, while others are not. Furthermore, some DVD players have DTS-compatible functions for outputting digital data to an AV amplifier, while others do not.

A DVD player with a DTS digital data output function outputs data compliant with a digital I/F standard called Sony/Philips Digital Interconnect Format (SPDIF; consumer version defined by IEC60958-3) to an AV amplifier compliant with the same standard.

However, SPDIF can only support a bandwidth of up to 1.5 Mbps, and thus does not support "DTS++ (lossless compression)", which is an extension codec standard for "DTS", requiring a bandwidth of approximately up to 20 Mbps. Therefore, even if a next generation HD DVD format (BD format) would support "DTS++", it would not be possible to output a DTS++ stream to an AV amplifier compliant with the SPDIF standard.

The present invention has been conceived in view of the above problem, and it is an object of the present invention to provide an information recording medium in which an access unit including basic data and extension data is recorded, so as to allow a decoder capable of decoding only basic data to process the stream including basic data and extension data. Another object of the present invention is to provide a multiplexing device that multiplexes basic data and extension data so that buffers do not fail in a decoder decoding only the basic data and in a decoder decoding an access unit including the basic data and extension data.

Means to Solve the Problems

In order to solve the problem above, the information recording medium in the present invention on which a stream, which has plural access units and includes at least one of image and audio, is recorded, wherein the access units have a first packet which includes basic data; and a second packet which includes extension data related to the basic data; the basic data is data that can be decoded in a completed state without requiring the extension data and the extension data is data for improving the quality of data generated from the basic data; wherein the first packet and the second packet are assigned with time stamps indicating relative times at which the first packet and the second packet are respectively inputted to buffers, so that a buffer model of a first decoder does not fail and a buffer model of a second decoder does not fail, the first decoder decoding only the basic data, and the second decoder decoding the basic data and the extension data.

For example, in the information recording medium, the values of the time stamps are each determined based on the following items related to the respective buffer models of the first decoder and the second decoder: a buffer size; a speed at which data is inputted to the buffer; a speed at which data is outputted from the buffer; the size of the first packet; and the size of the second packet.

For example, each access unit is data of a fixed time span.

The multiplexing device of the present invention which multiplexes the first packet including the basic data and the second packet including the extension data which constitute the access unit stored in the information recording medium by assigning, to the first and second packets, time stamps indicating relative times at which the first and second packets are respectively inputted to buffers so that a buffer model of a first decoder does not fail and a buffer model of a second decoder does not fail, the first decoder decoding only the basic data, and the second decoder decoding the basic data and the extension data.

The present invention can also be embodied as a multiplexing method having, as steps, the characteristic constituent elements included in the multiplexing device of the present invention, and as a program that causes a computer to execute the steps. The program can be distributed on a recording medium such as a CD-ROM, and via a transmission medium such as a communication network.

Effects of the Invention

The present invention provides an information recording medium in which an access unit including basic data and extension data is recorded, so as to allow a decoder capable of decoding only basic data to process the access unit which includes basic data and extension data corresponding to the next generation. In addition, the present invention further provides a multiplexing device and the like which multiplexes basic data and extension data so that buffers do not fail in a decoder which decodes basic data only and in a decoder which decodes an access unit including basic data and extension data.

In other words, the present invention has an advantage of making it possible for an existing digital I/F to extract and output audio data in a conventional manner, even in the case where the audio data is recorded according to a new audio codec which is beyond the bandwidth of the existing digital I/F.

BRIEF DESCRIPTION OF DRAWINGS

FIG. 12 is a diagram for describing a model for continuous supply of VOB data;
FIG. 24 is a diagram which shows a list of system parameters;
FIG. 29 is a diagram which shows the flow of event processes after the reproduction of the AV data starts;
FIG. 39 shows an example of an item that is described in the descriptor;
FIG. 41 is a diagram which shows the structure of a channel.

NUMERICAL REFERENCES

Figure 1:
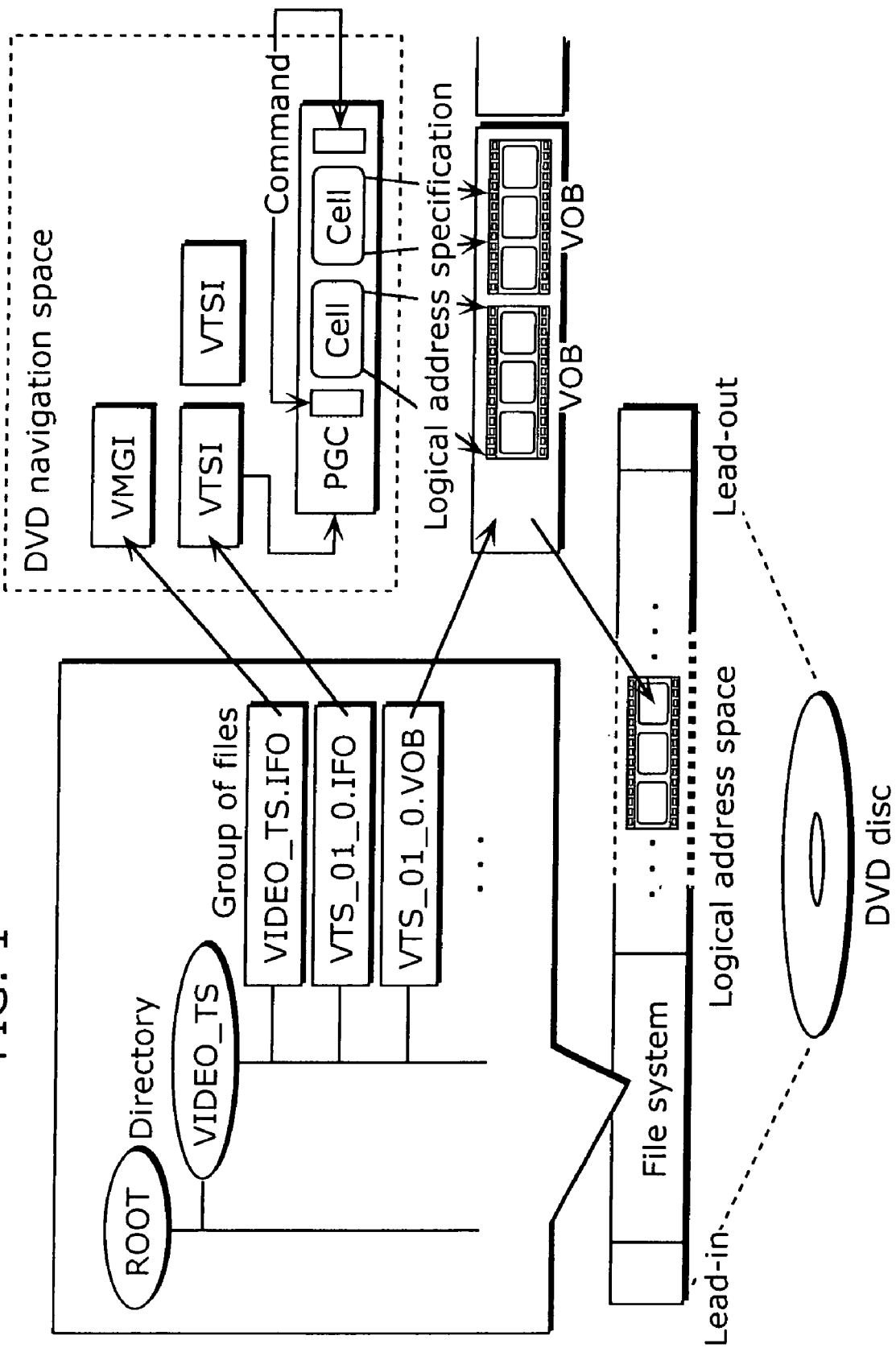
FIG. 1 is a diagram which shows the structure of a DVD.
Figure 2:
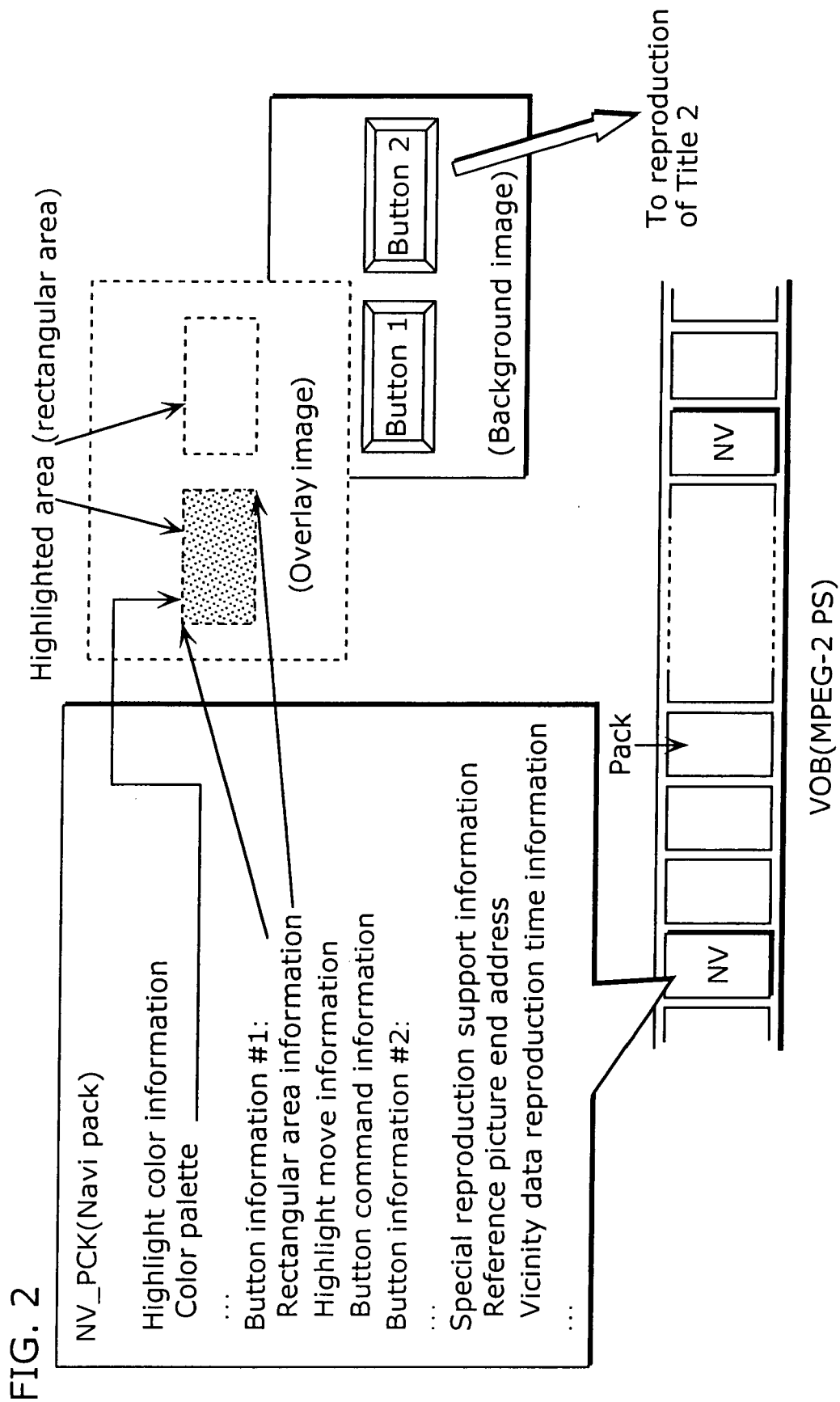
FIG. 2 is a diagram for describing navigation information.
Figure 3:
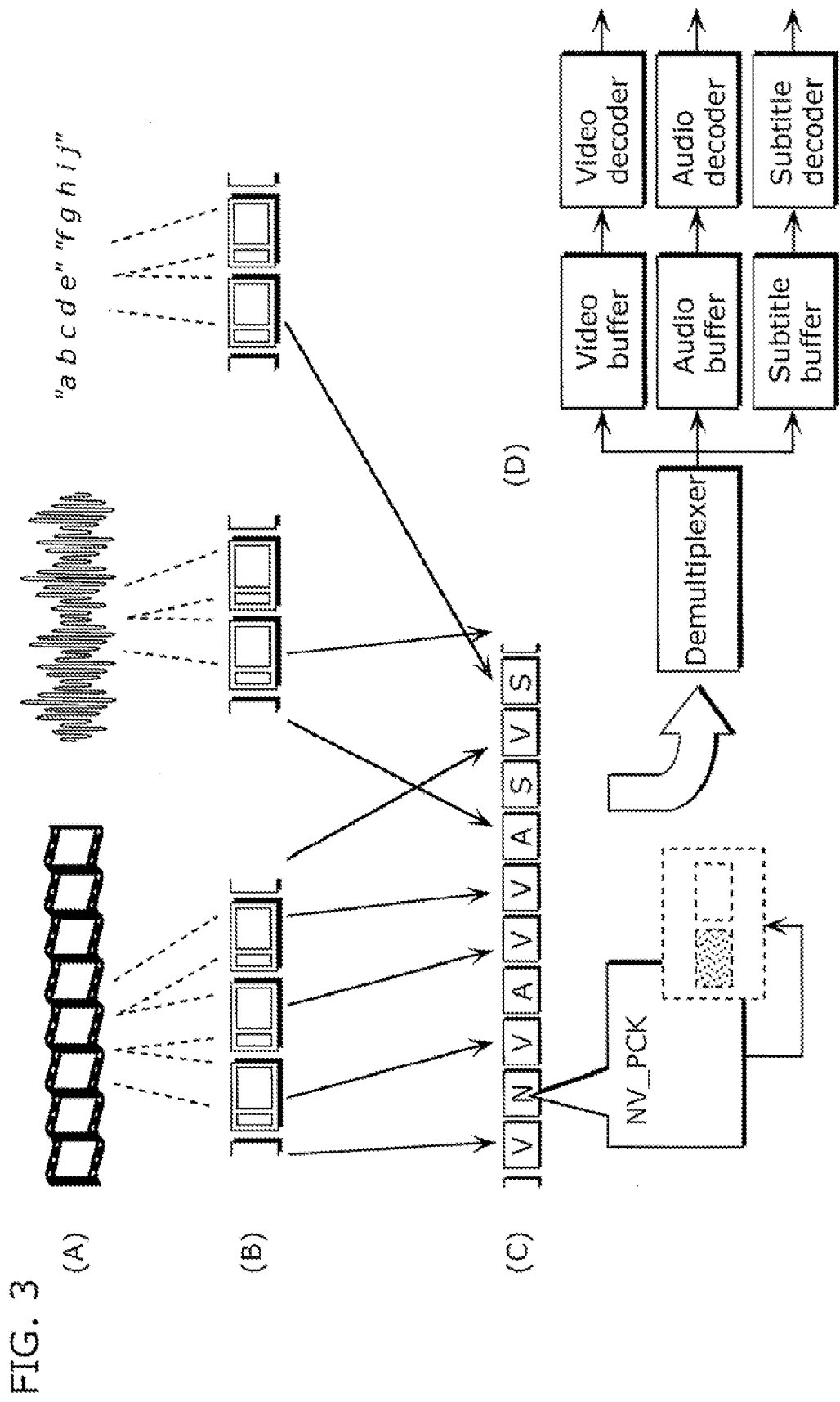
FIG. 3(A) shows data such as video, audio and subtitle data.
FIG. 3(B) is a figure which shows packetization and packing of each data.
FIG. 3(C) is a figure which shows packetized and packed data.
FIG. 3(D) is a figure which shows a decoder model of an MPEG system stream.

201 BD Disk
202 Optical pickup
203 Program storage memory
204 Management information storage memory
205 AV storage memory
206 Program processing unit
207 Management information processing unit
208 Presentation processing unit
209 Image plane
210 Video plane
211 Overlap processing unit
301 Program storage memory
302 Program processor
303 UOP manager
304 Management information storage memory
305 Scenario processor
306 Presentation controller
307 Clock
308 Image memory
309 Track buffer
310 Demultiplexing device
311 Image processor
312 Video processor
313 Sound processor
314 Image plane
315 Video plane
316 Overlap processing unit
317 Drive controller

BEST MODE FOR CARRYING OUT THE INVENTION

Figure 4:
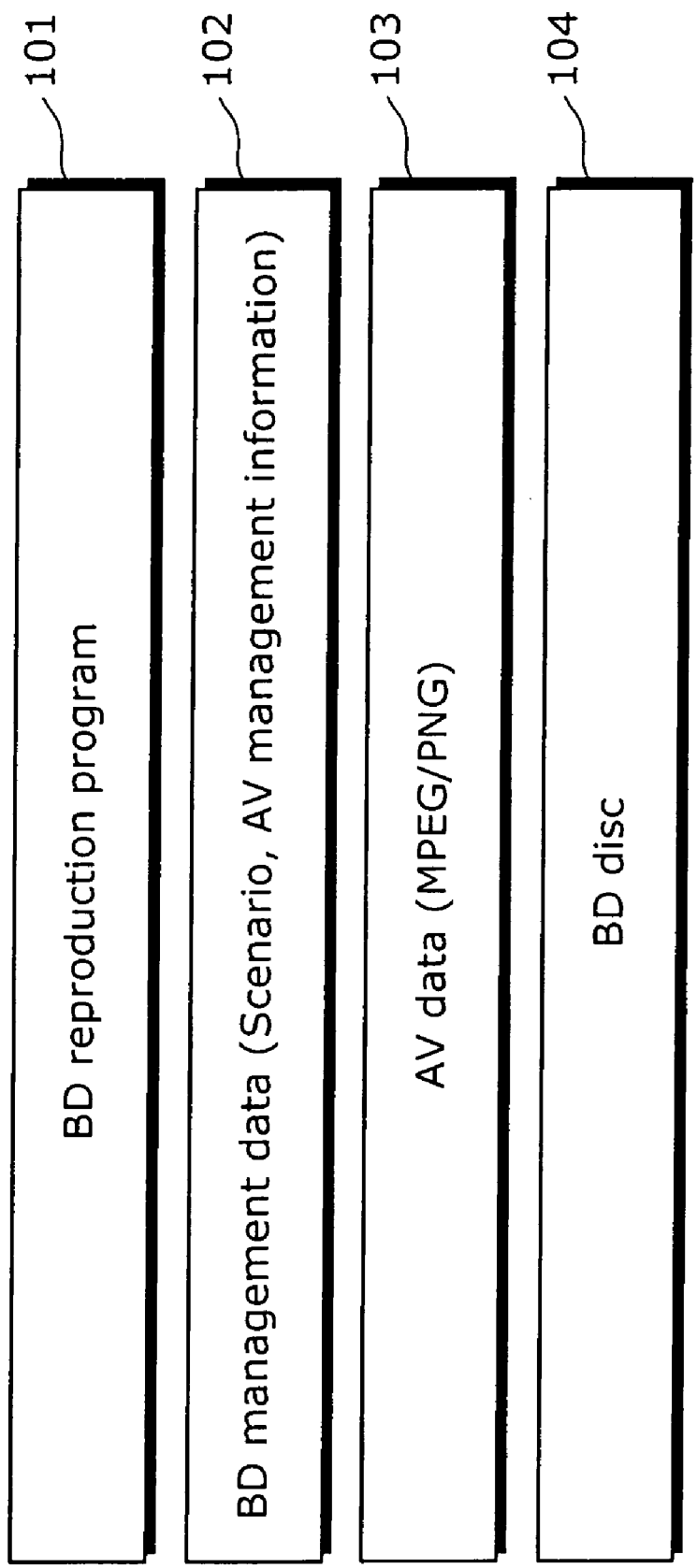
FIG. 4 is a diagram which shows the structure of a next generation DVD.

The following describes the best modes of the present invention with reference to the drawings.
(Related Embodiment)
(Logical Data Structure on the Disc)
FIG. 4 is a diagram which shows the structure of a next generation DVD (hereinafter referred to as a "BD"), and more particularly showing a BD disc 104, which is a disc medium, as well as the structure of data 101, 102, and 103, which are recorded on the disc 104. Recorded on the BD disc 104 are: an AV data 103; a BD management information 102, which includes AV data management information, an AV reproduction sequence and the like; and a BD reproduction program 101 for implementing interactivity. For the sake of illustrations, the present embodiment assumes that AV application data for reproducing the AV contents of a movie is recorded on the BD disc 104. However, the BD disc 104 may be used for other purposes.

Figure 5:
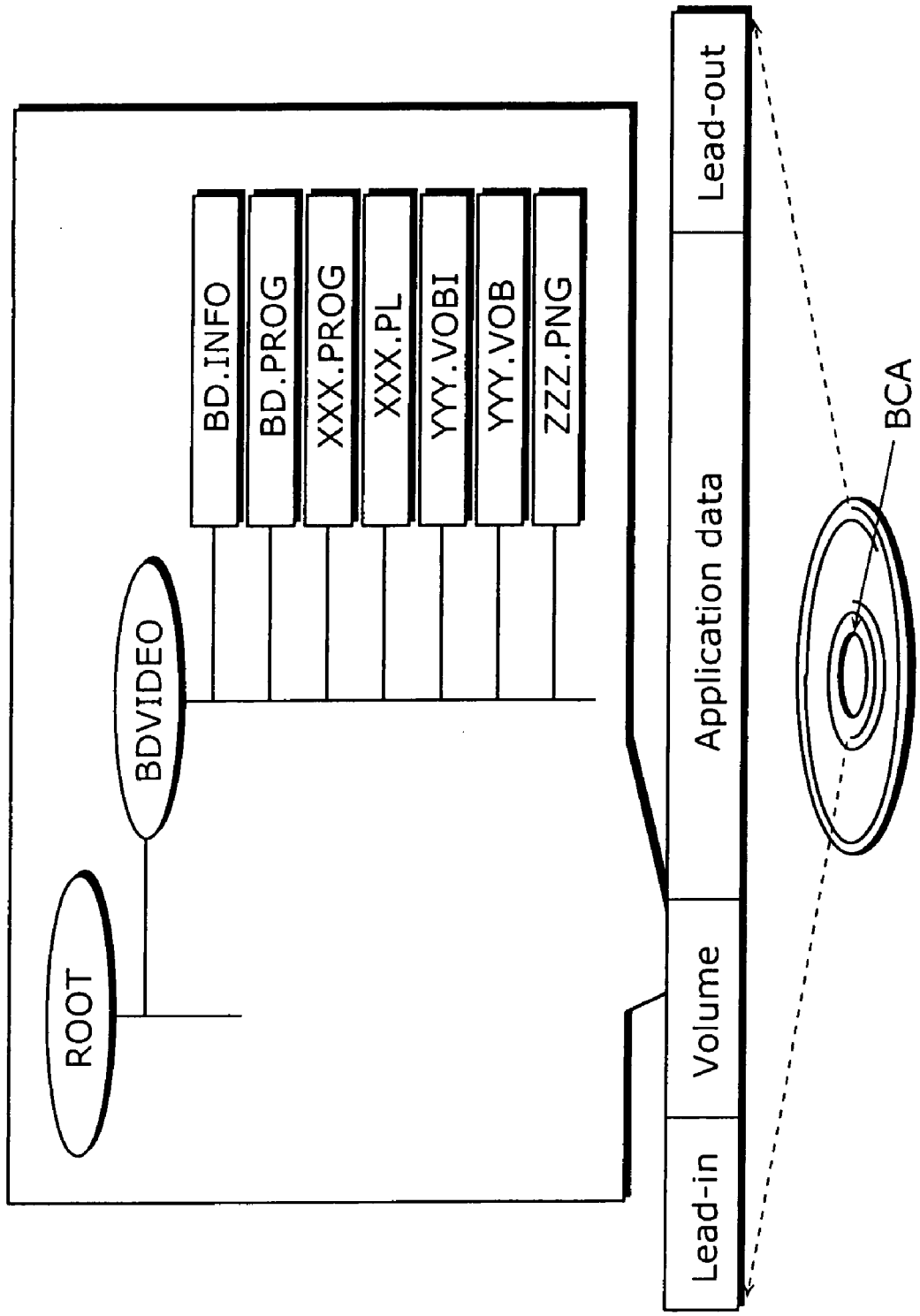
FIG. 5 is a diagram which shows the structures of directories and files of logical data stored on a BD disc.

FIG. 5 is a diagram which shows the structures of directories and files in the logical data recorded on the BD disc. As in the case of other optical discs such as DVDs and CDs, the BD disc has storage areas that are spirally formed in a direction from the inner radius toward the outer radius, as well as a logical address space for storing logical data in between the lead-in area at the inner radius and the lead-out area at the outer radius. The BD disc includes, at the lead-in area of the interior, a special area called a Burst Cutting Area (BCA), from which data can be read out only by a drive. Data stored in this area cannot be read out even when application data is used. Therefore, this area is sometimes used, for example, for copyright protection technology and the like.

In the logical address space, file system information (volume) is stored at the top of the space, and application data such as video data is stored in the subsequent areas. The file system, which is a file system compliant with UDF and ISO9660 as described in "Background Art", is a system for reading out the stored logical data using directory and file structures, as is done in ordinary PCs.

According to the structures of the directories and files on the BD disc of the present embodiment, a BDVIDEO directory is located immediately below the root directory (ROOT). The BDVIDEO directory is a directory storing data such as AV contents and management information (the data 101, 102, and 103 shown in FIG. 4) which is recorded on the BD.

The seven types of files described below are stored under the BDVIDEO directory.

The BD. INFO file (fixed file name)
The "BD. INFO" file, which forms a part of the "BD management information", is a file storing information related to the entire BD disc. This is the first file to be read out by a BD player.

The BD. PROG file (fixed file name)
The "BD. PROG" file, which forms a part of the "BD reproduction program", is a file storing reproduction control information related to the entire BD disc.

The XXX. PL file ("XXX" is variable and the extension "PL" is fixed)
The "XXX. PL" file, which forms a part of the "BD management information", is a file in which play list information is stored, the play list information being a scenario (playback sequence). There is one file per play list.

The XXX. PROG file ("XXX" is variable, the extension "PL" is fixed)
The "XXX. PROG" file, which forms a part of the "BD reproduction program", is a file in which reproduction control information is stored for each play list as described above. The play list corresponding to the "XXX. PROG" file is a play list with the matching file body name ("XXX").

The YYY. VOB file ("YYY" is variable, the extension "VOB" is fixed)
The "YYY. VOB" file, which forms a part of the "AV data", is a file in which a VOB is stored (the VOB as described in "BACKGROUND OF THE INVENTION"). There exists one file per VOB.

The YYY. VOBI file ("YYY" is variable, the extension "VOBI" is fixed)
The "YYY. VOBI" file, which forms a part of the "BD management information", is a file in which stream management information related to a VOB, which is AV data, is stored. The VOB corresponding to the "YYY. VOBI" file is a VOB with the matching file body name ("YYY").

The "ZZZ. PNG" file ("ZZZ" is variable, the extension "PNG" is fixed)
The "ZZZ. PNG" file, which forms a part of the "AV data", is a file storing image data PNG (which is an image format standardized by the W3C, and is pronounced "ping") for constructing subtitles and a menu. There exists one file for each PNG image.

Figure 6:
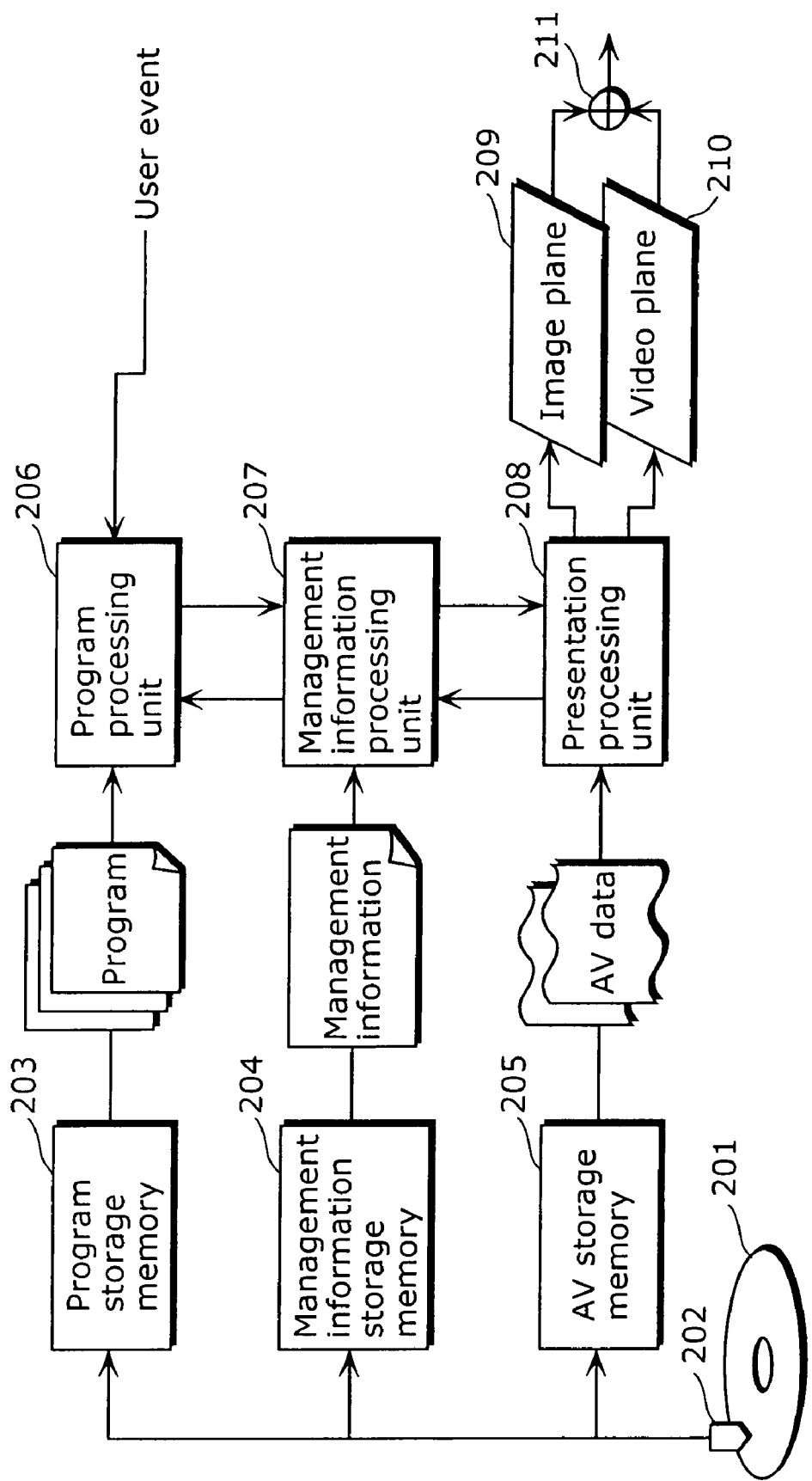
FIG. 6 is a block diagram which shows the functions of a player.
Figure 7:
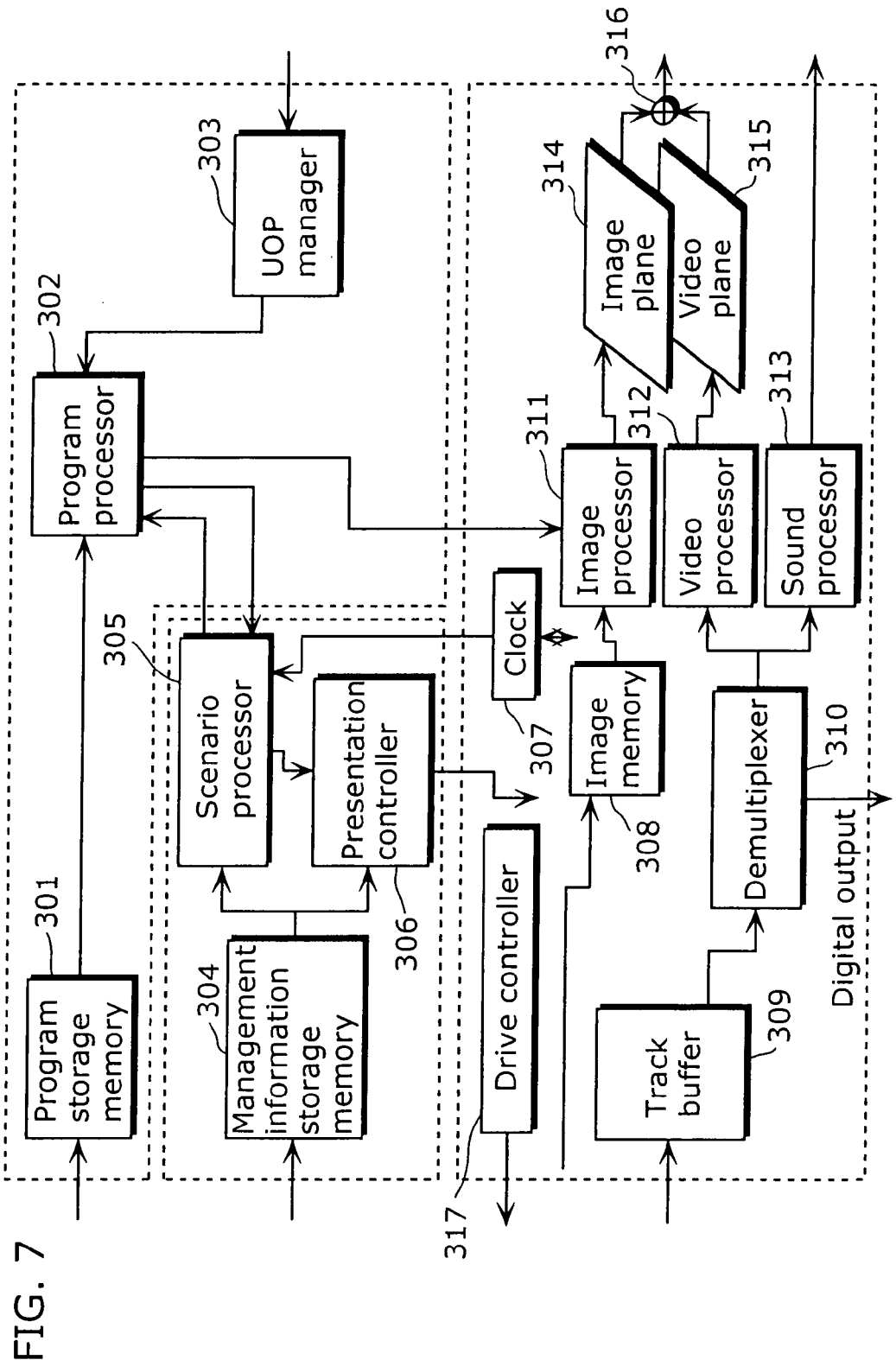
FIG. 7 is a block diagram which shows a detailed structure of the player.

(Structure of the Player)
Next, using FIG. 6 and FIG. 7, a description is given of a player that reproduces the above-described BD disc.

FIG. 6 is a block diagram which shows the overall functions of the player.

Data recorded on a BD disc 201 is read out via an optical pick-up 202. Each data read out is transferred to a dedicated memory according to the type of the data. The BD reproduction program (the "BD. PROG" file or the "XXX. PROG" file) is transferred to a program storage memory 203. The BD management information ("BD. INFO" file, "XXX. PL" file, or "YYY. VOBI" file) is transferred to a management information storage memory 204. The AV data ("YYY. VOB" file or "ZZZ. PNG" file) is transferred to an AV storage memory 205.

The BD reproduction program stored in the program storage memory 203 is processed by a program processing unit 206. The BD management information stored in the management information storage memory 204 is processed by a management information processing unit 207. The AV data stored in the AV storage memory 205 is processed by a presentation processing unit 208.

The program processing unit 206 receives, from the management information processing unit 207, information about a play list to be reproduced and event information such as the timing for executing a program. Then the program processing unit 206 executes the program. The program can change the play list dynamically. Dynamic changes to a play list to be reproduced are implemented by the program processing unit 206 sending an instruction to reproduce the play list to the management information processing unit 207. The program processing unit 206 receives an event from the user, i.e., a request from a remote control key, and executes a program corresponding to the event (a request) when there are any.

The management information processing unit 207, receives an instruction from the program processing unit 206, analyzes the corresponding play list and management information for the VOB corresponding to the play list, and instructs the presentation processing unit 208 to reproduce the target AV data. Furthermore, the management information processing unit 207 receives reference time information from the presentation processing unit 208, and instructs the presentation processing unit 208 to end the reproduction of the AV data based on the reference time information, as well as generating an event, used to give an instruction to the program processing unit 206, indicating the timing for executing the program.

The presentation processing unit 208, which has decoders corresponding respectively to video, audio, and subtitles/images (still images), decodes and outputs the AV data according to an instruction from the management information processing unit 207. The decoded video data and subtitles/images are rendered onto their respective dedicated planes, i.e., a video plane 210 and an image plane 209. The respective images rendered onto the video plane 210 and the image plane 209 are overlapped by an overlap processing unit 211, and the overlapped images are outputted to a display device such as a television.

The BD player, as has been described with reference to FIG. 6, is comprised of the constituent elements corresponding to the respective data structures recorded on the BD disc.

FIG. 7 is a detailed block diagram of the structure of the above-described player. In FIG. 7, the AV storage memory 205 is illustrated as an image memory 308 and a track buffer 309. The program processing unit 206 is illustrated as a program processor 302 and a UOP manager 303. The management information processing unit 207 is illustrated as a scenario processor 305 and a presentation controller 306. The presentation processing unit 208 is illustrated as a clock 307, a demultiplexing device 310, an image processor 311, a video processor 312, and a sound processor 313.

The VOB data (MPEG stream) and image data (PNG) read out from the BD disc 201 are stored respectively into the track buffer 309 and the image memory 308. The demultiplexing device 310 extracts the VOB data stored in the track buffer 309 into video data and audio data based on the time indicated by the clock 307, and sends the video data to the video processor 312 and the audio data to the sound processor 313. The video processor 312 and the sound processor 313 are each made up of a decoder buffer and a decoder, as specified in the MPEG system standard. In other words, the video data and audio data inputted from the demultiplexing device 310 are temporarily stored in the respective decoder buffers and decoded by the respective corresponding decoders according to the time indicated by the clock 307.

The PNG stored in the image memory 308 is processed using two methods described below.

First, when the image data is subtitle data, the presentation controller 306 gives an instruction about decoding timing. Upon receiving time information from the clock 307, the scenario processor 305 instructs, when it is time to start the display of the subtitles, the presentation controller 306 to display the subtitles so that the subtitles are displayed in an appropriate manner. Similarly, the scenario processor 305 instructs, when it is the time to end the display of the subtitles, the presentation controller 306 to stop displaying the subtitles, based on time information from the clock 307. The image processor 311, upon receipt of an instruction from the presentation controller 306 to decode/display the image data, extracts the corresponding PNG data from the image memory 308, decodes it, and renders the decoded data onto the image plane 314.

Next, a case where image data is data for menus is explained. When the image data is menu data, the program processor 302 gives an instruction about decoding timing. The timing at which the program processor 302 gives an instruction to decode the image data all depends on the BD program processed by the program processor 302, and therefore is not easily determined.

As has been described with reference to FIG. 6, the image data and video data are rendered respectively onto the image plane 314 or the video plane 315 after being decoded, and are outputted after being composed by the composition processing unit 316.

The management information (scenario information and AV management information) read out from the BD disc 201 is stored into the management information storage memory 304. After this, the scenario information (the "BD. INFO" file and the "XXX. PL" file) is read out by the scenario processor 305, and the AV management information ("YYY. VOBI" file) is read out by the presentation controller 306.

The scenario processor 305 analyzes the information in the play list, and notifies the presentation controller 306 of a VOB referenced by the corresponding play list and the reproduction position of the VOB. The presentation controller 306 analyzes the management information ("YYY. VOBI" file) of the target VOB, and instructs the drive controller 317 to read out the target VOB.

According to the instruction from the presentation controller 306, the drive controller 317 reads out the target AV data by moving the optical pick-up. The AV data read out is stored into the image memory 308 or the track buffer 309, as described above.

The scenario processor 305 monitors the time indicated by the clock 307, and outputs, to the program processor 302, an event at the timing set by the management information.

The BD program ("BD. PROG" file or "XXX. PROG" file) stored on the program storage memory 301 is processed by the program processor 302. The program processor 302 processes the BD program in the case where an event is sent from the scenario processor 305 or where an event is sent from the UOP manager 303. The UOP manager 303 generates an event for the program processor 302 in the case where a request is sent from the user using a remote control key.

(Application Space)

Figure 8:
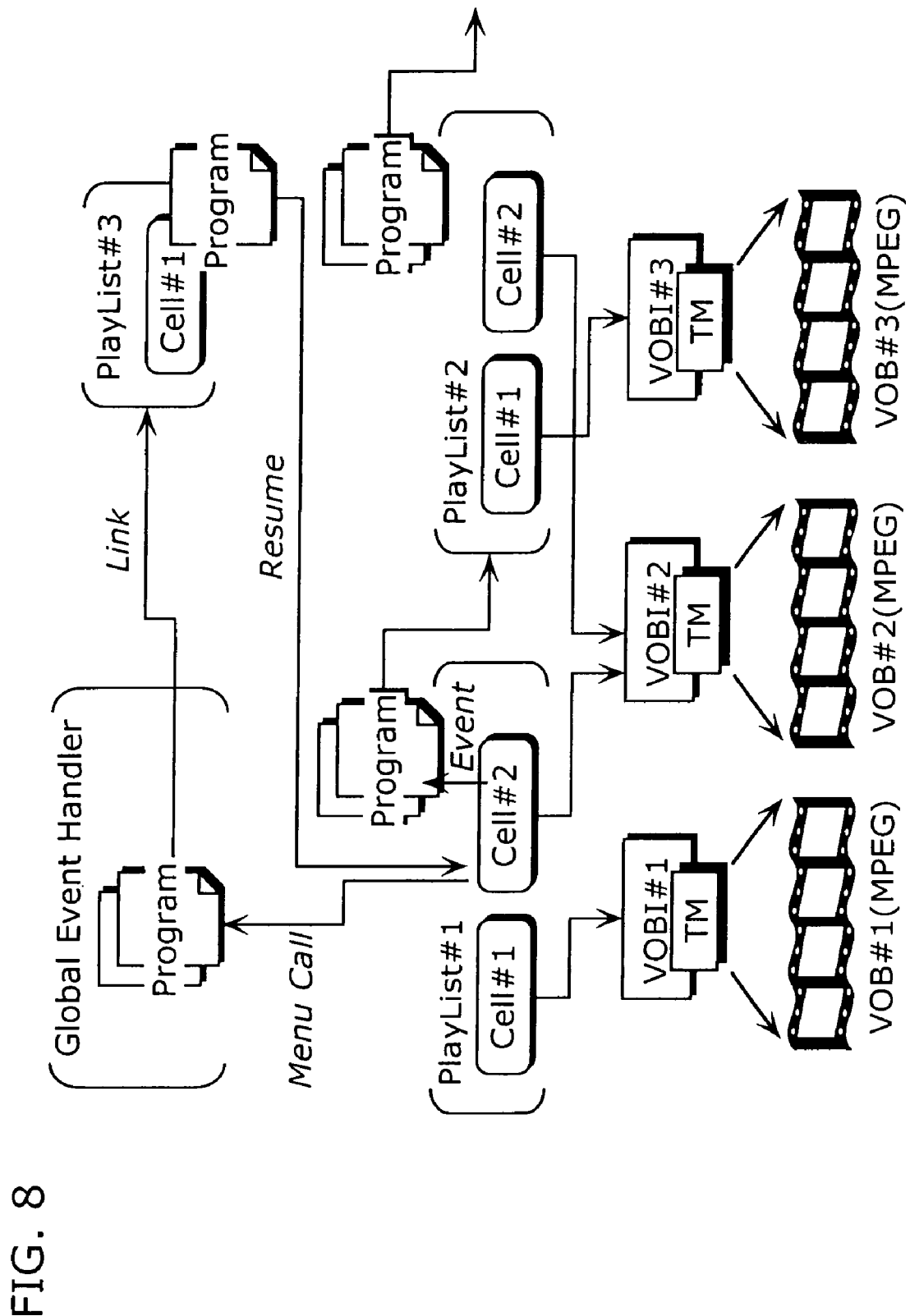
FIG. 8 is a diagram which shows an application space on the BD.

FIG. 8 is a diagram which shows an application space on the BD.

In the application space on the BD, a play list (PlayList) serves as a unit of reproduction. Each play list, which is a concatenation of cells (Cell), includes a static scenario, which is a reproduction sequence determined by the order of cell concatenation and a dynamic scenario described by the program. Unless the program makes a dynamic change in a scenario, the cells in the play list are reproduced in order of concatenation. The completion of the reproduction of all the cells marks the completion of the reproduction of the play list. The program can include a description indicating that the reproduction order of the cells is to be changed. Furthermore, the program can change reproduction targets depending on user selection or player status. A typical example of this is a menu. In the BD, a menu can be defined as a scenario to be reproduced according to a user selection, and the play list can be dynamically changed by the program.

The program here refers to an event handler that is executed by a time event or a user event.

Time events are events that are generated based on time information embedded in a play list. An example of time events is an event sent from the scenario processor 305 to the program processor 302, which is described above using FIG. 7. When a time event occurs, the program processor 302 executes an event handler associated with the corresponding identifier (ID). As has been described above, a program to be executed can give an instruction to reproduce another play list. For example, the program cancels reproduction of a play list which is presently reproducing and reproduces a specified play list.

User events are events that are generated by remote key operations by the user, and are categorized roughly into two types.

User events of a first type are menu selection events that are generated by operating cursor keys (the Up/Down/Right/Left key or the "Determination" key). Event handlers corresponding to menu selection events are valid only during a limited period indicated in a play list (the validity period of each event handler is set as some of the information in the play list). When the Up/Down/Right/Left key or the "Determination" key on the remote control is pressed, a search is made for a valid event handler. In the case where there is a valid event handler, the event handler is executed, whereas in the case where there is no valid event handler, this menu selection event is ignored.

User events of a second type are menu call events that are generated by operating the "Menu" key. When a menu call event is generated, a global event handler is called up. The global event handler is an event handler that is always valid without depending on any play lists. Using this function, it is possible to implement a DVD menu call (e.g., a function that calls up audio data or subtitle data during the reproduction of a title, and resumes the reproduction of the title at the point of suspension after a change is made in the audio data or subtitle data).

A cell (Cell), which is a unit constituting a static scenario in a play list, represents the whole or a part of reproduction segments in a VOB (MPEG stream). Each cell includes the reproduction segments in a VOB as information about reproduction start time and reproduction end time. VOB management information (VOBI), which is paired with an individual VOB, includes a time map (TM), which is table information indicating recording addresses corresponding to data reproduction times. The use of a time map makes it possible to derive a read-start address and a read-end address within a VOB (i.e., the target "YYY. VOB" file) using the above-described reproduction start time and reproduction end time in the VOB. Note that the time map is described in detail below.

(Details of the VOB)

Figure 9:
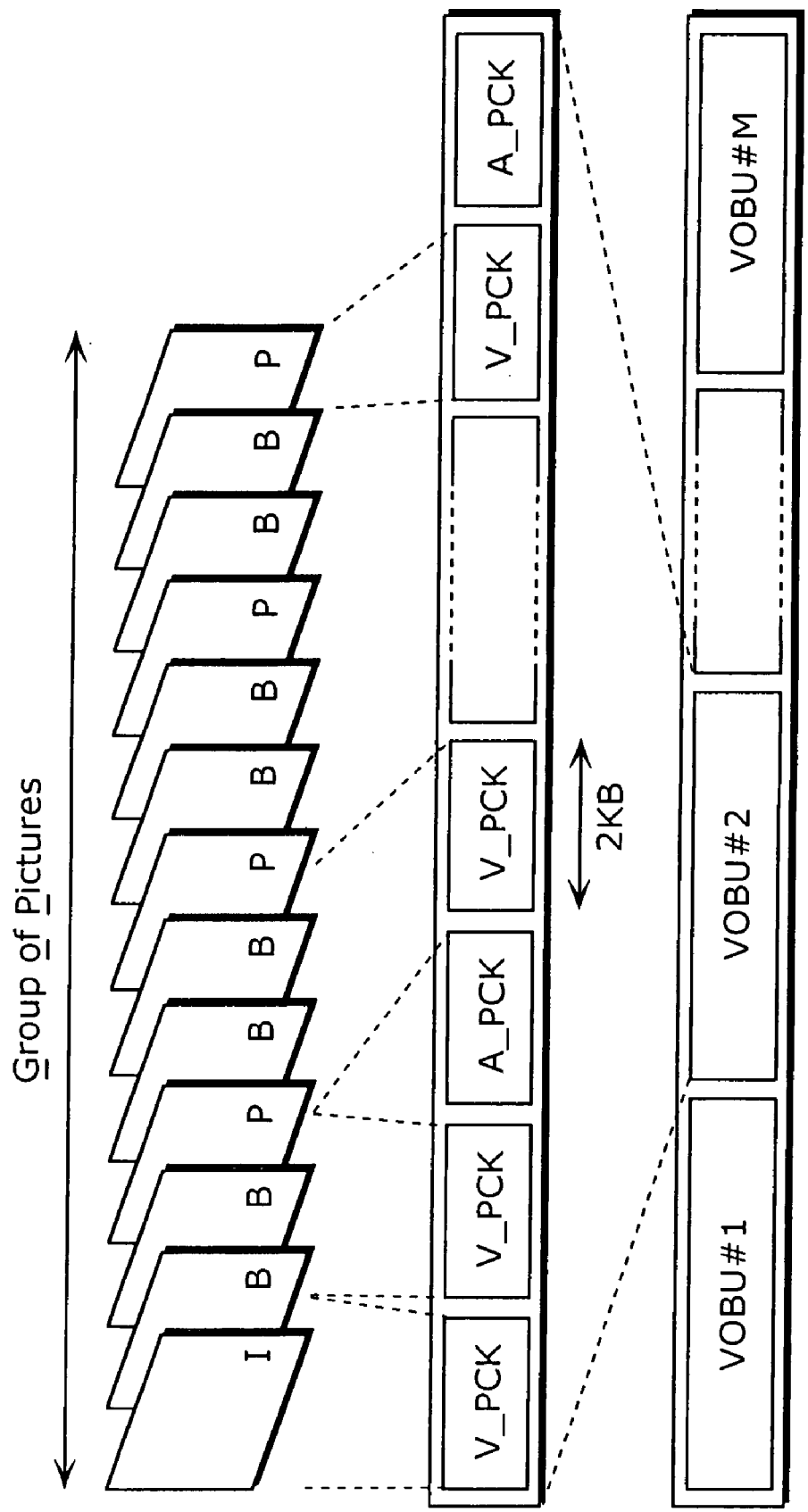
FIG. 9 is a structural diagram which shows the structure of an MPEG stream (VOB)

FIG. 9 is a structural diagram which shows the structure of an MPEG stream (VOB) in the present embodiment.

As shown in FIG. 9, a VOB is made up of plural Video Object Units (VOBUs). A VOBU serves as one unit of reproduction in a multiplexed stream that includes audio data in addition to a Group of Pictures (GOP) in an MPEG video stream as a basis. The video reproduction duration for a VOBU is in the range between 0.4 seconds and 1.0 second, and is normally about 0.5 seconds. In other words, one GOP includes about 15 frames in many cases (for NTSC).

Each VOBU includes video packs (V_PCK) and audio packs (A_PCK). The size of each pack, which is equivalent to one sector, is 2 KB in the present embodiment.

Figure 10:
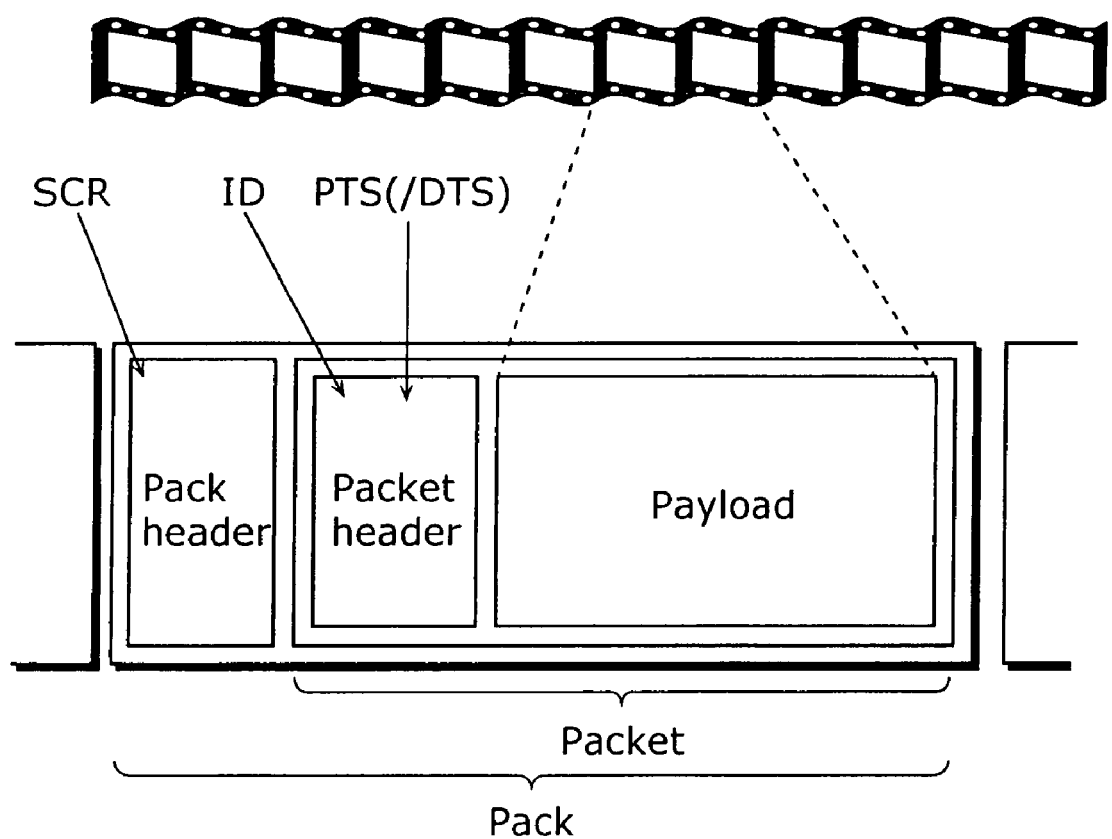
FIG. 10 is a diagram which shows the structure of the pack.

FIG. 10 is a diagram which shows the structure of each pack.

As shown in FIG. 10, each elementary data, such as video data and audio data, is stored into a data storage area called a PES Packet Payload (payload) in a PES Packet (packet) sequentially from the top. The payload, when added with a PES Packet Header (packet header), makes up one PES Packet (packet).

Stored in the packet header are: a stream id (ID) that identifies the stream to which the data stored in the payload corresponds; a Decoding Time Stamp (DTS) and a Presentation Time Stamp (PTS) which are time stamps respectively indicating information about the time to decode the payload and the time to display the payload. Not all packet headers necessarily include a PTS and a DTS, and this is determined according to a rule in the MPEG standard. Details of the rule are described in the MPEG system (ISO/IEC 13818-1) standard, and therefore no description is given for them.

Further attaching a Pack Header (header) to the packet makes a pack. Stored in the header is a System Clock Reference (SCR), which is a time stamp indicating when the pack passes through the demultiplexing device and is inputted into a decoder buffer, which corresponds to an elementary stream.

(Interleaved Storage for VOB)

Figure 11:
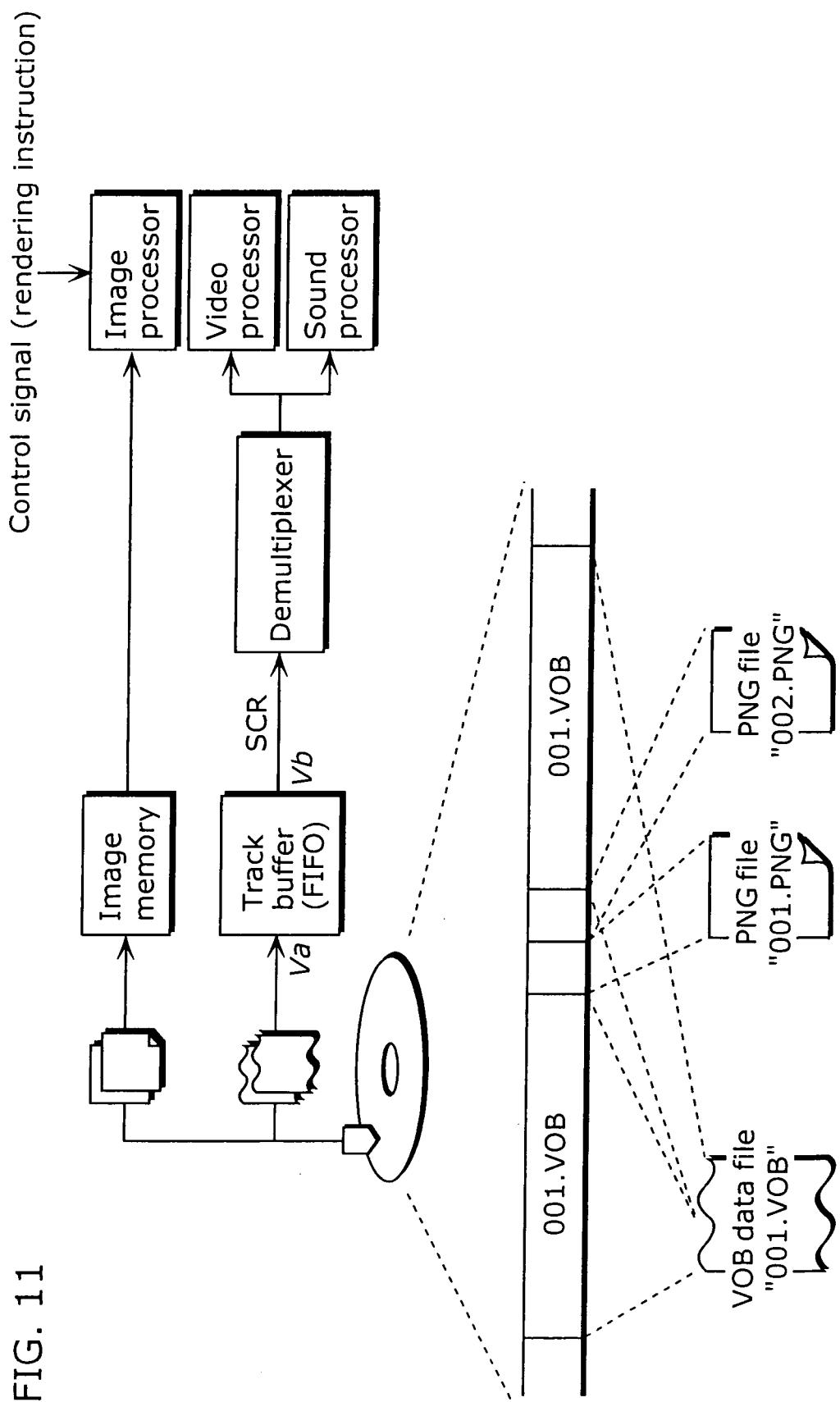
FIG. 11 is a diagram for describing interleaved recording for a VOB file and PNG files on the BD disc.

Next, interleaved storage for a VOB file is described using FIG. 11 and FIG. 12.

The upper part of FIG. 11 shows a part of the structure of the above-described player. As shown in FIG. 11, a VOB on the BD disc, i.e., an MPEG stream, is inputted into the track buffer through the optical pick-up. The PNG on the BD disc, i.e., the image data, is inputted into the image memory through the optical pick-up.

The track buffer is a FIFO format buffer, and the VOB data inputted to the track buffer is sent to the demultiplexing device in order of input. At this time, each pack is extracted from the track buffer according to the SCR described above, and then sent to the video processor or the sound processor via the demultiplexing device. Meanwhile, an image to be rendered is indicated by the presentation controller for the image data inputted into the image memory. In the case where the image data used for rendering is subtitle image data, the image data is deleted from the image memory upon being used. On the other hand, in the case where image data used for rendering is menu image data, the image data remains stored in the image memory while the rendering of the menu is taking place. Menu rendering depends on a user operation, and therefore when a part of the menu is displayed again or replaced by another image according to a user operation, the decoding of the image data to be displayed again is facilitated by allowing the menu image data to remain stored in the image memory while the rendering of the menu is taking place.

The bottom part of FIG. 11 shows interleaved storage for a VOB file and PNG files on the BD disc. Generally, on a ROM such as a CD-ROM or a DVD-ROM, AV data made up of a series of reproduction units to be reproduced sequentially is recorded contiguously. As long as the data is recorded contiguously, the drive reads out the data sequentially and delivers the read data to the respective decoders. However, when the contiguous data are discretely stored on the disc, the drive needs to search for individual contiguous segments, and thus there is a possibility that the data supply stops since data supply stops while the search is taking place. In order to prevent this, AV data made up of a series of reproduction units to be sequentially reproduced is contiguously recorded on a ROM. It is preferable that data in a VOB file is stored in contiguous areas, even on a BD. Data such as subtitle data, which is reproduced in synchronization with video data stored in a VOB, needs to be read from the BD by some method, in the same way as a VOB file.

Methods of reading out subtitle data include a method of collectively reading out the whole subtitle image data (PNG files) before starting the reproduction of a VOB. However, it is not realistic to use this method since a large capacity memory is required.

In view of this, the present embodiment employs a method in which a VOB file is divided into several blocks and stored by being interleaved with image data. The bottom part of FIG. 11 illustrates the interleaved storage.

By appropriately allocating the divided VOB file and image data in an interleaved manner, it becomes possible to store image data into the image memory at the required timing without having to use a large capacity temporary memory as described above. Note that the reading of VOB data is suspended during the reading of image data.

FIG. 12 is a diagram for describing a model for continuous supply of VOB data using the track buffer.

As has been described above, VOB data is temporarily accumulated into the track buffer. Given that the rate at which data is inputted to the track buffer is Va, and the rate at which data is outputted from the track buffer is Vb, as long as data is continuously read from the BD disc and when the difference between Va and Vb is taken to be Va>Vb, the amount of data accumulated in the track buffer keeps increasing.

Suppose, as shown in the upper part of FIG. 12, that a contiguous VOB storage area starts with the logical address "a1" and ends with the logical address "a2". Also suppose that image data is stored in an area between the logical addresses "a2" and "a3", and no VOB data is stored in the area.

The bottom part of FIG. 12 shows changes in the amount of data accumulated in the track buffer. The lateral axis indicates time, and the vertical axis indicates the amount of data accumulated in the track buffer. Time "t1" indicates the time at which the reading of data starts, the data being stored in a location specified by the logical address "a1", which is the start point of the contiguous VOB storage area. At the time "t1" and thereafter, data is to be stored into the track buffer at a rate of (Va−Vb). This rate is equal to a difference between the rate at which data is inputted into the track buffer and the rate at which data is outputted from the track buffer. The time "t2" indicates the time at which data is read out, the data being stored in a location specified by the logical address "a2", which is the end point of the contiguous VOB storage area. In other words, during the period from the time "t1" to the time "t2", the amount of data accumulated in the track buffer increases at the rate of (Va−Vb). The amount of accumulated data at the time "t2" (B(t2)) is determined by the following Equation 1:

$$B(t2)=(Va-Vb)\times(t2-t1) \quad \text{(Equation 1)}$$

After this, since image data is continuous in the area from the logical address "a2" to "a3", there is no input of data into the track buffer, and thus the amount of data accumulated in the track buffer decreases at an output rate of "−Vb". This decrease continues up until the logical address "a3", i.e., the time "t3".

What is important here is that there is a possibility that the reproduction of the VOB stops if the amount of data accumulated in the track buffer becomes 0 before the time "t3", since it means that there is no VOB data to be supplied to the decoders. When data remains in the track buffer at the time "t3", the reproduction of the VOB continues without stopping.

A condition for preventing the amount of data accumulated in the track buffer from becoming 0 before the time "t3" is expressed by the following Equation 2:

$$B(t2) \geq Vb \times (t3-t2) \quad \text{(Equation 2)}$$

In other words, the arrangement of the image data (non-VOB data) should be determined so that Equation 2 is satisfied.

(Navigation Data Structure)

Using FIG. 13 through FIG. 19, the structure of the navigation data (BD management information) on the BD is described.

Figure 13:
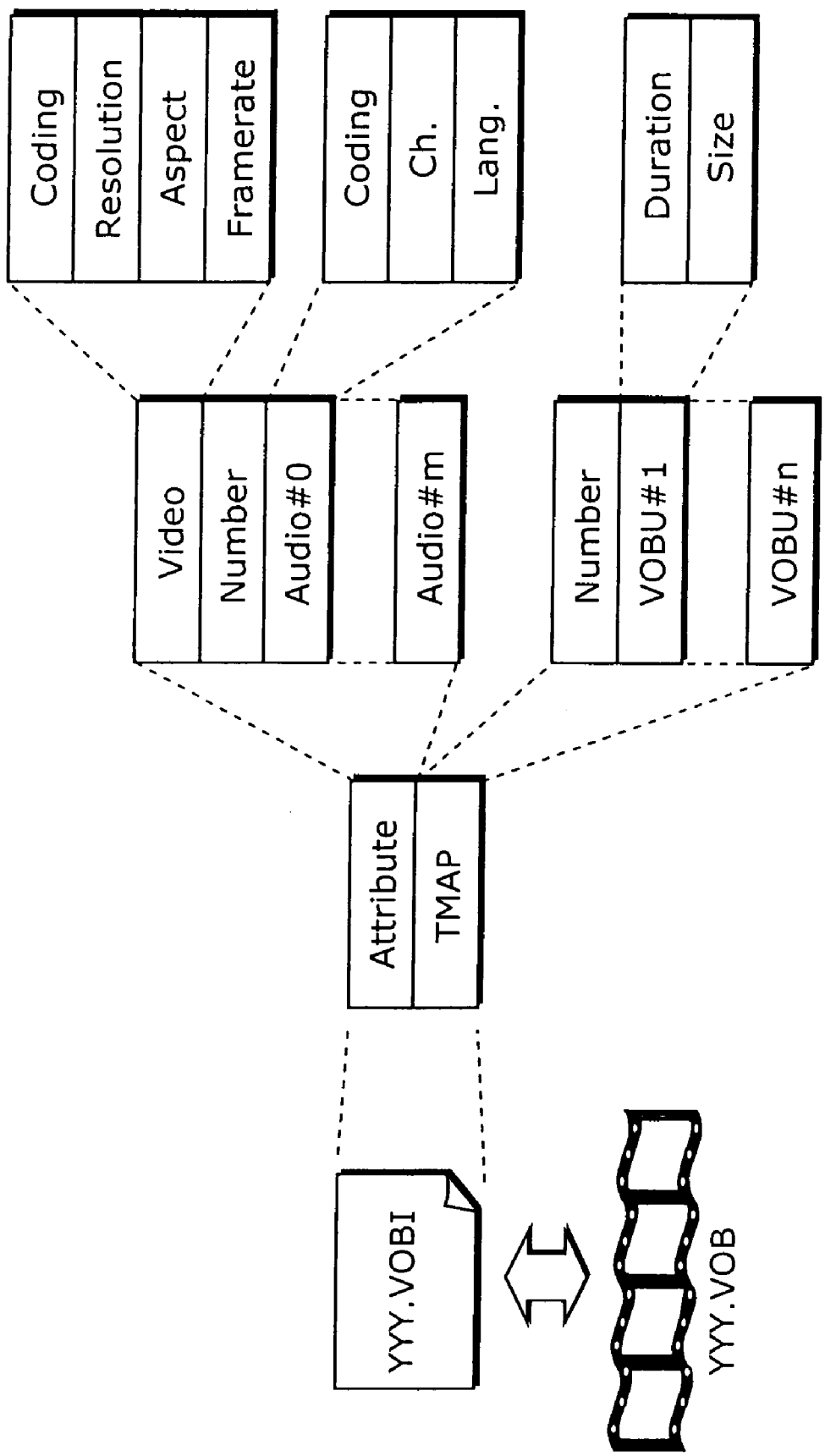
FIG. 13 is a diagram which shows an internal structure of a VOB management information file.

FIG. 13 is a diagram which shows an internal structure of a VOB management information file ("YYY. VOBI").

The VOB management information includes stream attribute information (Attribute) for the VOB and a time map (TMAP). The stream attributes include a video attribute (Video) and audio attributes (Audio#0 through Audio#m). Particularly in regard to audio streams, since a single VOB can simultaneously include plural audio streams, a data field is displayed according to the number of audio streams (Number).

The following lists plural fields included in the video attribute (Video) and possible values included in each field:
Compression mode (Coding):
MPEG1
MPEG2
MPEG4
MPEG4-AVC (Advanced Video Coding)
Resolution (Resolution)
1920×1080
1280×720
720×480
720×565
Aspect ratio (Aspect)
4:3
16:9
Frame rate (Frame rate)
60
59.94
50
30
29.97
24
23.976.

The following lists plural fields included in each of the Audio attributes (Audio) and possible values included in the respective fields.

Compression mode (Coding):
AC3
MPEG1
MPEG2
LPCM
DTSHD
Number of channels (Ch):
1 through 8
Linguistic attributes (Language):

The time map (TMAP) is a table holding information for each VOBU, including the number of VOBUs (Number) in the VOB, and VOBU information for each of the VOBUs (VOBU#1 through VOBU#n). Each VOBU data includes a reproduction duration length (Duration) and a data size for the VOBU (Size).

Figure 14:
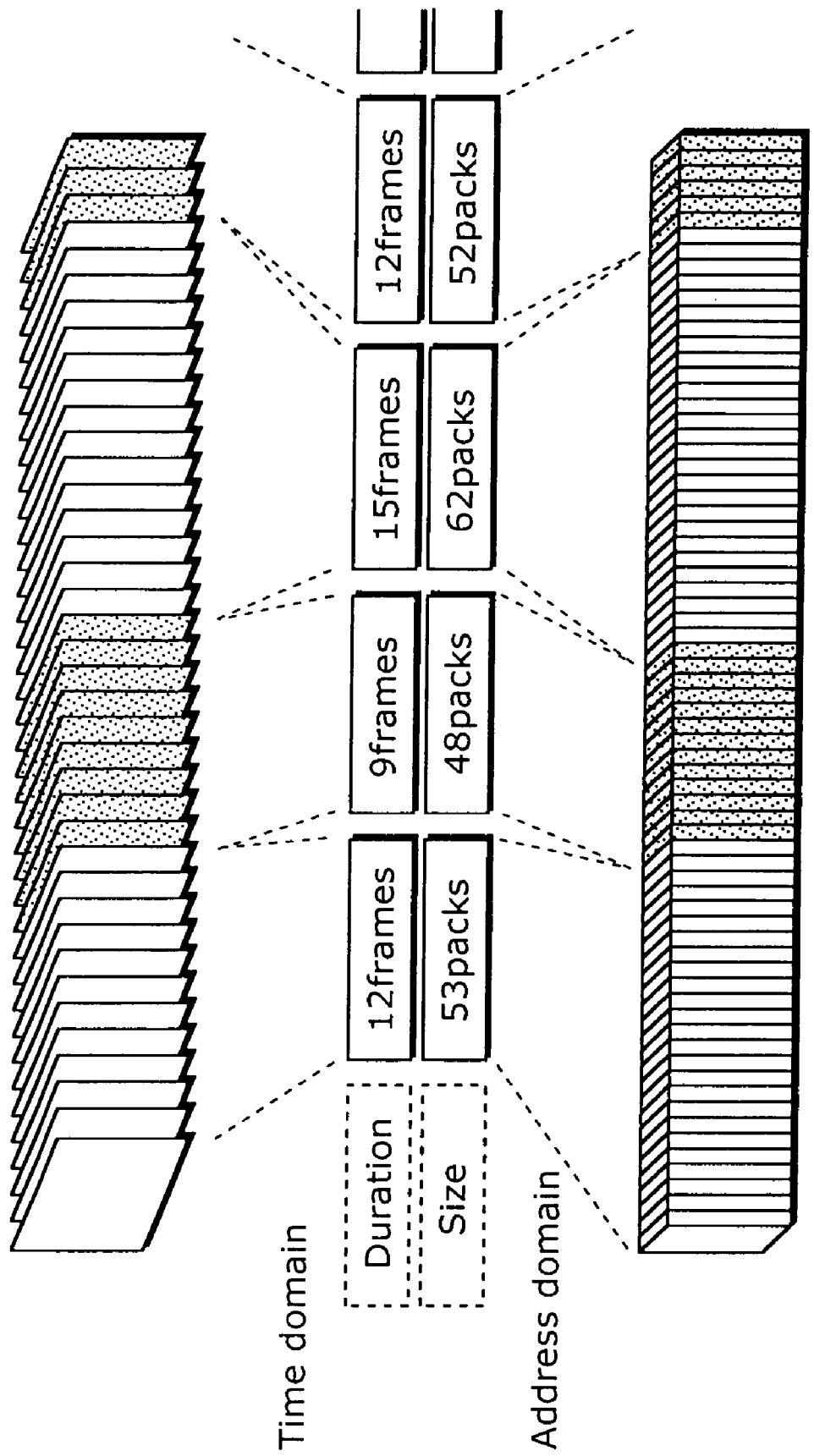
FIG. 14 is a diagram for describing VOBU information in detail.

FIG. 14 is a diagram for describing VOBU information in detail.

As is widely known, MPEG streams are sometimes compressed at a variable bit rate, and therefore there is no simple correlation between the reproduction duration of each frame and its data size. In contrast, since AC3, a compression standard for audio, defines that audio data should be compressed at a fixed bit rate, the relationship between duration and each address can be represented by a linear expression for audio data. The display duration of each frame in MPEG video data is fixed. For example, the display duration of one frame in MPEG video data which supports NTSC is 1/29.97 seconds, but the data size of each frame after compression greatly differs from frame to frame depending on the pictorial feature and the picture type, i.e., I/P/B picture, of each frame. Thus, for MPEG video data, it is impossible to represent a relationship between duration and each address using a linear expression.

As a matter of fact, it is impossible to represent the relationship between the display duration and each data size by a linear equation for an MPEG system stream, i.e., a VOB, in which MPEG video data is multiplexed. In a VOB, a duration and an address are associated with each other in a time map (TMAP). As shown in FIG. 14, a time map (TMAP) is a table that holds, as its entry, the number of frames in a VOBU and the number of packs in the VOBU (i.e., data size) per VOBU.

Figure 15:
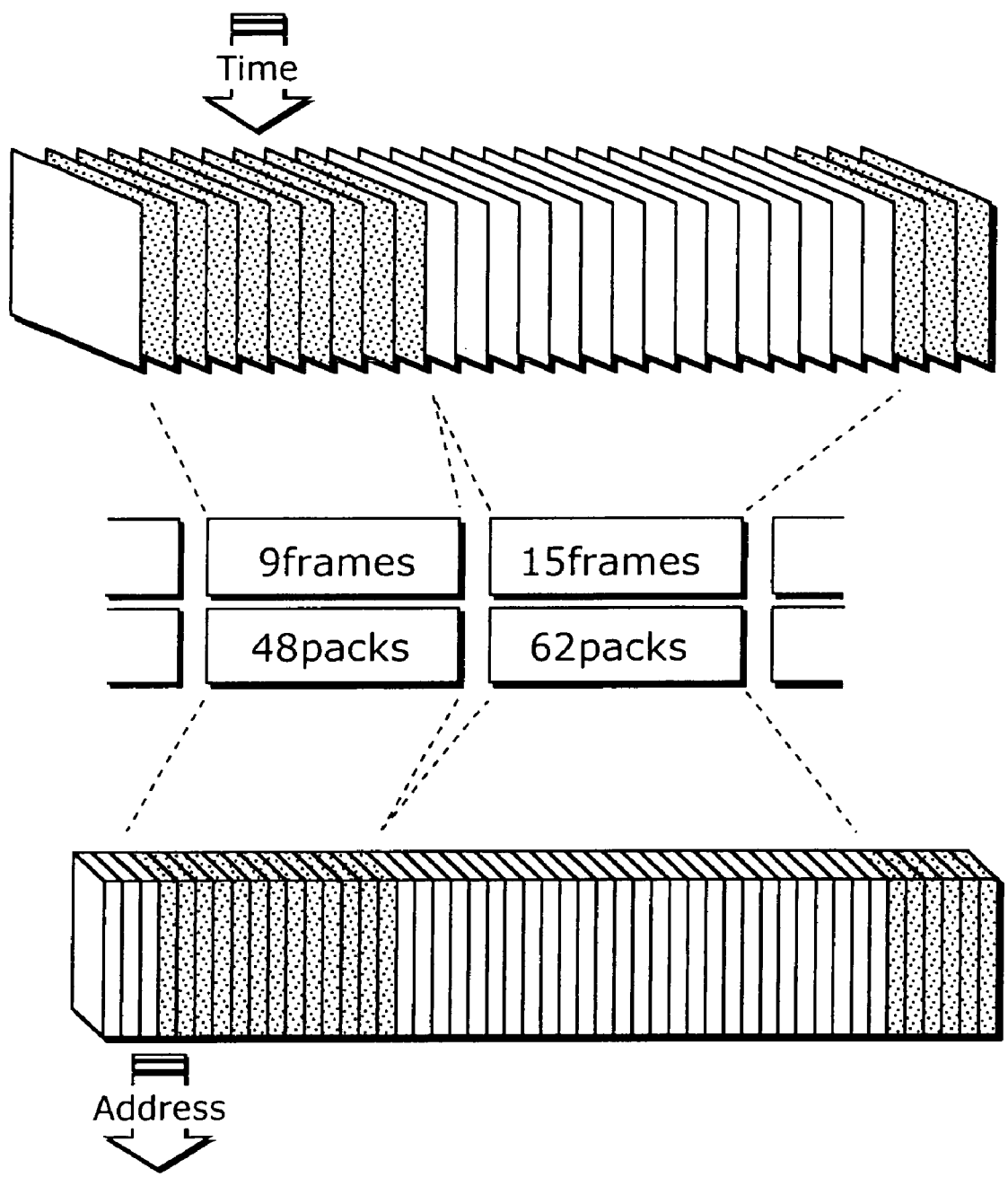
FIG. 15 is a diagram which shows the details of a time map.

Using FIG. 15, a time map (TMAP) is described in detail.

As shown in FIG. 15, when time information is provided, the VOBU to which that time information belongs is first searched for. More specifically, the number of frames in each VOBU in the time map is added up, and a VOBU is searched for which includes a frame corresponding to the number of frames equal to or greater than the number of frames that is obtained by converting the above-provided time into the number of frames. Next, the data sizes of each VOBU in the time map up are added up until a VOBU directly preceding the VOBU that has been searched for. The value obtained by the addition is used to find the address of a pack to be read out so as to reproduce frames within the above-provided time.

Figure 16:
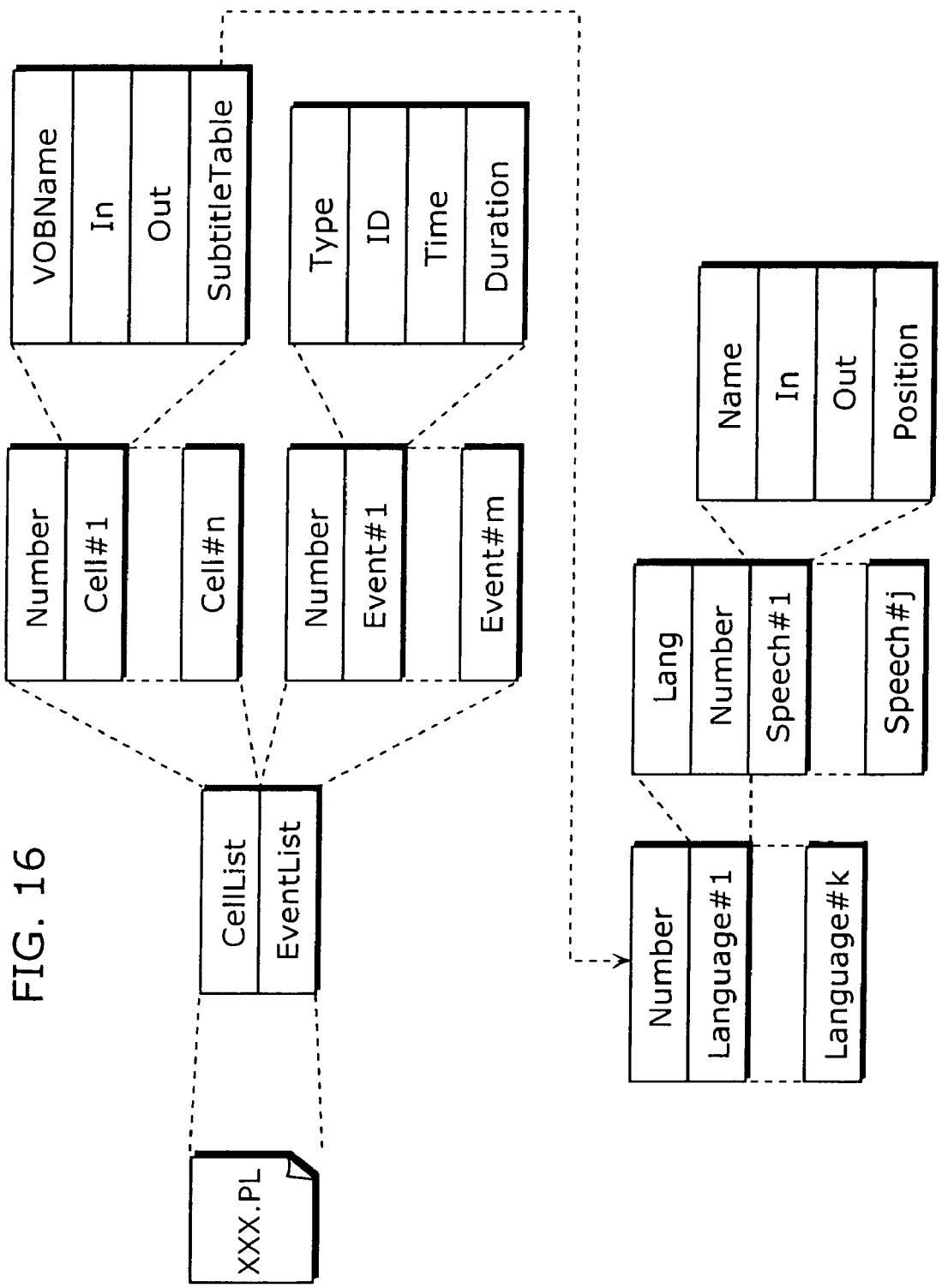
FIG. 16 is a diagram which shows an internal structure of play list information.

Next, using FIG. 16, an internal structure of play list information ("XXX. PL") is described.

The play list information is made up of a cell list (Celllist) and an event list (EventList).

The cell list (Celllist) is a sequence of cells to be reproduced in the play list, and the cells are reproduced in the order of notation in the cell list. The cell list (Celllist) is made up of the number of cells (Number) and cell information for each of the cells (Cell#1 through Cell#n).

Cell information (Cell#) includes a VOB filename (VOBName), a start time (In) and an end time (Out) within the VOB, and a subtitle table (SubtitleTable). The start time (In) and the end time (Out) are each represented by a frame number in the VOB, and it is possible to obtain the address of the VOB data needed for reproduction, using the above-described time map (TMAP).

The subtitle table (SubtitleTable) is a table that holds information about subtitles to be reproduced in synchronization with the VOB. Since the VOB can have subtitles in plural languages as in the case of audio, the subtitle table (SubtitleTable) includes the number of languages (Number), which is followed by tables for each language (Language#1 through Language#k).

The table for each language (Language#) is made up of language information (Lang), the number of subtitle information pieces to be individually displayed (Number), and subtitle information pieces to be individually displayed (Speech#1 through Speech#j). Each subtitle information piece (Speech#) is made up of: the filename of the corresponding image data (Name); the display start time (In) of the subtitles and the display end time (Out) of the subtitles, as well as a display position of the subtitles (Position).

The event list (EventList) is a table that defines events that occur in the play list. The event list includes the number of events (Number), which is followed by individual events (Event#1 to Event#m). Each event (Event#) is made up of a type of the event (Type), an identifier for the event (ID), a time at which the event occurs (Time), and a validity period for the event (Duration).

Figure 17:
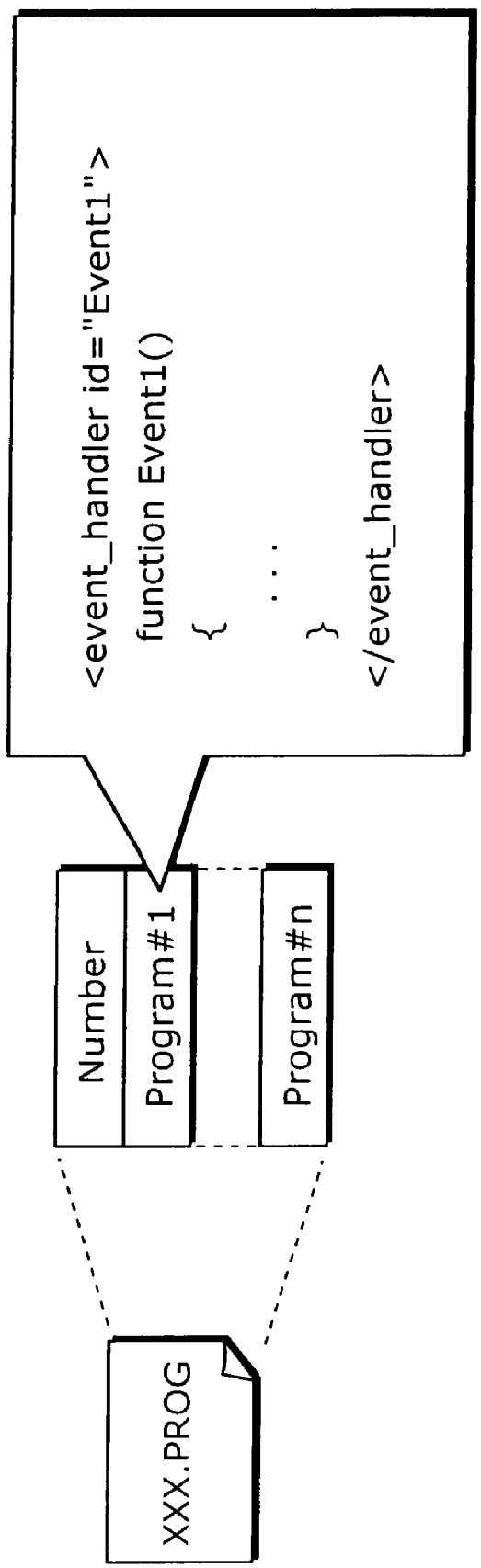
FIG. 17 is a diagram which shows an event handler table.

FIG. 17 is a diagram which shows an event handler table ("XXX. PROG") that holds event handlers (a user event, a time event and a user event for menu selection) for each play list.

The event handler table holds the number of event handlers/programs defined (Number), and individual event handlers/programs (Program#1 through Program#n). Each event handler/program (Program#) includes a definition for the start of the event handler (<event_handler> tag) and an identifier for the event handler (ID) that is paired with the identifier for the event described above. Afterwards, the program is described in the brackets { } that follows Function. The events (Event#1 through Event#m) stored in the above-described event list (EventList) in "XXX. PL" are identified using the identifiers (IDs) of the corresponding event handlers in "XXX. PROG".

Figure 18:
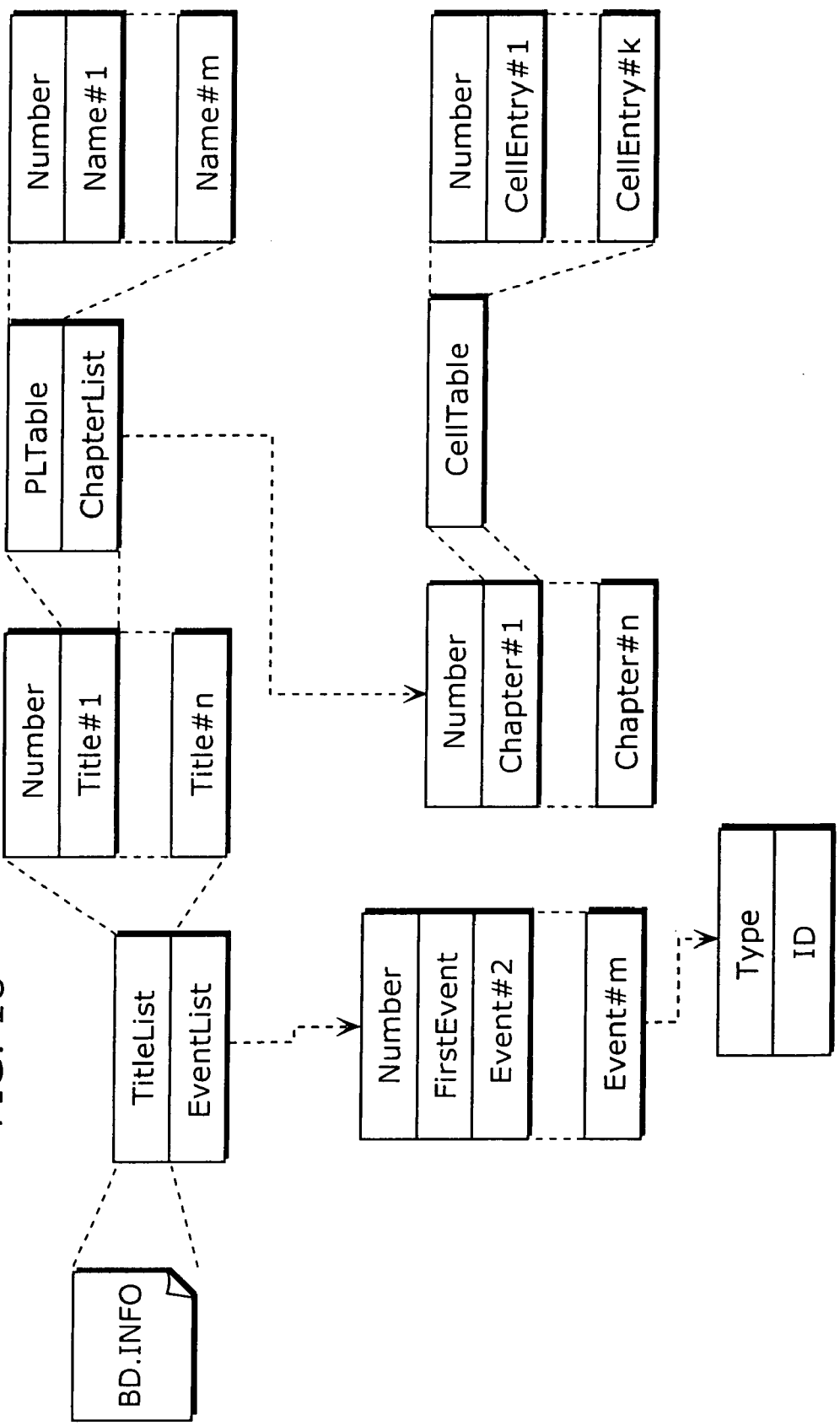
FIG. 18 is a diagram which shows an internal structure of information related to the entire BD disc.

Next, using FIG. 18, a description is given of an internal structure of information related to the entire BD disc ("BD. INFO").

The information related to the entire BD disc is made up of a title list (TitleList) and an event table (EventList) for global events.

The title list (TitleList) includes the number of titles in the disc (Number), which is followed by title information for each of the titles (Title#1 through Title#n). Each title information (Title#) includes a play list table (PLTable) which includes the titles and a chapter list (Chapterlist) which holds the chapters in the title. The play list table (PLTable) includes the number of play lists in the title (Number) and the play list names (Name), i.e., the filenames of each play list.

The chapter list (Chapterlist) is made up of the number of chapters included in the title (Number) and chapter information for each of the chapters (Chapter#1 through Chapter#n). Each chapter information (Chapter#) includes a cell table (CellTable) which holds the cells included in the chapter. The cell table (CellTable) is made up of the number of cells (Number) and cell entry information for each of the cells (CellEntry#1 to CellEntry#k). Each cell entry information (CellEntry#) is made up of the name of the play list that includes the cell, and the cell number in the play list.

The event list (EventList) includes a number of global events (Number), and information about each of the global events. What should be noted here is that the first defined global event is referred to as a first event (FirstEvent), and the event is first read out when the BD disc is inserted into the player. Event information for a global event includes only the type of the event (Type), and the identifier for the event (ID).

Figure 19:
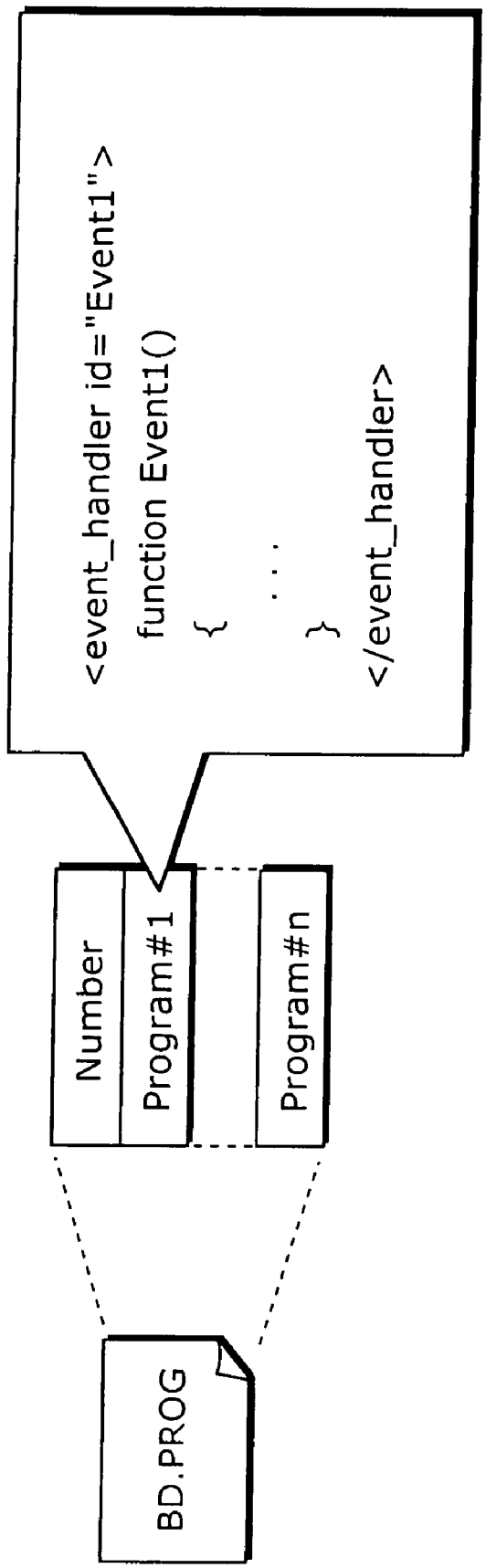
FIG. 19 is a diagram which shows a table holding the programs of global event handlers.

FIG. 19 is a diagram which shows a table ("BD. PROG") that holds global event handlers programs.

The contents of this table are the same as the contents of the event handler table described using FIG. 17.

(Event Generation Mechanism)

Figure 20:
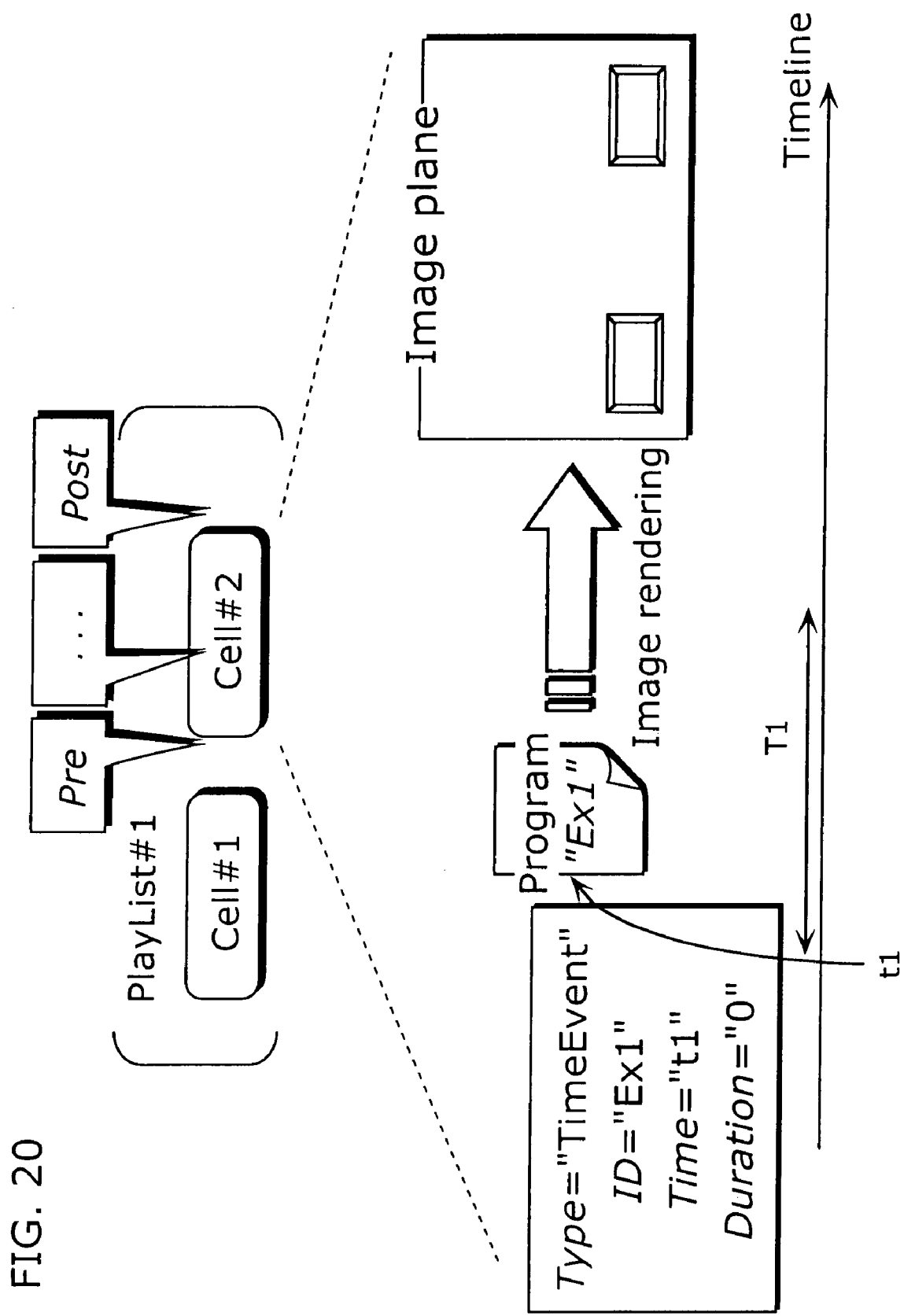
FIG. 20 is a diagram which shows an example of a time event.
Figure 21:
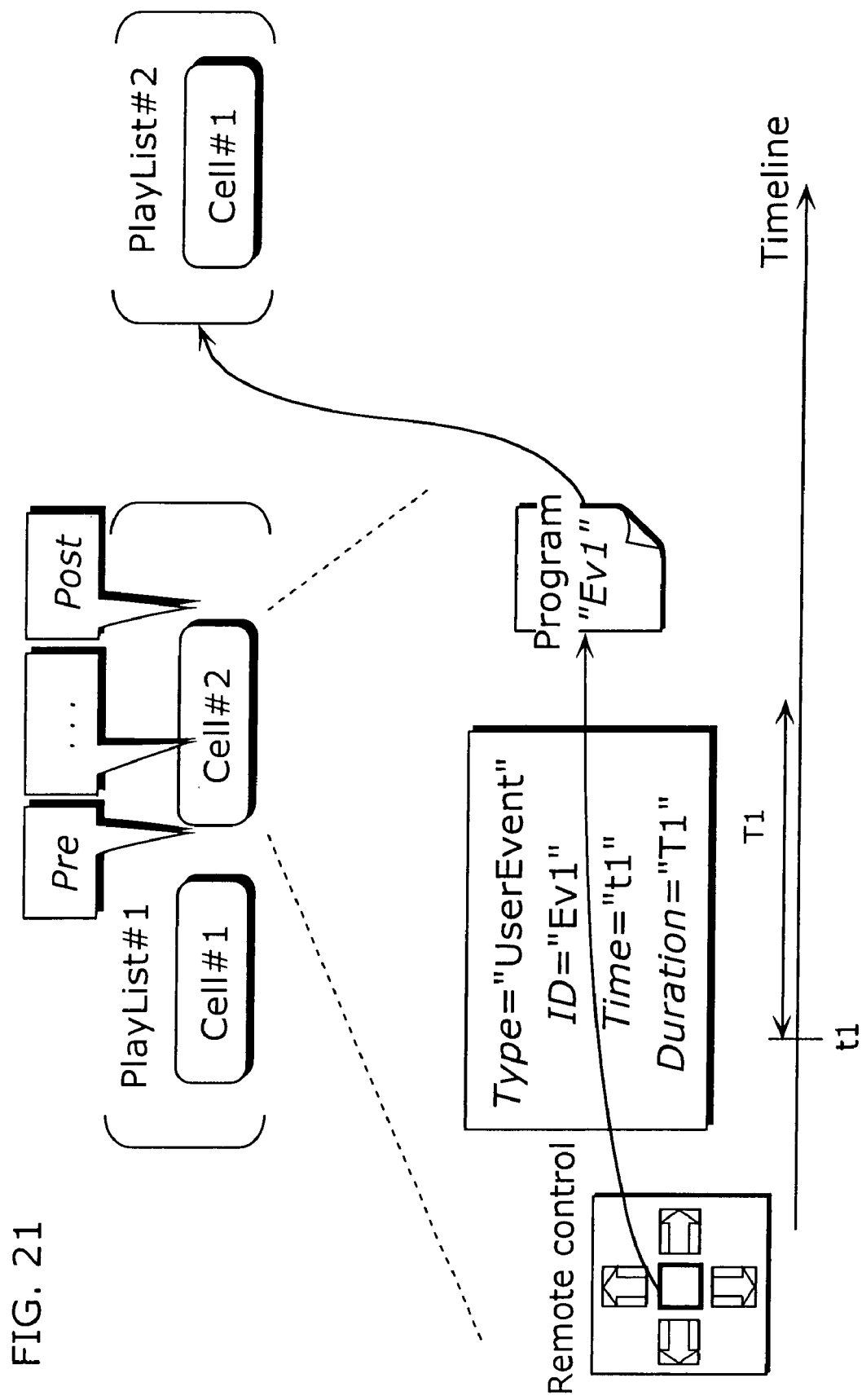
FIG. 21 is a diagram which shows an example of a user event.
Figure 22:
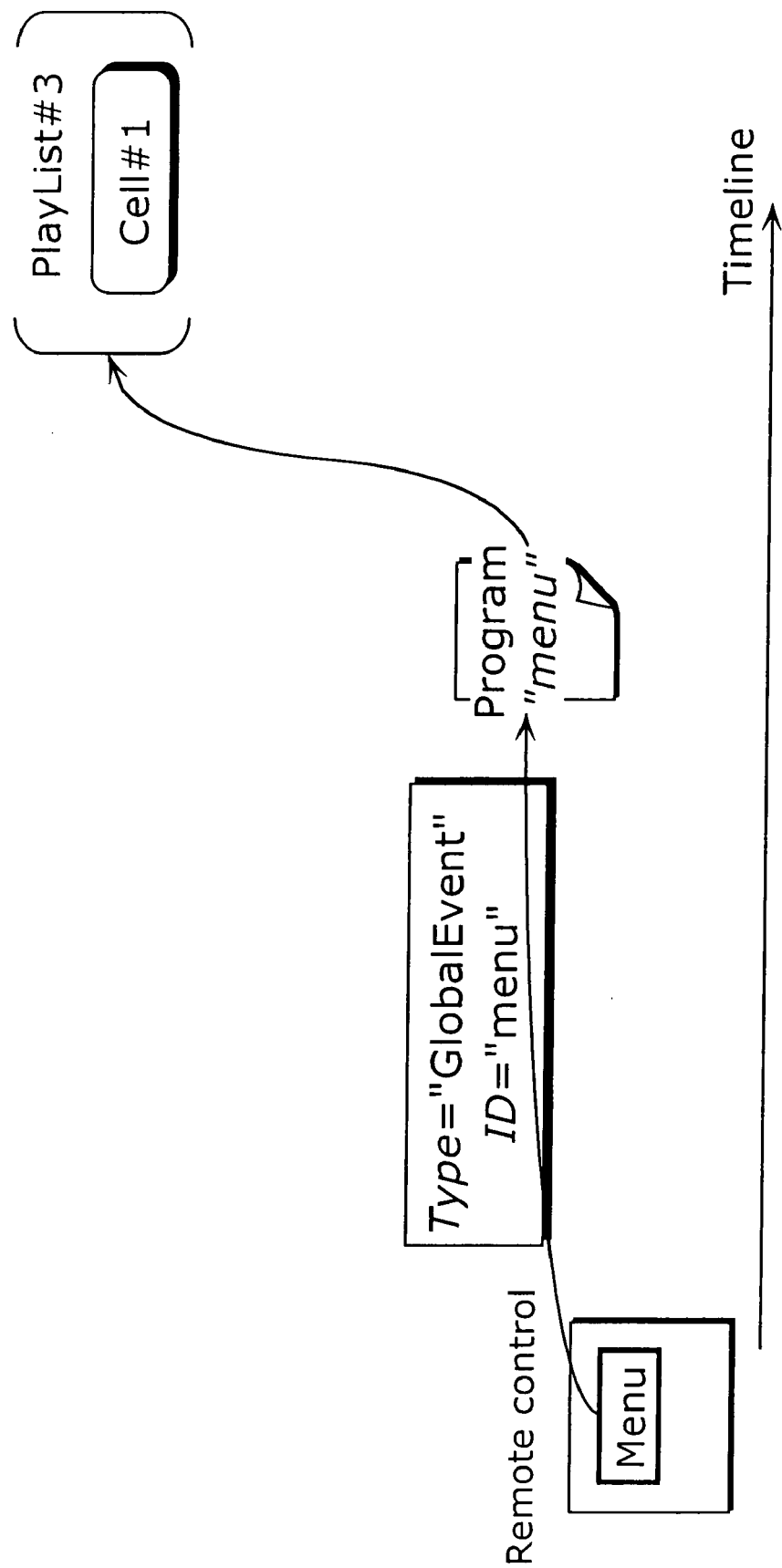
FIG. 22 is a diagram which shows an example of a global event.

A mechanism for event occurrence is described using FIG. 20 through FIG. 22.

FIG. 20 is a diagram that shows an example of a time event.

As has been described above, a time event is defined in the event list (EventList) in the play list information ("XXX. PL"). In the case where an event is defined as a time event, i.e., when an event type (Type) of an event is "TimeEvent", a time event with the identifier "Ex1" is outputted to the program processor from the scenario processor at the time of event generation ("t1"). The program processor searches for an event handler with the event identifier "EX1", and executes the target event handler. For example, an event such as the rendering of two button images is performed in the present embodiment.

FIG. 21 is a diagram which shows an example of a user event for a menu operation.

As has been described above, a user event for a menu operation is also defined in the event list (EventList) in the play list information ("XXX. PL"). In the case where an event is defined as a user event, i.e., an event whose event type (Type) is "UserEvent", the user event becomes ready at the event generation time ("t1"). At this time, the event itself has not yet been generated. This event is in a ready state during the period indicated by its validity period information (Duration).

As shown in FIG. 21, when the user presses the Up/Down/Right/Left key or the "Determination" key on the remote control, the UOP manager first generates a UOP event, and then outputs it to the program processor. The program processor outputs the UOP event to the scenario processor. The scenario processor checks whether or not there exists any user event that is valid at the time of receiving the UOP event. In the case where a valid user event exists, the scenario processor generates a user event, and outputs it to the program processor. The program processor searches for an event handler with the event identifier "Ev1", and executes the target event handler. For example, in the present embodiment, the reproduction of the play list #2 is started.

The generated user event does not include information for identifying which one of the remote control keys the user has pressed. Information about the remote control key selected is notified to the program processor by the UOP event, and stored into the register SPRM(8) of the virtual player. By checking the value of the register, it is possible to perform branch processing on the program in the event handler.

FIG. 22 is a diagram that shows an example of a global event.

As has been described above, a global event is defined in the event list (EventList) of information related to the entire BD disc ("BD. INFO"). When an event is defined as a global event, i.e., an event whose event type (Type) is "GlobalEvent", the event is generated only when the user has performed a remote control key operation.

When the user presses the "Menu" key, the UOP manager first generates a UOP event, then outputs it to the program processor. The program processor outputs the UOP event to the scenario processor, and the scenario processor then generates a global event corresponding to the UOP event, and sends it to the program processor. The program processor searches for an event handler that has the event identifier "menu", and executes the target event handler. For example, in the present embodiment, the reproduction of the play list #3 is started.

The number of "Menu" keys is assumed to be one in the present embodiment, but there may be plural menu keys as in the case of a remote control for a DVD recorder. In that case, an identifier corresponding to each menu key is defined.

(Virtual Play Machine)

Figure 23:
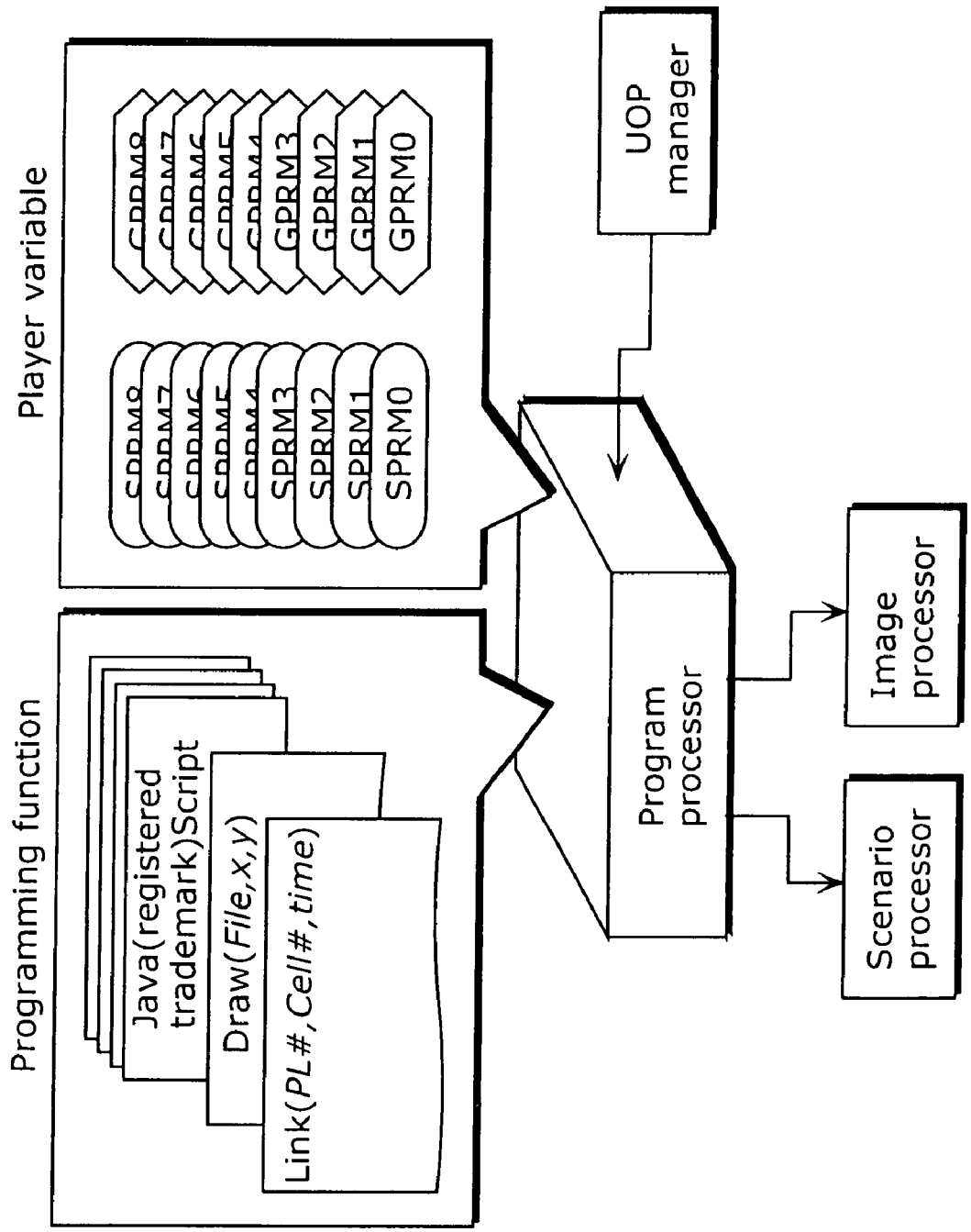
FIG. 23 is a diagram for describing the functions of a program processor.

Functions of the program processor are described using FIG. 23.

The program processor is a processing module with a virtual player machine within. The virtual player machine is functional for supporting BDs, and does not depend on the implementation of a BD player. In other words, the virtual player machine is guaranteed to be able to realize the same function regardless which BD player is used.

The virtual player machine has programming functions and player variables (registers). Among the programming functions, the two functions described below are defined as BD eigen functions based on Java® Script:

Link function: stop the current reproduction and start the reproduction starting from a specified play list, cell, or time.

Link (PL#, Cell#, time)

PL#: Play list name

CL#: Cell number

Time: Reproduction start time inside the cell

PNG rendering function: render specified PNG data onto the image plane

Draw (File, X, Y)

File: PNG filename

X: Position on the X coordinate

Y: Position on the Y coordinate

Image plane clear function: clear a specified area on the image plane Clear (X, Y, W, H)

X: Position on the X coordinate

Y: Position on the Y coordinate

W: Width in the X direction

H: Height in the Y direction

Player variables include system parameters (SPRMs) indicating the status of the player, and general parameters (GPRMs) that can be used for general purposes.

FIG. 24 is a diagram that shows a list of system parameters (SPRMs).

SPRM (0): Language code

SPRM (1): Audio stream

SPRM (2): Subtitle stream number

SPRM (3): Angle number

SPRM (4): Title number

SPRM (5): Chapter number

SPRM (6): Program number

SPRM (7): Cell number

SPRM (8): Selection key information

SPRM (9): Navigation timer

SPRM (10): Reproduction duration information

SPRM (11): Player audio mixing mode for Karaoke

SPRM (12): National information for parents

SPRM (13): Parental level

SPRM (14): Player configuration (video)

SPRM (15): Player configuration (audio)

SPRM (16): Language code for audio stream

SPRM (17): Language code for audio stream (extension)

SPRM (18): Language code for subtitle stream

SPRM (19): Language code for subtitle stream (extension)

SPRM (20): Player region code
SPRM (21): Reserved
SPRM (22): Reserved
SPRM (23): Reproduction status
SPRM (24): Reserved
SPRM (25): Reserved
SPRM (26): Reserved
SPRM (27): Reserved
SPRM (28): Reserved
SPRM (29): Reserved
SPRM (30): Reserved
SPRM (31): Reserved Note that the programming functions are defined in the present embodiment based on Java® Script, but these programming functions may be defined by B-Shell and Perl Script, which are used in UNIX® OSs and the like. In other words, the programming functions are not limited to the use of Java® Script for their definitions.

(Program Example)

Figure 25:
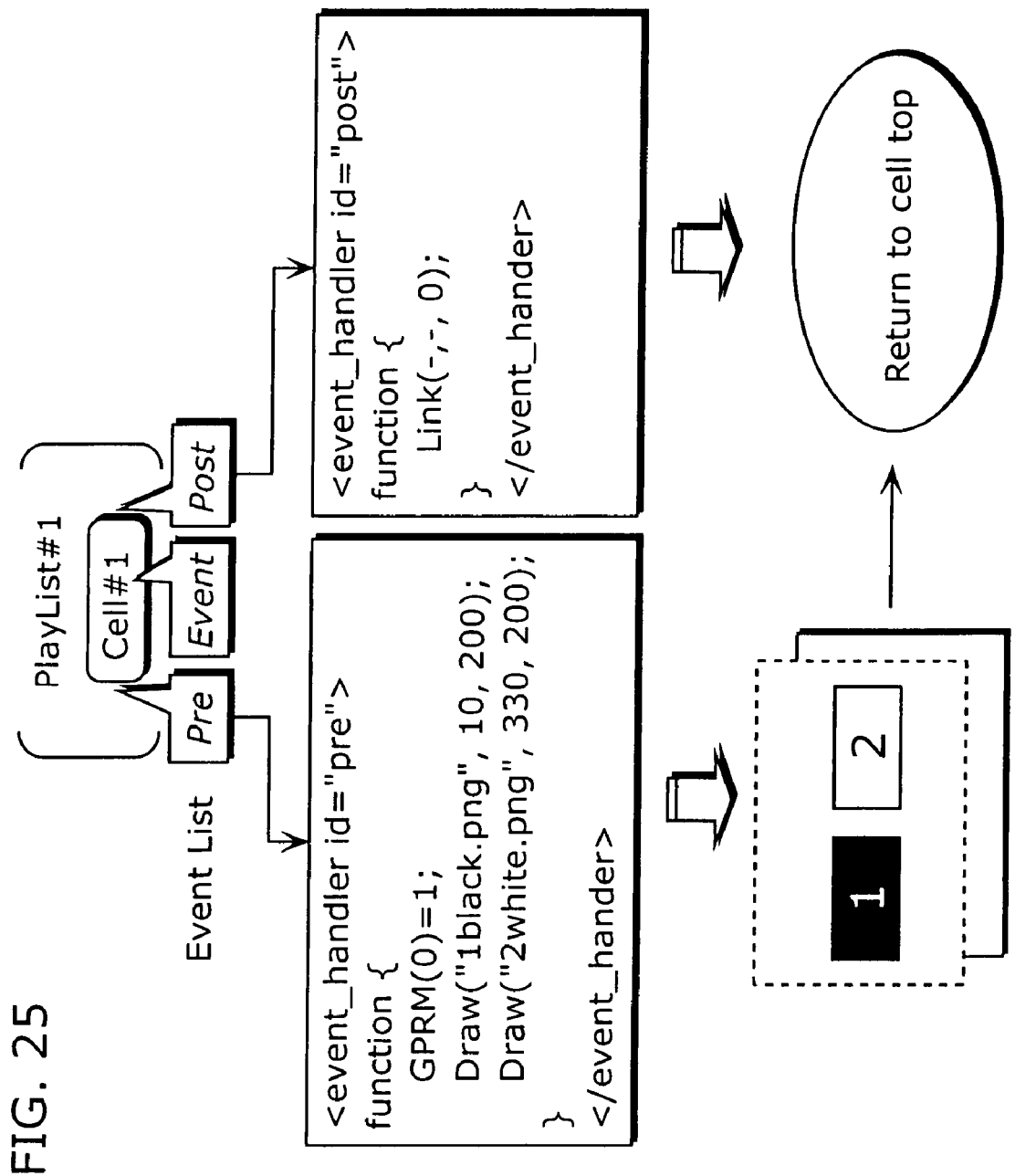
FIG. 25 is a diagram which shows an example of a menu program having two selection buttons.
Figure 26:
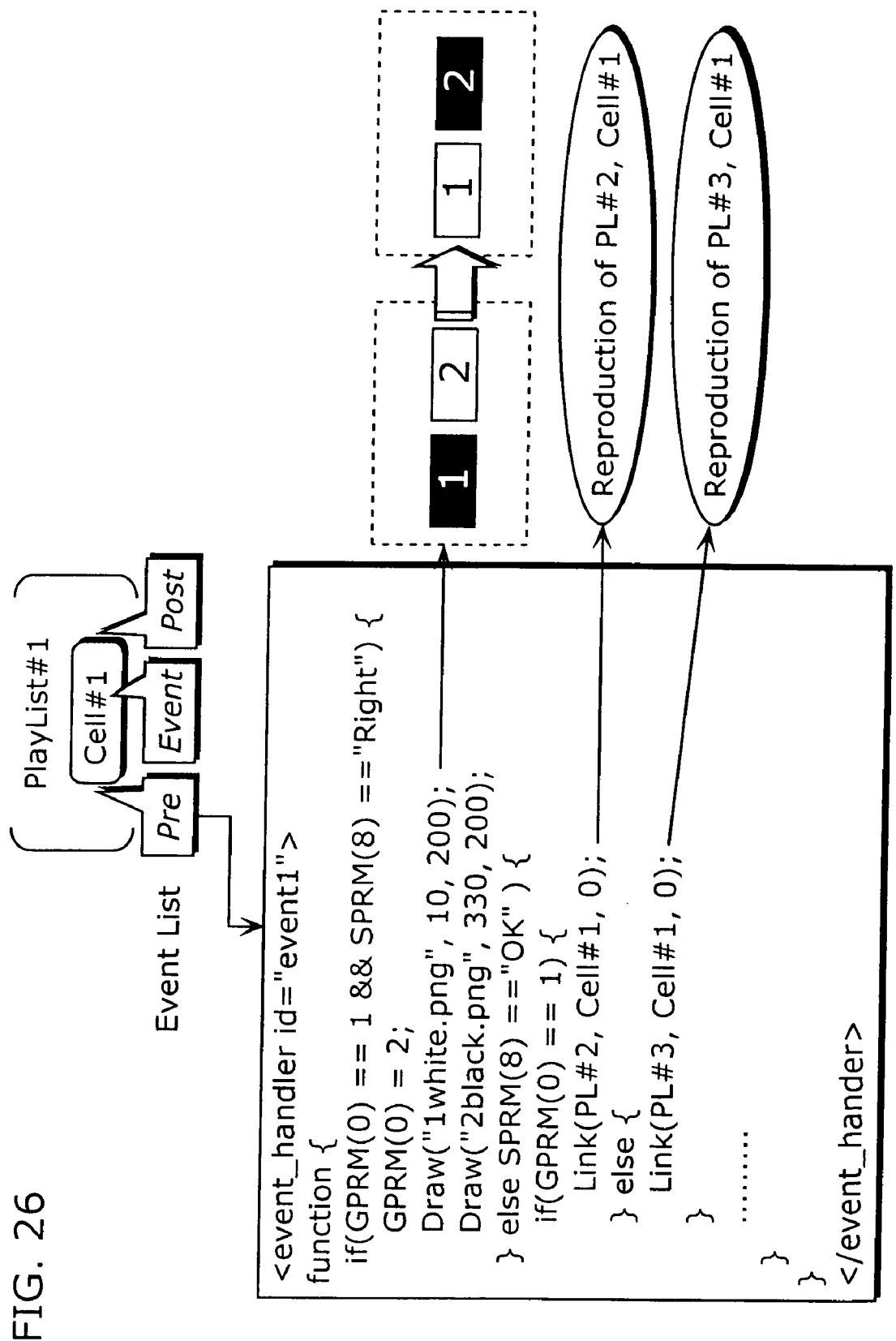
FIG. 26 is a diagram which shows an example of an event handler for a user event.

FIG. 25 and FIG. 26 are diagrams which show examples of programs in event handlers.

FIG. 25 is a diagram which shows an example of a menu program with two selection buttons.

The program illustrated on the left side of FIG. 25 is executed based on the top time event of the cell (Play list#1.Cell#1). "1" is set to one of the general parameters, GPRM(0). GPRM(0) is used in the program to identify the selected button. The button 1 located on the left is selected in the initial state (a default value).

Next, using the rendering function Draw, a PNG image for the button 1 and the button 2 is rendered respectively. The button 1 is formed by rendering the PNG image "1black. png" in an area extending from a starting point (at the upper left corner) at the coordinates (10, 200). The button 2 is formed by rendering the PNG image "2white. png" in an area extending from a starting point (upper left corner) at the coordinates (330, 200).

Then, the program illustrated on the right of FIG. 25 is executed using the last time event of the current cell. In this program, it is specified that the cell should be reproduced again from the top using the Link function.

FIG. 26 is a diagram that shows an example of an event handler for a user event in menu selection.

Programs corresponding to the respective keys, for when the "Left" key, "Right" key, and "Determination" key are pressed, are described in the event handler. As has been described with reference to FIG. 21, when the user presses a remote control key, a user event is generated, and then the event handler shown in FIG. 26 starts up. For the event handler, branch processing is performed using the value for GPRM(0), which identifies the selected button, and SPRM (8), which is used for identifying the selected remote control key.

Condition 1) When button 1 is selected and the selected key is the "right" key, GPRM(0) is reset to "2" so as to change the currently selected button to the button 2 on the right, the images of the respective button 1 and button 2 are re-rendered respectively.

Condition 2) When the "Determination (OK)" key is selected, and the button 1 is selected, the reproduction of play list #2 is started.

Condition 3) When the "Determination (OK)" key is selected, and the button 2 is selected, the reproduction of play list #3 is started, branch processing is performed as above.

(Player Processing Flow)

Next, using FIG. 27 through FIG. 30, the flow of processes performed by the player is described.

Figure 27:
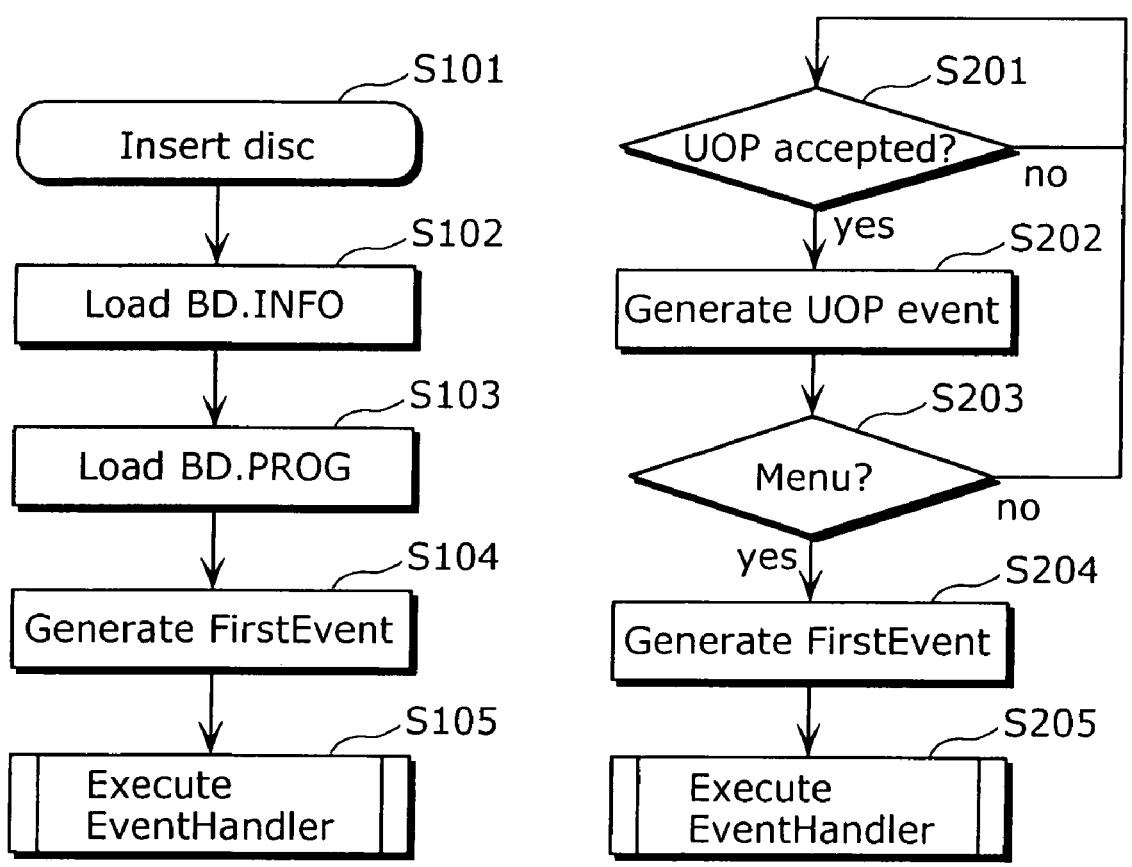
FIG. 27 is a diagram which shows the flow of basic processes up until the reproduction of AV data.

FIG. 27 is a diagram which shows the flow of basic processes until the AV data is reproduced.

When the BD disc is inserted (S101), the BD player loads and analyzes the "BD. INFO" file (S102), and then loads the "BD. PROG" file (S103). The "BD. INFO" file and the "BD. PROG" file are both stored in the management information storage memory temporarily, and analyzed by the scenario processor.

Next, the scenario processor generates a first event according to the first event (FirstEvent) information in the "BD. INFO" file (S104). The program processor receives the first event that is generated, and executes an event handler corresponding to the event (S105).

It is expected that the play list information that should be reproduced first is stored in the event handler corresponding to the first event. If there is no instruction to reproduce a play list, the player keeps waiting for a user event without reproducing anything (S201). When the BD player accepts an instruction from the user operating the remote control, the UOP manager causes the program manager to start executing the UOP event (S202).

The program manager judges whether or not the UOP event is a menu key event (S203). When the UOP event is a menu key event, the program manager outputs the UOP event to the scenario processor, and the scenario processor then generates a user event (S204). The program processor executes an event handler corresponding to the generated user event (S205).

Figure 28:
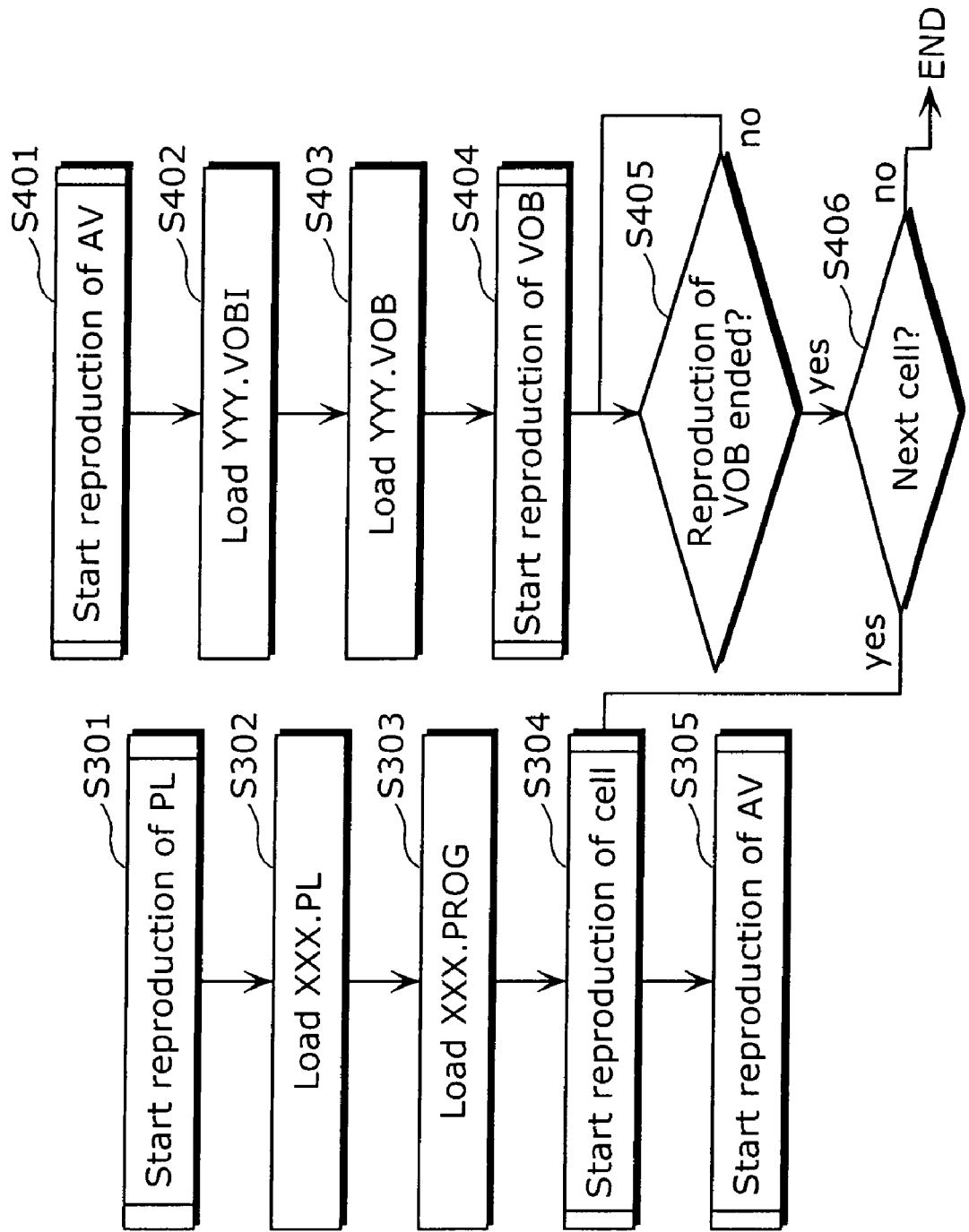
FIG. 28 is a diagram which shows the flow of processes from the start of reproduction of a PL to the start of reproduction of a VOB.

FIG. 28 is a diagram which shows the flow of processes from the start of the reproduction of a PL to the reproduction of a VOB.

As has been described above, reproduction of the play list is started by a first event handler or a global event handler (S301). The scenario processor loads and analyzes the play list information "XXX. PL" as information required to reproduce the target play list (S302), and loads the program information "XXX. PROG" corresponding to the play list (S303). Then, the scenario processor issues an instruction for the reproduction of a cell based on the cell information registered in the play list (S304). Since the reproduction of the cell means that there is a request from the scenario processor to the presentation controller, the presentation controller starts the reproduction of the AV data (S305).

When reproduction of the AV data starts (S401), the presentation controller loads and analyzes the information file (XXX. VOBI) of the VOB corresponding to the cell to be reproduced (S402).

The presentation controller identifies the VOBU to be reproduced and the address of the VOBU using the time map, notifies the address to the drive controller, and the drive controller then reads out the target VOB data (S403). Accordingly, the VOB data is sent to the decoders, and the reproduction of the data starts (S404).

The reproduction of the VOB continues until the end of the reproduction segments of the VOB is reached (S405), which is followed by shifting reproduction to the next cell (S304). If there is no cell that follows, the reproduction stops (S406).

FIG. 29 is a diagram which shows the flow of event processes after the reproduction of the AV data starts.

The BD player is an event-driven player. When the reproduction of a play list starts, event processes for time events, user events, and subtitle displays are invoked respectively, and event processes are executed in parallel with them.

Processes in the S500s are time event processes.

After the reproduction of the play list starts (S501) and a step is performed for checking whether or not the reproduction of the play list has ended (S502), the scenario processor checks whether or not the time at which the event occurs has been reached (S503). When the time at which the event occurs has been reached, the scenario processor generates a time event (S504), and the program processor receives the time event and executes the corresponding event handler (S505).

The process returns to Step S502, and the above-described processes are repeated when the time at which the event occurs has not been reached in Step S503 and after the event handler has been executed in Step S504. Meanwhile, in the case where the result of the check in Step S502 is that the reproduction of the play list has ended, the time event processes are forcefully terminated.

Processes in the S600s are user event processes.

After the reproduction of the play list starts (S601) and a step of checking whether or not the reproduction of the play list has ended has been performed (S602), the process proceeds to a step for checking whether or not a UOP has been accepted (S603). In the case where a UOP has been accepted, the UOP manager generates a UOP event (S604), and the program processor which received the UOP event checks whether or not the received UOP event is a menu call (S605). When the UOP event is a menu call, the program processor causes the scenario processor to generate an event (S607), and the program processor executes the corresponding event handler (S608).

When the UOP event is judged not to be a menu call in Step S605, this indicates that the UOP event is an event generated by operating a cursor key or the "Determination" key. In this case, the scenario processor judges whether or not the current time is within the user event validity period (S606). When the current time is within the user event validity period, the scenario processor generates a user event (S607), and the program processor executes the corresponding event handler (S608).

The process returns to Step S602 and the above-described processes are repeated when: it is determined that no UOP has been accepted in Step S603; it is judged in Step S606 that the current time is not within the user event validity period; and after the event handler is executed in Step S608. Meanwhile, in the case where it is confirmed that the reproduction of the play list has ended in Step S602, the user event processes are forcefully terminated.

Figure 30:
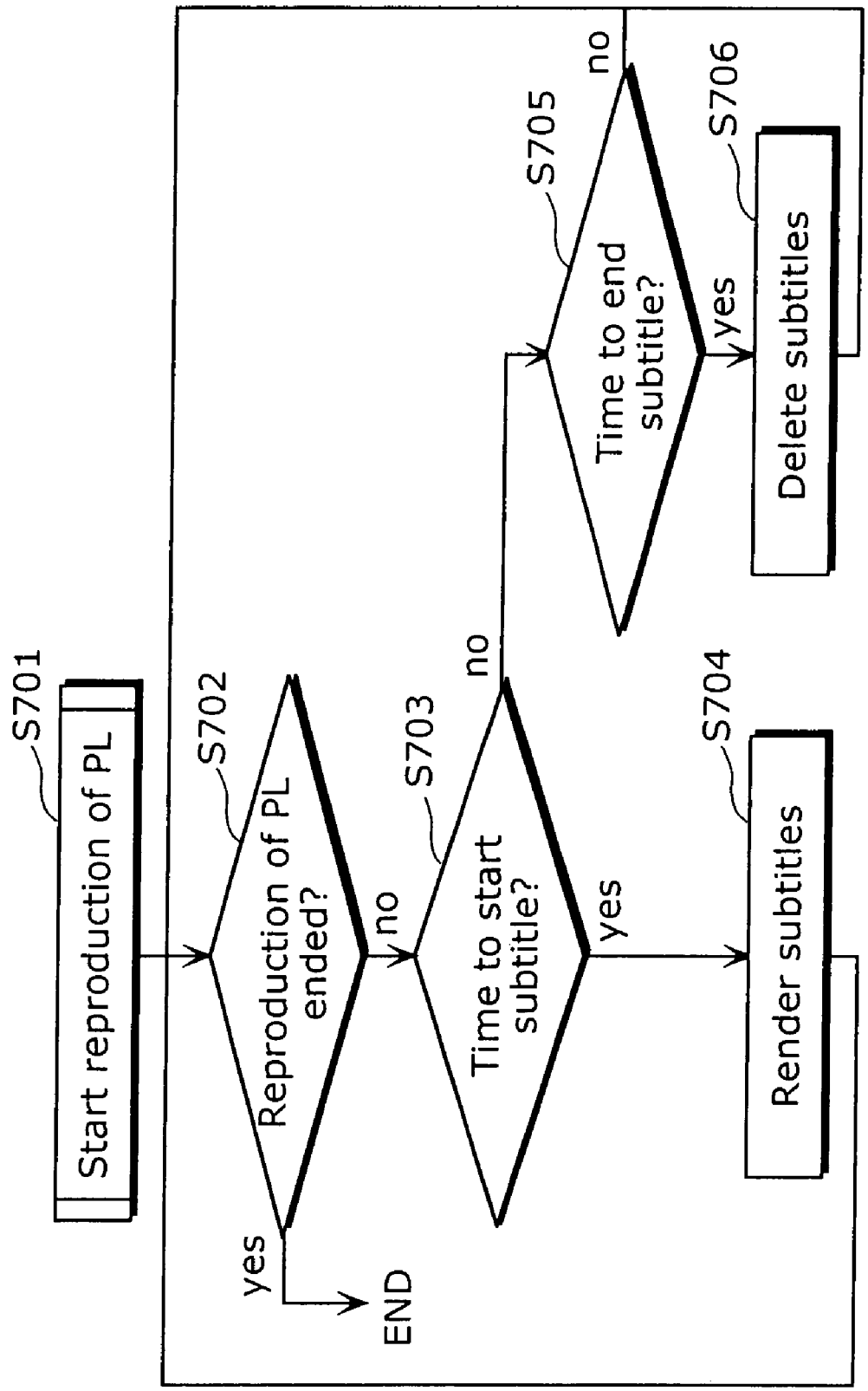
FIG. 30 is a diagram which shows the flow of subtitle processes.

FIG. 30 is a diagram which shows the flow of subtitle processes.

After the reproduction of the play list starts (S701) and a step is performed to check whether or not reproduction of the play list has ended (S702), the process proceeds to a step of checking whether or not the current time is the time to start the rendering of subtitles (S703). When the current time is the time to start the rendering of subtitles, the scenario processor instructs the presentation controller to render subtitles, and the presentation controller instructs the image processor to render subtitles (S704). When the current time is judged not to be the time for starting the rendering of subtitles in Step S703, it is then checked whether or not the current time is the time for ending display of the subtitles (5705). When the current time is judged to be the time to end the display of the subtitles, the presentation controller instructs the image processor to delete the subtitles, and the image processor deletes the subtitles rendered on the image plane (S706).

The processes returns to Step S702 and the above-described processes are repeated in the following cases: after the subtitle rendering performed in Step S704; after the subtitle deletion performed in Step S706; and when the result of the check in Step S705 is that the current time is judged not to be the time for ending display of the subtitles. Meanwhile, when it is confirmed that the reproduction of the play list has ended in Step S702, the processes related to subtitle display are forcefully terminated.

(First Embodiment)

Next, the first embodiment is described.

The first embodiment relates to the stream structure of audio data on a BD. Basically, the details of the first embodiment are based on the related embodiment described above. Therefore, the first embodiment focuses on parts extended, as well as differences, from the above-described related embodiment.

Figure 31:
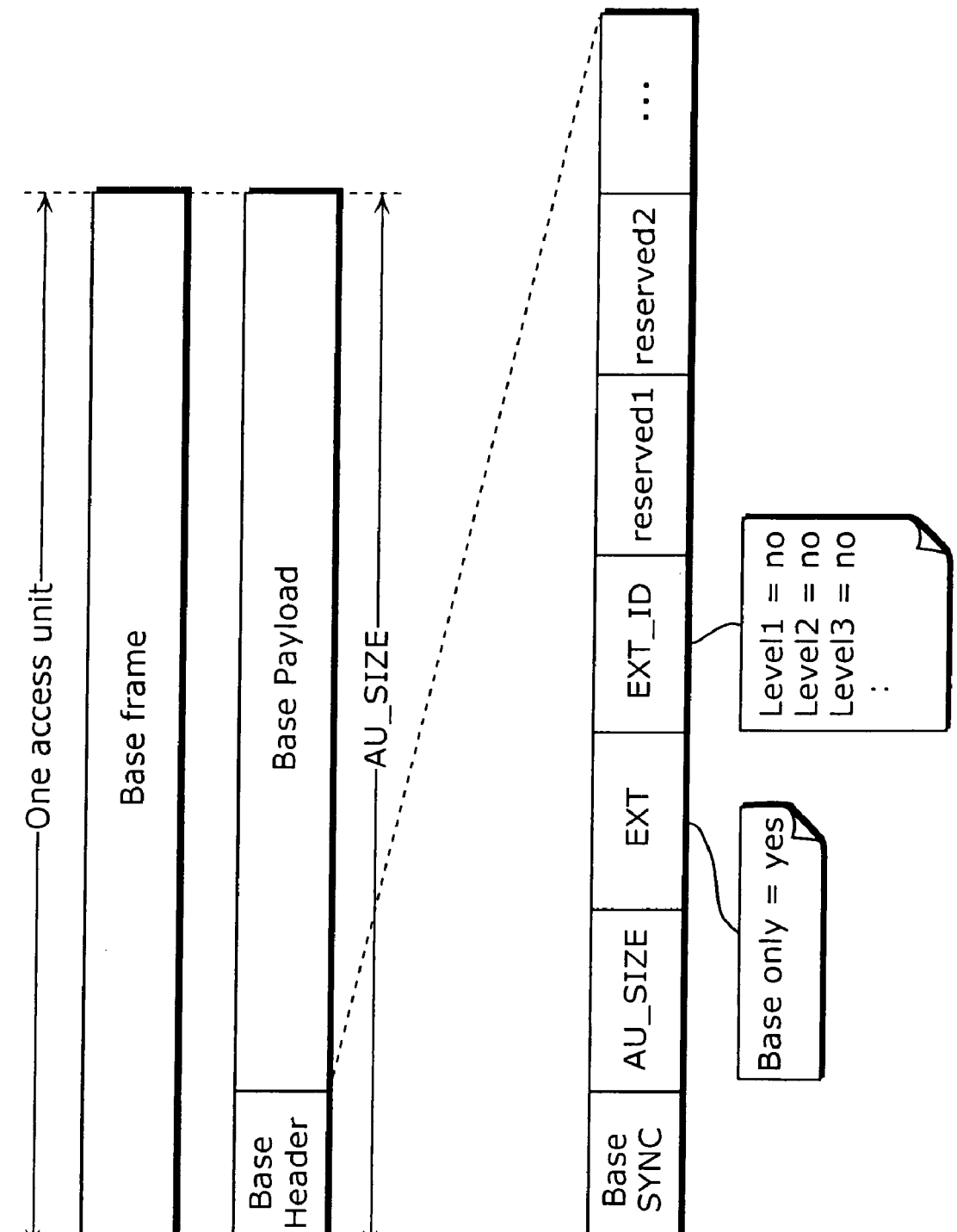
FIG. 31 is a diagram which shows the structure of an access unit without a hierarchical structure.

FIG. 31 is a diagram that shows the structure of one access unit (coding unit for decoding and reproducing video/audio information), which does not have a hierarchical structure. In MPEG-2 video, which is a video encoding mode, or in MPEG-1 audio, which is an audio coding mode, one access unit is made up of a header portion (Base Header) and a payload portion (Base Payload), as shown in FIG. 31.

The Base Header includes: Base SYNC, which is a synchronization signal for the Base frame; AU_SIZE, which indicates the data size of the access unit; EXT, which indicates whether or not this access unit is made up only of the Base frame; EXT_ID, which indicates the type of extension information added to the Base frame when the access unit is not made up of the Base frame alone; and reserved areas for future use.

The access unit shown in FIG. 31 does not have a hierarchical structure, and the entire access unit is coded using a single coding mode. This means that the entire access unit can be decoded using only one type of decoding mode.

Figure 32:
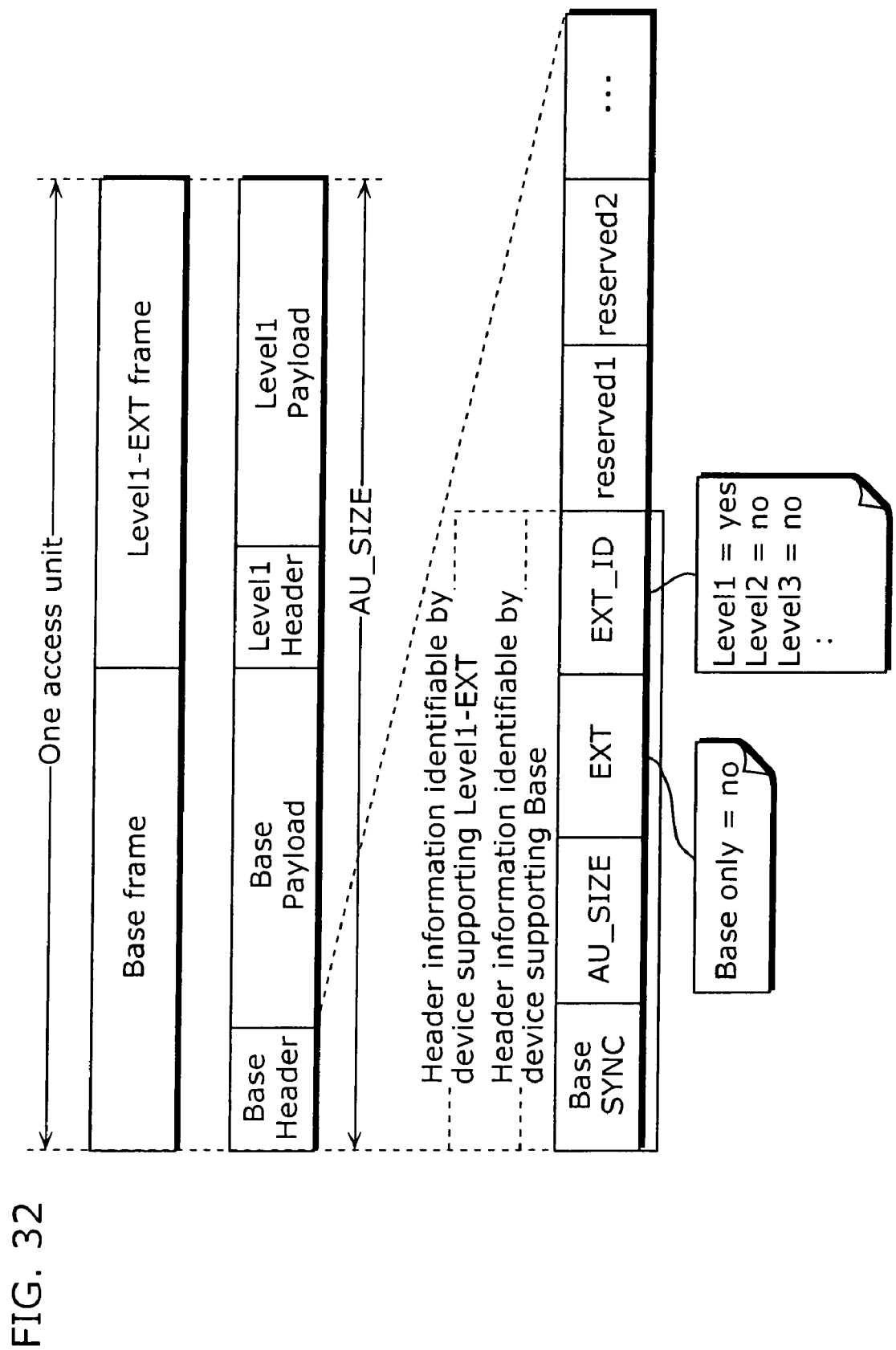
FIG. 32 is a diagram which shows the structure of an access unit with a two-layered hierarchical structure.

FIG. 32 is a diagram which shows the structure of one access unit that is formed by adding, to a Base frame, a Level1-EXT frame that includes, for example, higher quality video information or higher quality audio information that is coded using a coding mode different from the one used for the Base frame.

In the Base Header, EXT indicates that the access unit is not made up of only the Base frame, and EXT_ID indicates that the Level1 frame is coded following the Base frame, out of the other data in extension layers.

AU_SIZE indicates the size of the access unit. Using AU_SIZE, it is possible to design an access unit that allows a decoder capable of decoding only Base frames (a decoder incapable of decoding Level1-EXT frames) to appropriately decode this access unit, while ignoring Level1-EXT frame.

Thus, even when an extension portion (Level1-EXT) is newly added to the original coding unit (Base), it is possible to decode a stream made up of access units, as shown in FIG. 32, by ignoring Level1-EXT frames. It is also possible to employ new coding and compression algorithms.

Figure 33:
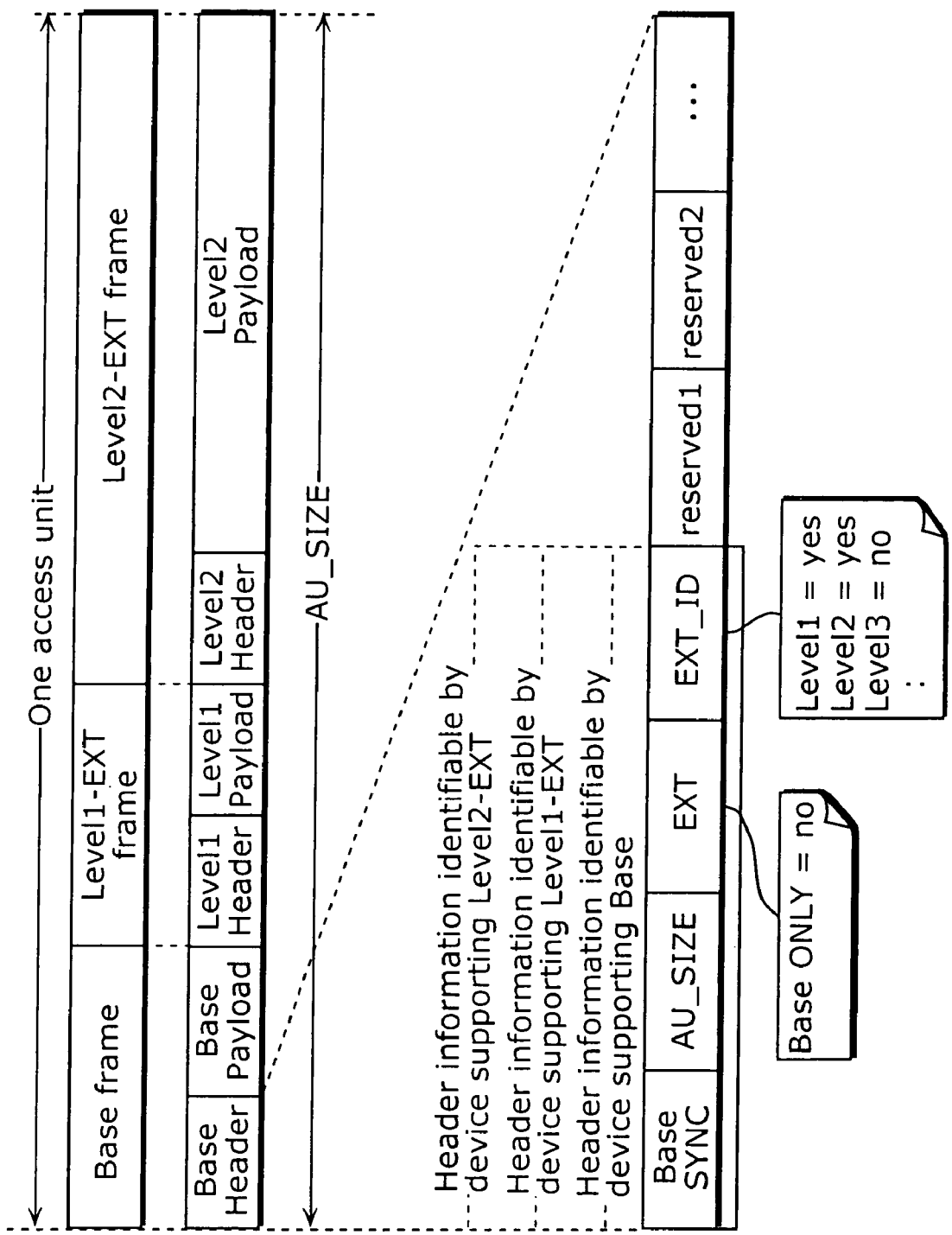
FIG. 33 is a diagram which shows the structure of an access unit with a three-layered hierarchical structure.

Similarly, FIG. 33 shows an access unit that is extended to Level2-EXT. Data in Level2-EXT frame is, for example, data that is not included in the data in Level1-EXT frame, and that is intended for obtaining audio that has a sampling rate higher than the sampling rate of the data in Level1-EXT frame.

EXT_ID is set to indicate that Level1 and Level2 exist.

Figure 34:
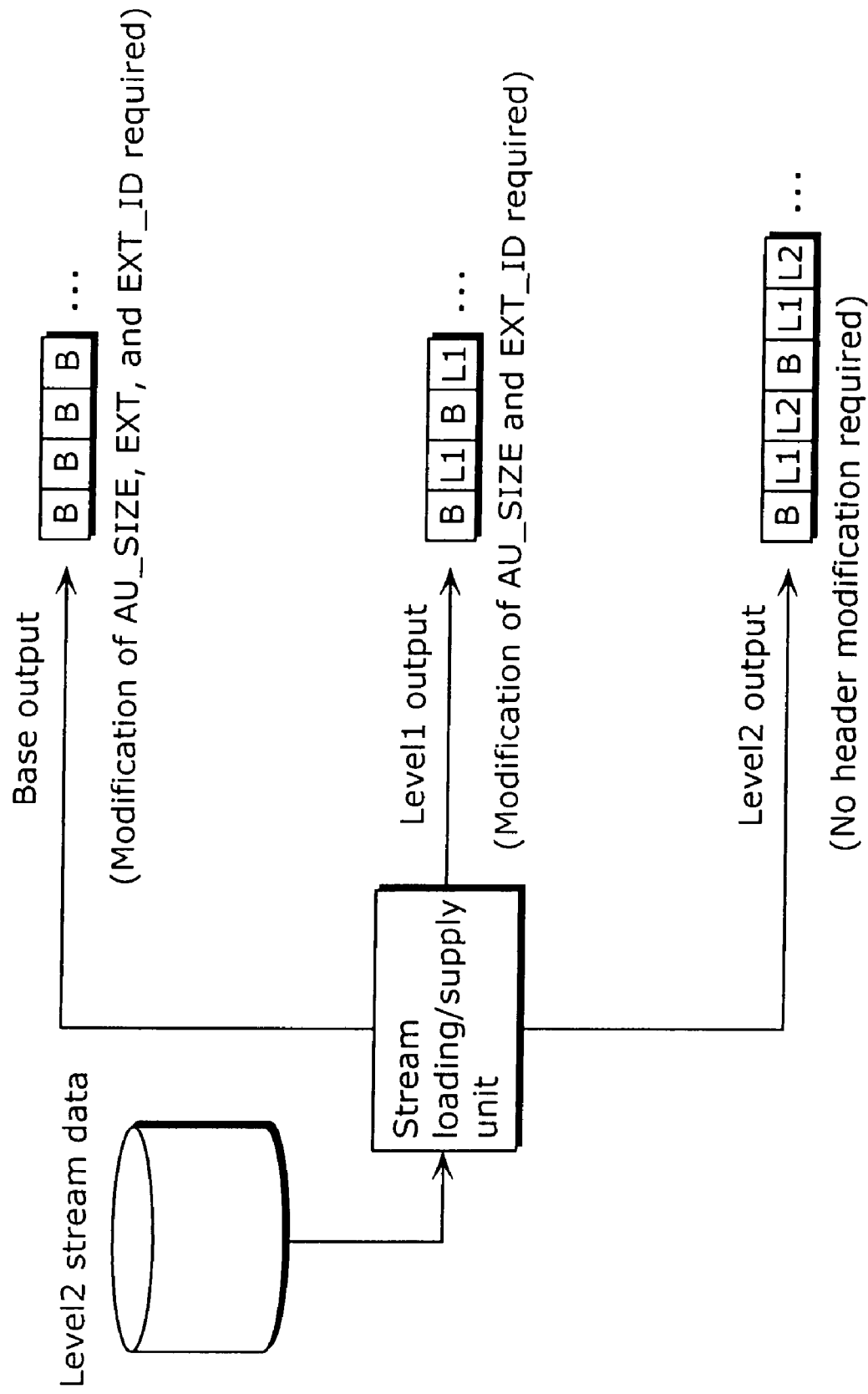
FIG. 34 is a diagram for describing operations performed by a stream loading/supply unit to output data having a hierarchical structure to decoders supporting different hierarchy levels, the operations being performed differently depending on the destination.

FIG. 34 is a diagram for describing operations performed by a stream loading/supply unit to output coded data with a hierarchical structure as described above (e.g., a Level2 stream) to decoders supporting different hierarchy levels, the operations being performed differently for every data output destination.

When outputting data to a Base decoder, the stream loading/supply unit removes Level1-EXT and Level2-EXT frames of each access unit from Level 2 stream, and outputs only the Base frame. In so doing, the stream loading/supply unit outputs the data after rewriting the values in: AU_SIZE, which is information included in the Base Header that indicates the size of the access unit; EXT, which indicates whether or not the access unit is made up only of the Base frame; and EXT_ID which indicates the types of data in the extension layers.

Similarly, when outputting data to a Level1 decoder, the stream loading/supply unit removes Level2-EXT frame of each access unit from Level 2 stream and outputs the resulting data after rewriting the values in AU_SIZE and EXT_ID.

Of course, when outputting Level 2 stream to a Level2 decoder, the stream loading/supply unit outputs Level 2 stream as is.

Here, consider the case where devices supporting Base and Level1-EXT are in widespread use, and Level2-EXT is newly added. In this case, it is preferable that only the Base frame and Level1-EXT frame of each access unit be extracted from Level 2 stream, and the extracted data is outputted to the devices. In other words, it is preferable not to revise the data at all.

Figure 35:
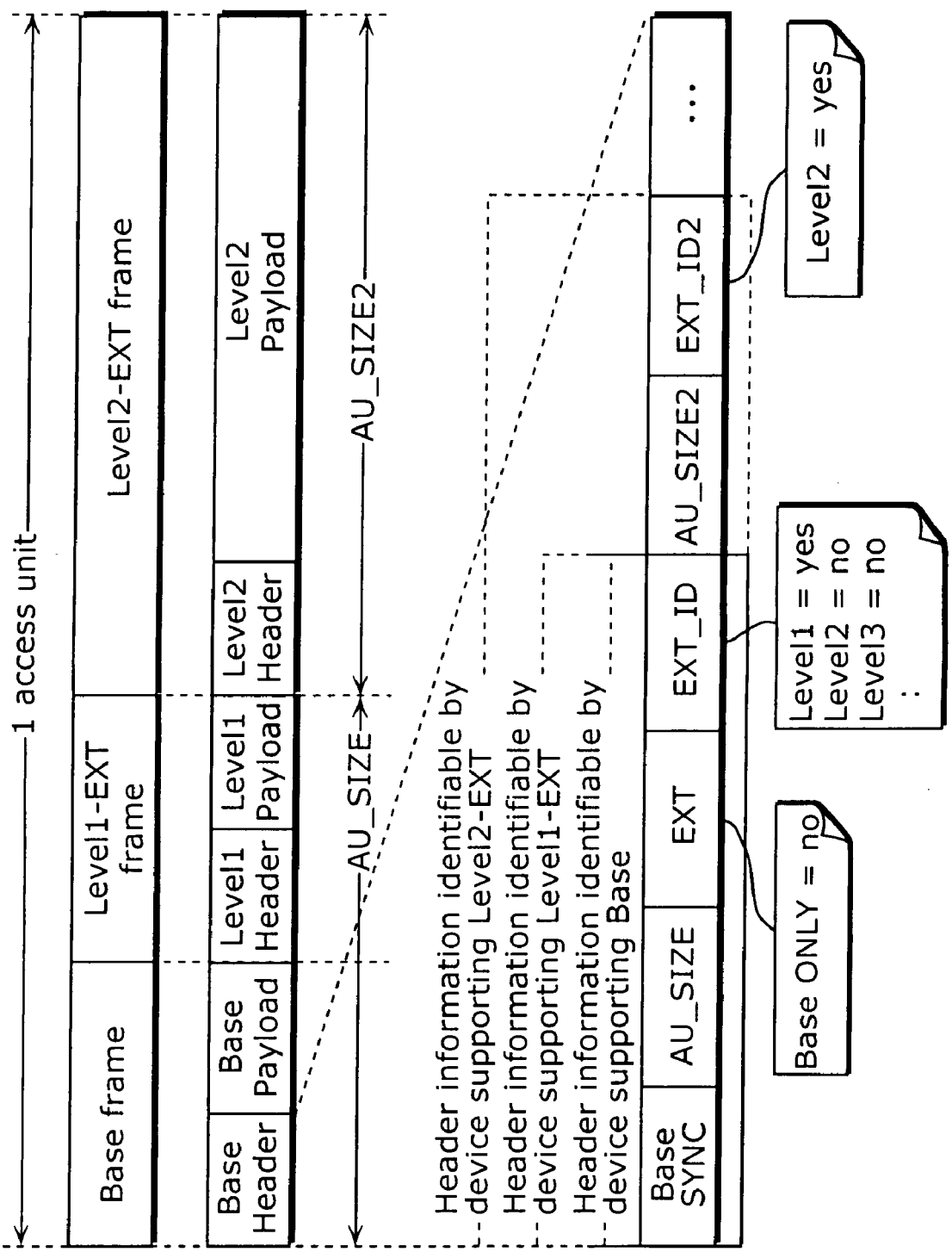
FIG. 35 is a diagram which shows the ideal structure of an access unit for introducing Level2-EXT, when there is widespread use of devices supporting Base and Level1-EXT.

FIG. 35 is a diagram which shows an ideal structure for an access unit that incorporates a Level2-EXT, in the case where devices supporting Base and Level1-EXT are in widespread use.

In the access unit shown in FIG. 35, information related to data up to and including Level1-EXT is described in the Base Header (and Level1 Header) in the same way as when the access unit is made up of Base and Level1-EXT. In contrast, information related to extension layer data after Level2-EXT is described in a region not detected by the Base/Level1-EXT decoder such as a reserved region. In FIG. 35, a value, which indicates that no Level2 exists in EXT_ID, is set and EXT_ID2 is provided in a reserved region which has not been used for storing the data up to and including the frame of Level1 and in which the existence of extension hierarchy data of Level2 is described.

When a Level2 access unit as shown in FIG. 35 (for example, an access unit that includes a Base, Level1-EXT and Level2-EXT) is converted into a Level1 access unit (which includes only Base, or Base and Level1-EXT) and is outputted, the stream loading/supply unit only extracts a part of the Base and a part of Level1-EXT from a Level 2 stream. Thus, it is possible for the stream loading/supply unit to output a stream, configured by a Level1 access unit, to a Level1 decoder without re-writing the data.

The above method is effective even cases where for example there is a small amount of bits allocated for size information, such as AU_SIZE, the data size for one access unit is too large when Level2 is added and thus the size information cannot be expressed with AU_SIZE.

In "DTS", there are cases where most effects of compression cannot be obtained depending on the PCM data for sampling, even when lossless compressed coded data is generated by DTS++. In that case, it is conceivable that the bit rate will suddenly increase from some 100 Kbps for DTS to around some 10 Mbps for DTS++ (Lossless). As a result, in FSIZE (which uses 14 bits to represent the data size on a byte basis), and which indicates the data size of the access unit described in the Core header in the current DTS, there is a problem that the bit field is insufficient for showing the size. Thus, as in DTS++ lossless compression, it is conceivable that the range of AU_SIZE can be divided into two data blocks when the size cannot be described by AU_SIZE (FSIZE).

Figure 36:
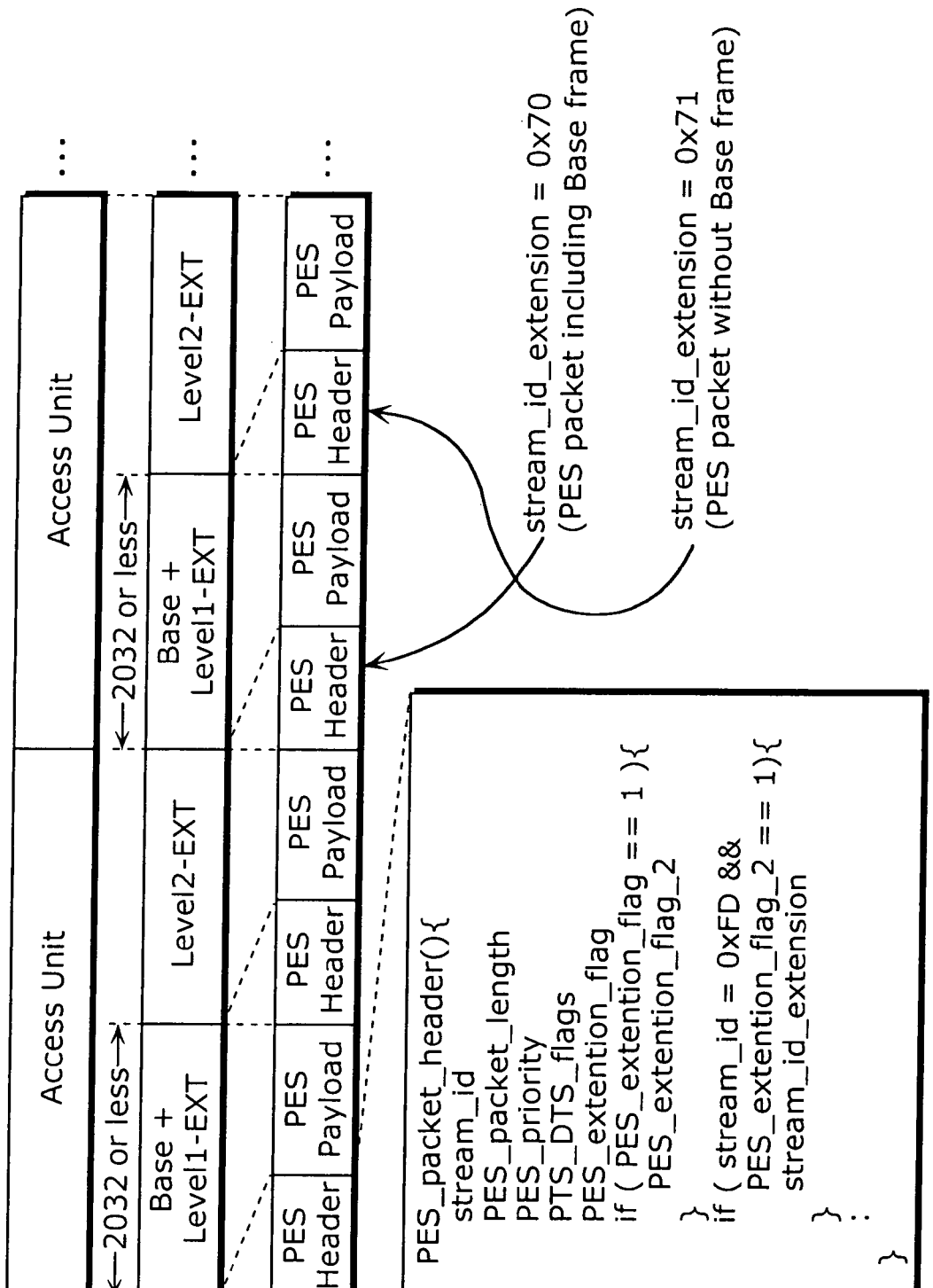
FIG. 36 is a diagram which shows the data structure of a data stream, which includes a Level2.

FIG. 36 is a diagram that shows the data structure of a data stream when there is a device supporting Level1, and a data stream that utilizes Level2 is newly added.

In FIG. 36, a description is clearly given for an access unit made up of two portions, one of which is a Base/Level1-EXT portion that can be decoded by an existing player and decoder, and the other which is a Level2-EXT portion that cannot be decoded by an existing player and decoder.

The MPEG standard defines that data should be stored in logical units called PES packets when video and audio elementary streams are multiplexed in the MPEG2-TS (transport stream) format and the MPEG2-PS (program stream) format.

Each PES packet is made up of a PES header and a PES payload in which actual data is stored, and the PES header includes various fields as shown in FIG. 36.

stream_id indicates the type of elementary stream stored in the payload of the PES packet. In general, different stream_ids indicate different elementary streams. PES_packet_length indicates the data size of the PES packet. PES_priority is information to identify the priority level of the PES packet. PTS_DTS_flags is information which indicates whether or not there is a PTS, which is information indicating the time to start the reproduction of the PES payload and whether or not there is a DTS, which is information indicating the time to start decoding the PES payload. When the values of the PTS and DTS are the same, the DTS is omitted. PES_extension_flag and PES_extension_flag_2 are information which each indicates whether or not there is an extension data area in the payload of each PES packet. stream_id_extension, which can exist only when the value of stream_id is 0xFD (extended_stream_id), is auxiliary information for the supplement stream_id to identify the elementary stream.

In each access unit, the Base frame portion (in FIG. 36, Base+Level1-EXT portion) and the other portion that does not include the Base frame (in FIG. 36, Level2-EXT portion) may be separated from each other in any of the following manner: by assigning these two portions with the same Packet Identifier (PID), which is information to identify a TS packet, the TS packet being described later, and by assigning these two portions different stream_ids; by using PES_priority; and by using stream_id_extension. Furthermore, the portion including the Base frame and the portion not including the Base frame may be separated by defining that the Base frame portion is 2032-bytes or a 2013-byte portion compatible with the DVD-Video standard, and defining that the other portion in the same access unit is a portion that does not include a Base frame.

For example, when a stream_id_extension is used, the values of stream_ids for both a PES packet including the Base frame and a PES packet including no Base frame are equal to 0xFD (indicating that the stream is a private stream). Thus, different values are set for the value of the stream_id_extension of the PES packet which includes the Base frame (e.g., 0x70) and for the value of the stream_id_extension of the PES packet which does not include the Base frame (e.g., 0x71). This makes it possible for the player and an external output unit to extract only data which includes the Base frame. In this case, the values set as stream_id_extensions are stored into the private stream areas specified by the logical addresses 0x40 through 0x7F.

Coding units up to and including Level 1 that can be stored in the first PES packet are coding units compatible with an existing device (which is compatible with an existing AV receiver for which a digital interface protocol is specified and which has an input terminal capable of supporting the protocol). Coding units that can be stored in the second PES packet are Level2-EXT and higher level coding units compatible with a non-existing device (which is compatible with a non-existing AV receiver and for which a digital interface protocol is not specified; the non-existing device being without an input terminal capable of supporting the protocol).

The first PES packet and the PES packets after the second PES packet may be distinguished by judging from their PES_priority, stream_id_extension, or PTS_DTS_flags values.

As described above, since a PES header includes size information such as PES_packet_length, it is quite easy to extract a PES payload using the size information. Thus, when coding units of Base and Level1-EXT are highly compatible with an existing AV receiver and digital interface, and they are collectively stored in the first PES packet, the PES payload in the first PES packet can be extracted with ease by analyzing its PES header.

Figure 37:
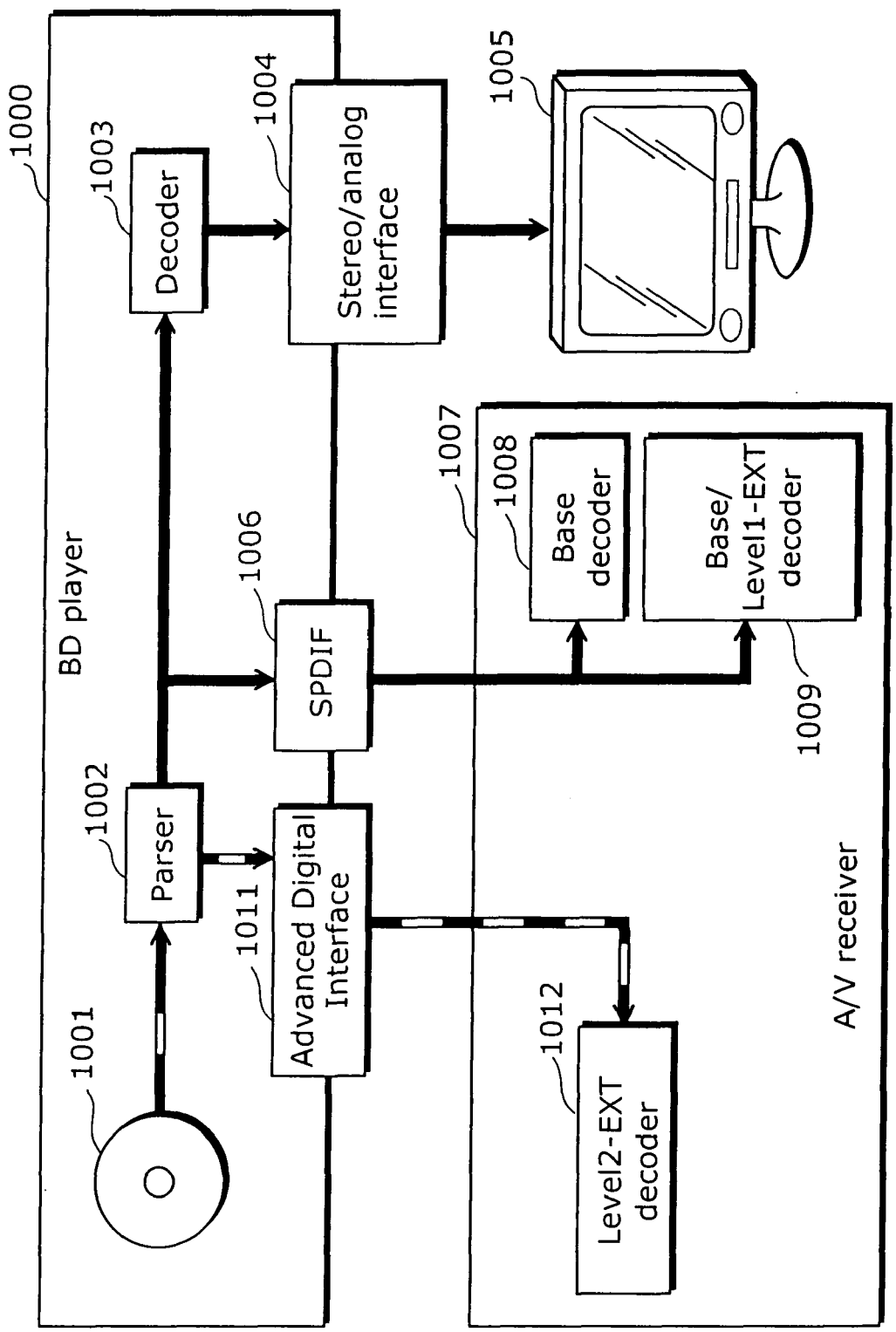
FIG. 37 is a diagram for describing processing performed on an access unit made up of two portions, one of which is a Base/Level1-EXT portion that can be decoded by an existing player and decoder, and the other of which is a Level2-EXT portion that cannot be decoded by an existing player and decoder.

Using FIG. 37, a description is given again of processing on an access unit made up of two portions, one of which is a Base/Level1-EXT portion that can be decoded by an existing player and decoder, and the other of which is a Level2-EXT portion that cannot be decoded by an existing player and decoder.

In a BD player 1000, a stream made up of plural access units recorded on a BD disc 1001 is inputted from the BD disc 1001 to a parser 1002. The parser 1002 distinguishes between each of the access units, between the first PES packet which includes the Base frame portion and the second and subsequent PES packets including only Level2-EXT portion.

Then, the parser 1002 outputs the first PES packet, which is the Base frame portion, to a decoder 1003, included in the BD player 1000, that is capable of processing only Base frame portions. The decoder 1003 decodes the first PES packet, and outputs the decoded data to the television 1005 via a stereo/analog interface 1004. The television 1005 reproduces the data sent from the BD player 1000, and outputs images and audio based on the reproduced data.

The parser 1002 also outputs, via an SPDIF 1006, the first PES packet, which includes the Base frame portion to a Base decoder 1008 and a Base/Level1-EXT decoder 1009 that is included in an A/V receiver 1007, which is located outside the BD player 1000. The Base decoder 1008 and the Base/Level1-EXT decoder 1009 are decoders, which are capable of processing Level1-EXT frame portions in addition to Base frame portions, and which process the first PES packet sent from the BD player 1000.

Furthermore, the parser 1002 outputs, to a Level2-EXT decoder 1012 included in the A/V receiver 1007 the first PES packet, which includes the Base frame portion, and the second and subsequent PES packets which include only Level2-EXT portion, via an Advanced Digital Interface 1011. Level2-EXT decoder 1012, which is a decoder capable of processing all the frames from Base to Level2-EXT frames, processes both of the PES packets sent from the BD player 1000.

As described above, after the parser 1002 analyzes an access unit, it is sent to and processed by the decoder 1003, the Base decoder 1008, and the Base/Level1-EXT decoder 1009, which are existing decoders. Additionally, the access unit is also outputted to and processed by Level2-EXT decoder 1012, which is capable of processing the first PES packet, which includes the Base frame portion, as well as the second and subsequent PES packets, which include only Level2-EXT portion.

Note that the BD player 1000 shown in FIG. 37 is an example of the data reproduction device in the present invention. The parser 1002 is an example of the TS packet sorting device.

It is important that a PES packet, in which a Base frame is stored that is ensured to be decoded by all of the decoders, is followed by another PES packet which stores an extension frame capable of providing additional functions but which has a low decoding compatibility (e.g., a Level1-EXT frame and a Level2-EXT frame). It is also important that data in one access unit is arranged in ascending order, starting from Base, Level1-EXT, Level2-EXT, Level3-EXT, Level4-EXT, . . . , and that no reordering of the data occurs when all the coding units in one access unit are extracted.

According to DTS (which is an audio coding mode developed by the Digital Theater Systems, Inc.), the data size of the payload of a PES packet which includes the first Base (referred to as a "core" in DTS) is defined to be 2032 bytes or less in compliance with SPDIF (Sony/Philips Digital Interconnect Format; consumer version defined by IEC60958-3). This means that, for the DTS-type I mode which stores 512 samples into one frame from audio data sampled at 48 KHz, data sampled at 1524 Kbps or less, when considered in terms of bit rate, are stored into the first PES packet.

This is represented by the following equation:

$$1524[Kbps]=2032[bytes] \times 8[bits/byte] \times 48000[sample/sec]/512[sample]$$

In order to maintain compatibility with an AV receiver (e.g., home theater) supporting DTS and which is compliant with data outputted from a DVD-Video player, the data size of the payload of the PES packet which includes the first Base should be assumed to be 2013 bytes or less.

As described above, data in one access unit is divided and managed on a PES packet basis, to allow for compatibility between an existing player/decoder and a new player/decoder. In other words, data of one access unit is divided and managed according to the digital interface specification. Accordingly, it becomes possible to issue access unit data that includes data up to and including a predetermined extension layer, without performing processing on the data and without causing any defects in data transfer.

Figure 38:
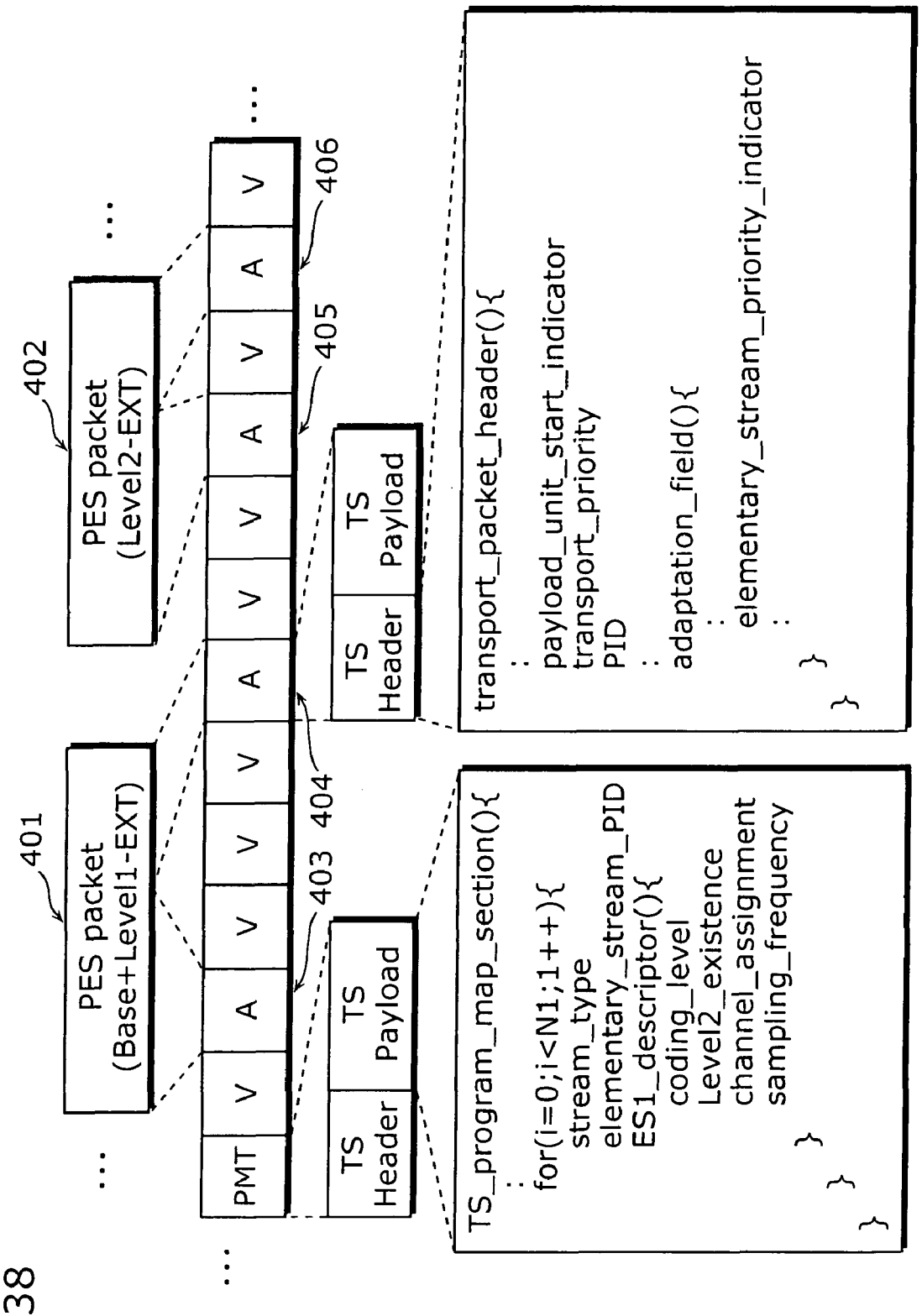
FIG. 38 is a diagram which shows a method of storing, an access unit having a hierarchical structure into an MPEG2-TS.

FIG. 38 is a diagram that shows the structure of an access unit, which has a hierarchical structure that is to be multiplexed in accordance with the MPEG2-TS format.

An MPEG2-TS is a digital stream made up of TS packets, each being 188 bytes in size. Part of a Program Map Table (PMT), which holds information about programs that make up the MPEG2-TS, is a structure as shown in FIG. 38.

According to the MPEG2-TS regulations, it is prohibited for one TS packet to store plural PES packets. Therefore, as shown in FIG. 38, a PES packet in which a Base+Level1-EXT coding unit is stored and a Level2-EXT PES packet 402 in which a coding unit is stored, are stored in different TS packets.

In the MPEG2-TS, a PMT packet that shows programs stored in the MPEG-2 TS is stored. In the PMT, the following are stored as a set: an elementary_stream_PID which indicates which PID of which TS packet carries information belonging to a predetermined program, such as video information and audio information; stream_-type indicating the type of coding for this elementary stream; and one or more descriptors that describe additional information for the elementary stream.

The following is information which is likely to be described in a descriptor for a coding mode with a hierarchical structure: level information about the extension layer (coding_level); information indicating whether or not an extension layer that is not currently supported or that is rarely used, is employed (e.g., Level2_existence, which is information to identify whether or not Level2 is employed); channel assignment information (channel_assignment) for when the coded data is audio information; and sampling frequency (sampling_frequency).

When the coded data is video information, resolution information and frame frequency are likely to be described in the descriptor, in addition to coding_level and Level2_existence.

The contents described in the descriptor when the coding data is speech information are explained using FIG. 39 through FIG. 41.

Figure 40A:
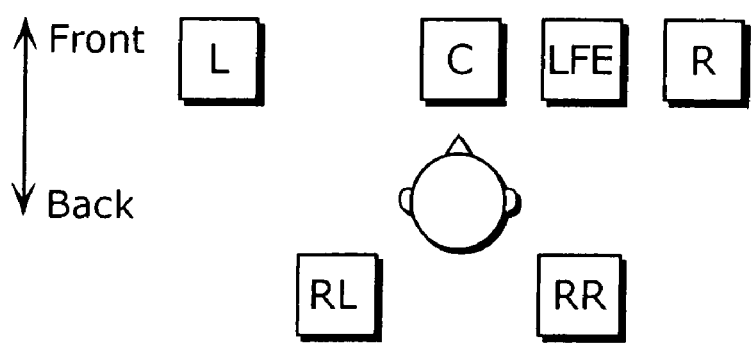
FIG. 40(A) shows a speaker layout for the 5.1 channel.
Figure 40B:
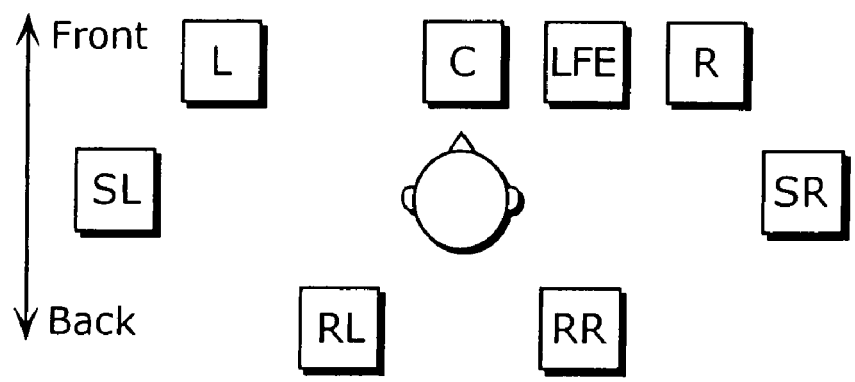
FIG. 40(B) is a diagram which shows a speaker layout for the 7.1 channel.

As shown in FIG. 39, a descriptor can describe a relationship between a level and audio attributes (Q-value, frequency, channel and speaker layout). By using the speaker layout information, even if the stream to be processed differs in layout from the actual layout, the decoder can modify the layout for each channel arbitrarily. The speaker layout of a 5.1 channel is shown in FIG. 40(A) and the speaker layout for a 7.1 channel is shown in FIG. 40(B).

As mentioned earlier, a descriptor can describe the relationship between the Level and the channel.

In addition, a descriptor may describe whether downmixed sound for a 2-channel or a 5.1 channel is included with the number of channels information, as shown in the "channel structure" of FIG. 41. In this way the descriptor can identify whether each decoder corresponding to each channel can output sound adequately. For example, when the channel structure is 7.1ch (a hierarchical structure of 2+3.1+2), the 2-ch decoder can output sound from the 2-channel and the 5.1ch decoder can output sound from the 5.1 channel (2+3.1 channel). However, when the channel structure is 7.1ch without adhering to the hierarchical structure, there is a possibility that the 2-ch decoder and the 5.1ch decoder will not be able to output sound due to the amount of processes.

DTS data is categorized into DTS (corresponding to Base) and DTS+ (corresponding to Level1-EXT) data, as well as DTS++ (corresponding to Level2-EXT) data.

While both of DTS+ and DTS++ include extension layer data, they are handled differently. Thus, their descriptors may include information (corresponding to Level2_existence in FIG. 38) to identify whether the target stream is DTS/DTS+ or DTS++.

Note that Level2_existence may be used as information indicating whether or not the target stream includes only a portion that can be outputted to SPDIF in the same format (DTS-type I) as that of the DVD-Video standard.

These Level2_existence and coding_level information pieces may be described in a database file (e.g., inside the Attribute field in the VOBI file shown in FIG. 13). These information pieces can indicate not only that extraction processing performed when digital data is outputted differs, but also, that the information can be used for display/selection of video and audio attributes on the menu screen and so on of the BD. For example, a player that does not support Level2 can judge, from the database file, that a stream to be decoded is a Level2 stream, and can provide the user with information in advance indicating that Level2 audio cannot be selected.

Figure 42:
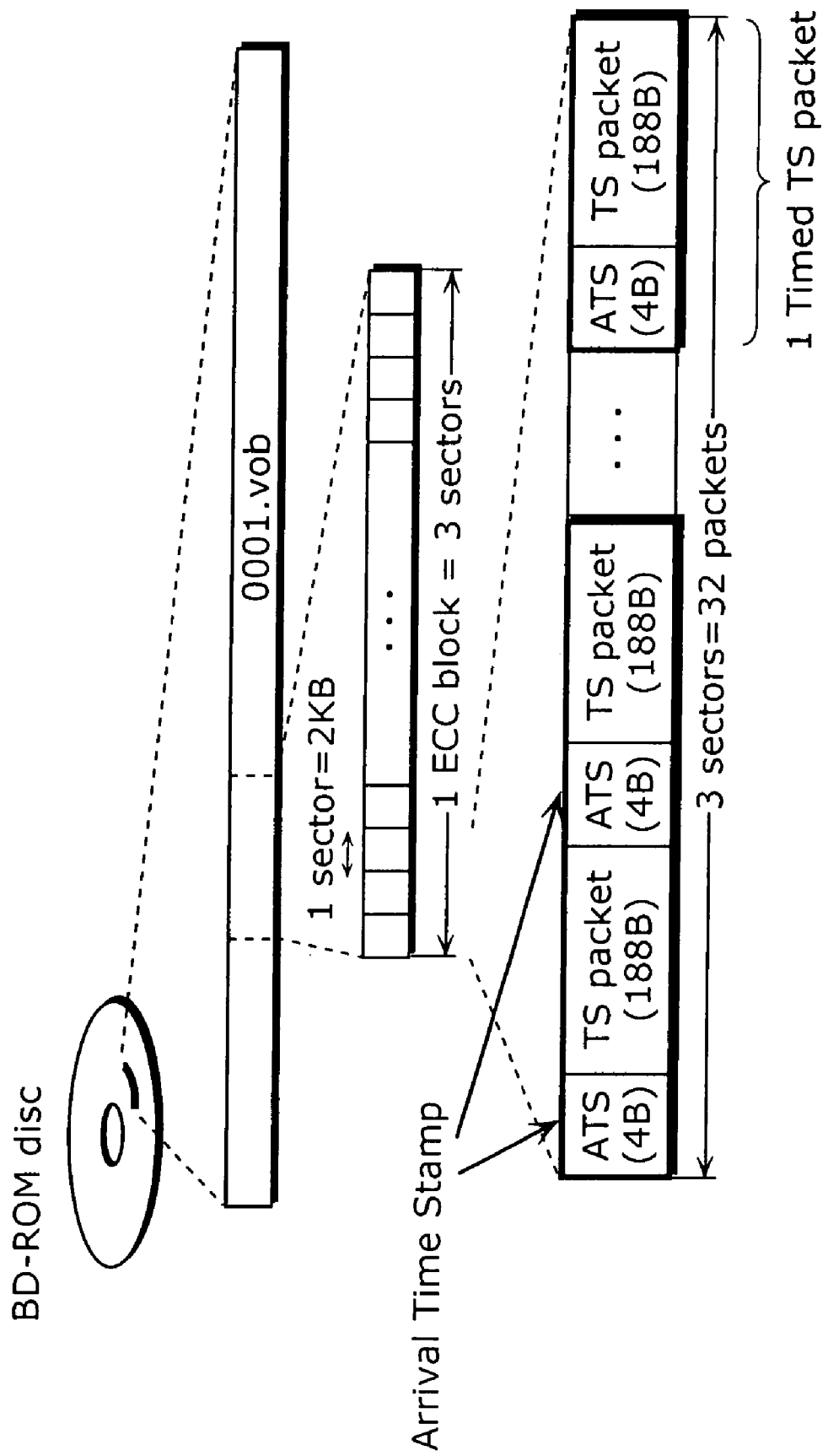
FIG. 42 is a diagram which shows the file format of an MPEG2-TS when it is stored onto an optical disc.

FIG. 42 is a diagram that shows the file format of an MPEG2-TS file when it is recorded onto an optical disc, such as a BD-ROM.

A TS packet added with a 4-byte Arrival Time Stamp (ATS: information indicating the time to start input of the TS packet into a decoder) makes up one Timed TS packet, and 32 Timed TS packets are collectively stored in three sectors (6 KB).

Figure 43:
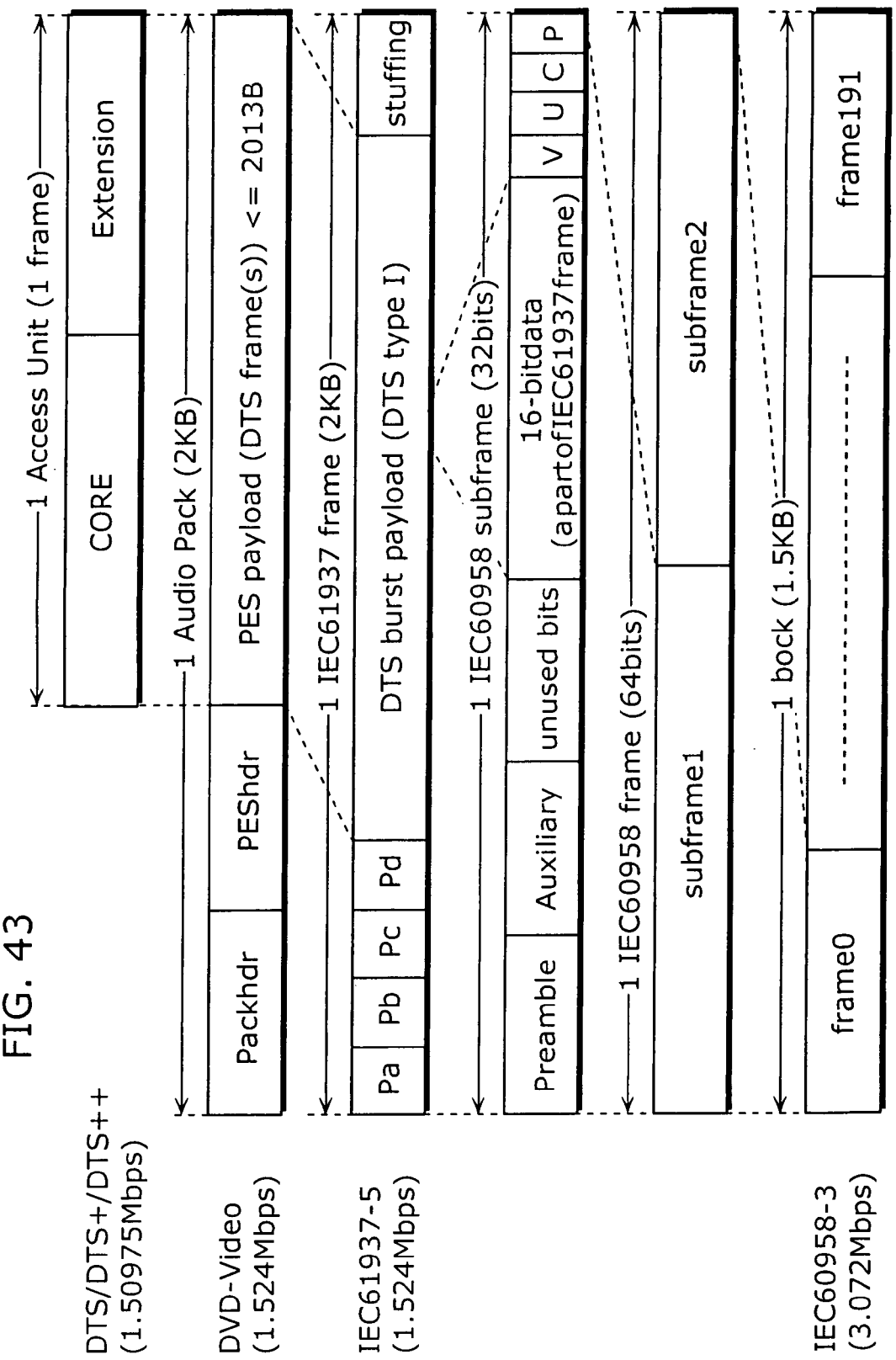
FIG. 43 is a diagram for describing the details of DTS data specified by the DVD-Video standard.

FIG. 43 is a diagram for describing the details of DTS data specified by the DVD-Video standard.

The DVD-Video standard specifies that the maximum size of one access unit is 2013 bytes, without specifying which one of the levels it applies to, i.e., DTS, DTS+, and DTS++. In other words, one access unit, which represents audio information equivalent to 512 samples at 48 KHz, may be configured with only a core or may be configured with a core and an extension.

One access unit, which is 2013 bytes at maximum, is stored in the PES payload, to which a PES header (PEShdr) and a pack header (Packhdr) are added. The size of the entire packet amounts to 2 KB.

A DTS burst payload is formed in which only the audio data in the PES payload is stored. A total of 8-byte preamble groups (Pa, Pb, Pc, and Pd), each being 2 bytes, as well as stuffing data are added to the DTS burst payload, and a 2-KB IEC61937-5 frame is formed.

SPDIF (IEC60958-3) transfers data in a cycle of 192 frames as one block. One frame is made up of two sub-frames, a sub-frame consisting of 4-byte data, and each sub-frame carrying 2-byte data in an IEC61937-5 frame.

Therefore, in order to send DTS data while maintaining compatibility with the DVD-Video standard, the amount of bits in the core and extension bit may be controlled so that the bit does not exceed 2013 bytes in an IEC61937-5 frame. This eliminates the necessity to identify the type of the data, i.e. as one of DTS, DTS+, and DTS++.

This is why the payload of a PES packet which includes a core should be a coding unit that is 2013 bytes or less in size, when DTS++data is recorded in a BD-ROM.

As with the DVD-Video standard, frames that structure an access unit must be concluded with 2013 bytes or less. For example, when the total size of a Base frame and a Level1-EXT frame is assumed to be 2014 bytes, these frames are required to be coded again to reduce their total size to 2013 bytes or less, or it is necessary to form a PES packet which includes only the Base frame, with Level1-EXT frame being stored in the next PES packet in multiplexing order.

Figure 44:
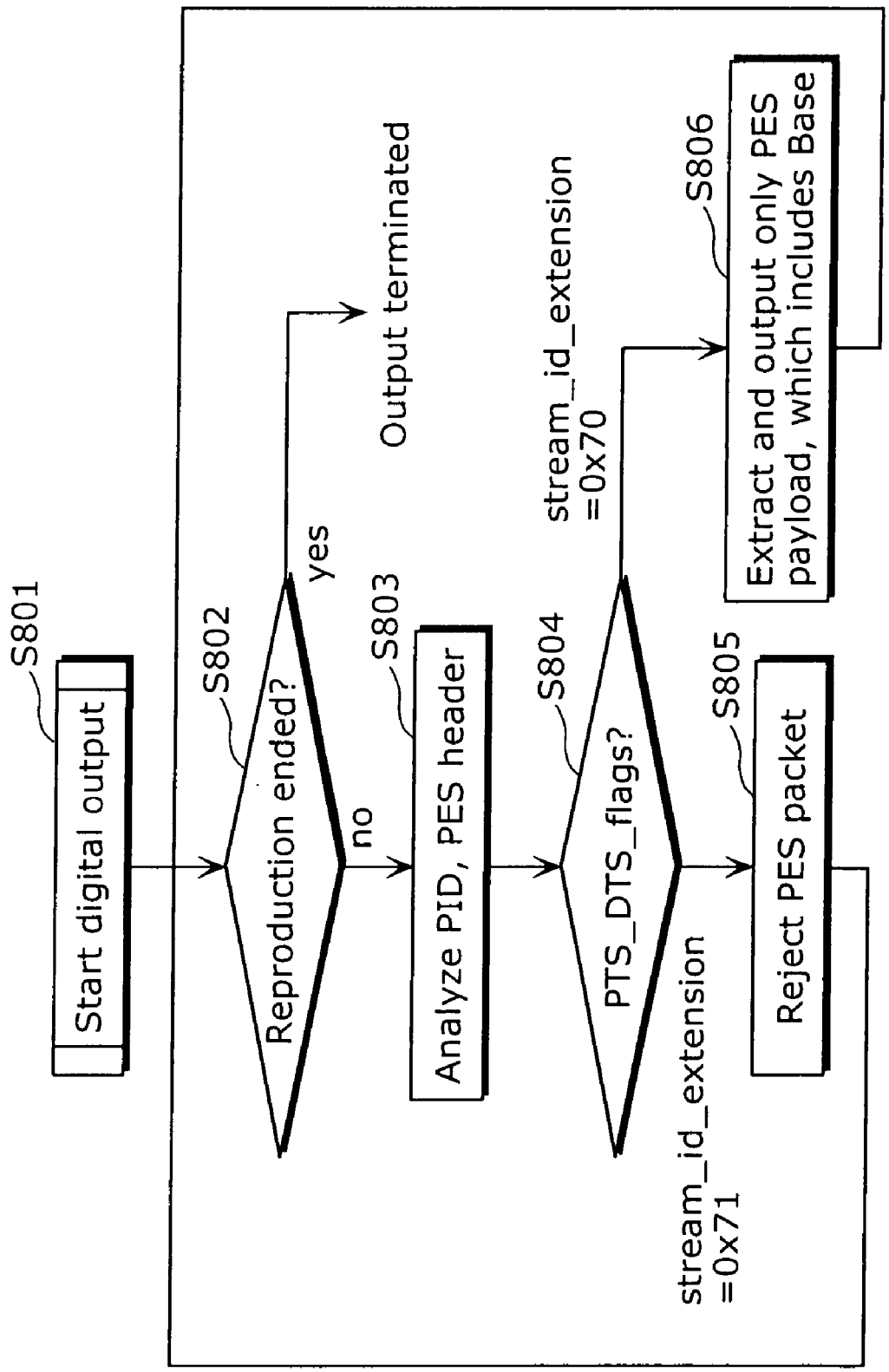
FIG. 44 is a flowchart which shows processes performed by a demultiplexing device and the stream loading/supply unit.

FIG. 44 is a flowchart which shows processes performed by the demultiplexing device 310 (FIG. 7) and the stream loading/supply unit (FIG. 34).

S801 is a digital output start step for extracting a part of the access unit shown in FIG. 36, and outputting the extracted part to outside in order to comply with SPDIF.

S802 is a reproduction end determination step. When the determination is YES, the data output is terminated, whereas when the determination is NO, the process proceeds to S803, which is a PES packet process step.

In S803, distinction is made between TS packets based on PIDS, the header of each PES packet is analyzed, and the stream_id_extension is read out.

In S804, the stream_id_extension is determined. When the value of the field is "0x71 (non-Base frame portion)", the process proceeds to S805, whereas when the value is "0x70 (including the Base frame portion)", the process proceeds to S806.

S805 is a step to be performed when the PES packet is judged to be a non-Base frame portion in S804. In S805, the PES packet is discarded.

S806 is a step to be performed when the PES packet is judged to be a Base frame portion in S804. In S806, the payload (Base+Level1-EXT) of the PES packet is extracted, and its frame data is outputted to a decoder or an existing digital I/F, as described above with reference to FIG. 7 and FIG. 34.

After S805 and 5806, the process returns to the reproduction end determination step S802.

Next, a method for multiplexing a Base/Level1-EXT (below, simply referred to as "Base"), which can be decoded by an existing player and decoder, and a Level2-EXT (below, simply referred to as Level2), which cannot be decoded by the existing player and decoder, into a single access unit is explained.

Figure 45:
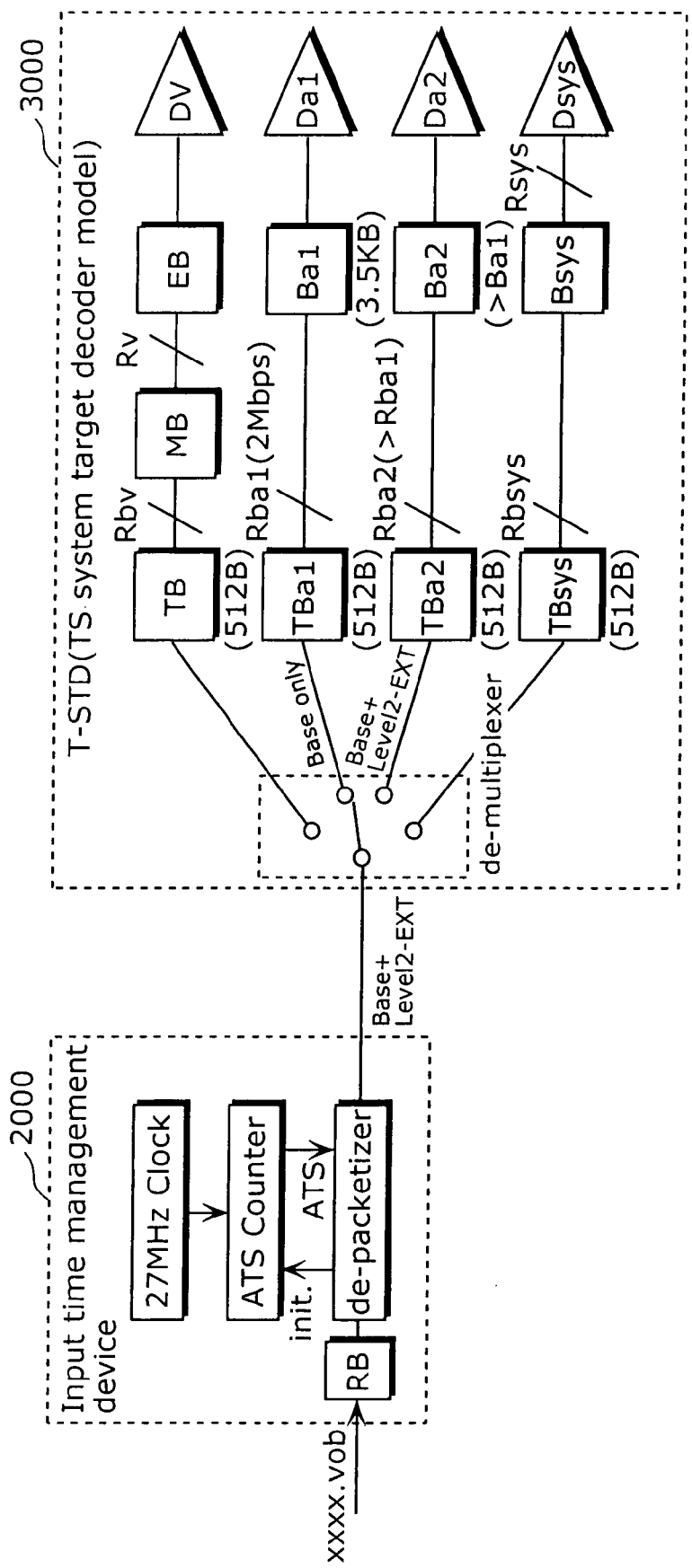
FIG. 45 is a structural diagram of the input time management device and the decoder model 3000.

First, using FIG. 45, an input time management device 2000 and a TS system target decoder model (referred to as, "decoder model" or "T-STD") 3000 are explained.

As shown in FIG. 45, the input time management device 2000 includes a read buffer (RB), a de-packetizer, an ATS Counter and a 27 MHz. Clock. RB accumulates an "xxxx-.vob" file temporarily. The de-packetizer removes ATS from the "xxxx.vob" TS packet and when ATS from the first TS packet, sets the ATS value for the first TS packet in the ATS Counter. Also, the de-packetizer only outputs each TS packet to the T-STD 3000 according to the time indicated by the ATS. The 27 MHz Clock outputs the clock at 27 MHz.

As shown in FIG. 45, the decoder model 3000 includes a de-multiplexing device; TB, MB and EB, which are buffers for images; a decoder Dv; TBa1 and Ba1, which are buffers for Base in the audio data; a decoder Da1; TBa2 and Ba2, which are buffers for "Base+Level2" in the audio data; a decoder Da2; TBsys and Bsys, which are buffers for system data; and a decoder Dsys.

Image data is processed in the order: TB, MB, EB, the decoder Dv. Base in the audio data is processed in the order: TBa1, Ba1, decoder Da1. "Base+Level2" in the audio data is processed in the order: TBa2, Ba2, the decoder Da2. System data is processed in the order: TBsys, Bsys, the decoder Dsys.

In the line where the Base in the audio data is decoded, and in the line where the "Base+Level2" in the audio data is decoded, the rate for transferring data between the buffers, the decoder specifications such as buffer size and so on vary with the attributes of each stream. Thus, the Base and Level2 must be multiplexed according to their respective specifications. When the Base alone is decoded, the Base alone must be able to be decoded in the decoder line (TBa1, Ba1, and decoder Da1) without causing the buffer to fail. When decoding "Base+Level2", the Base alone must be able to be decoded in the decoder line (TBa2, Ba2, and decoder Da2) without causing the buffer to fail. In other words, even in the Base decoder line (TBa1, Ba1, and decoder Da1) and the "Base+Level2" decoder line (TBa2, Ba2, and decoder Da2), the Base and Level 2 must be multiplexed into a single stream using the same PID without causing the buffer to fail.

Figure 46:
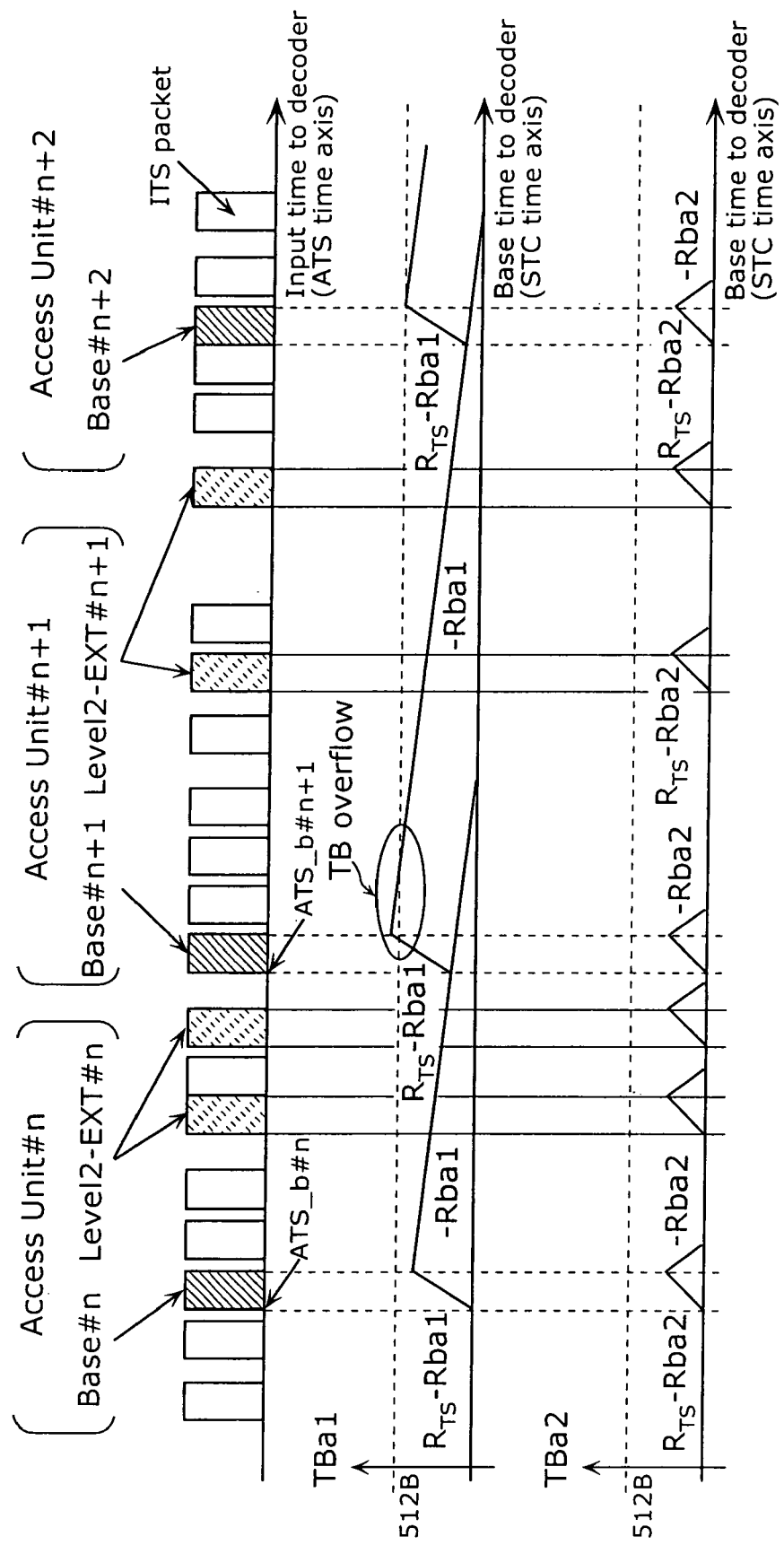
FIG. 46 is a diagram which explains a method for multiplexing the Base and the Level 2, so that the decoder model which decodes the Base does not fail and the decoder model which decodes the Base and the Level 2 does not fail.

Using FIG. 46, shifts in the amount of data accumulated in TBa1 and TBa2 that occur when decoding the Base and "Base+Level2" in the respective decoder lines are explained.

For TBa1, the Base (Base #n) of the nth access unit (Access Unit #n) is extracted to Ba1 at a rate of Rba1 simultaneously when being inputted from the time ATS_b#n at the bit rate ($R_{TS}$) and being accumulated. When the input of Base #n ends, the amount of accumulated data decreases at a fixed bit rate (−Rba1). The Base (Base#n+1) of the (n+1)th access unit (Access Unit #n+1) is inputted from the time ATS_b#n+1 at the bit rate ($R_{TS}$), and is accumulated. In FIG. 46, TBa1 overflows by the time the input of Base #n+1 ends. In other words, the Buffer fails. Below, the same operations continue.

For TBa2, the Base (Base #n) of the nth access unit (Access Unit #n) is extracted to Ba2 at the rate Rba1 simultaneously when being inputted from the time ATS_b#n by the bitrate ($R_{TS}$) and being accumulated. When the input of the Base#n ends, the amount of accumulated data decreases at a fixed bit rate (−Rba2). Thus, two Level2s (Level2#n) of the n-th access unit are inputted and accumulated. The amount of accumulated data in TBa2 decreases at the bit rate (−Rba2) within a period without input. The same operations continue after this point in the sequence. In FIG. 46, TBa2 does not overflow. In other words, the Buffer does not fail.

In FIG. 46, a decoder line only compatible with Base#n can only decode the stream composed of Level 1 and Base in which one access unit is stored in one PES packet, and cannot process a stream with a high bit rate that includes Level 2. Thus, in order to prevent a TBa1 that is only compatible with a low bit rate from failing, the input time for Base#n+1 to Tba1 must be delayed. In other words, the following equation 3 must be satisfied.

$$TBa1(ATS\_b\#n+1)+188*(1-Rba1/RTS) \leq \text{Size of } TBa1 = 512 \quad \text{(Equation 3)}$$

Equation 3 means that even when a quantity of bytes (188× (1−Rba1/$R^{TS}$)), which is the amount that increases when one packet is inputted, is added to the accumulated data amount for TBa1 at the time ATS_b#n+1, the quantity of bytes will not exceed the size of TBa1. ATS is set so that Base#n+1 is multiplexed after the time ATS_b#n+1, which fulfills Equation 3, and Base#n+1 and must be multiplexed into the stream.

Further, when the number of TS packets for storing Base (first PES packet) is Nbas and the number of TS packets for storing Level 2 (second PES packet) is Next, the following Equation 4 must be satisfied in order to transfer Base and Level2 in the decoding order:

$$[(Nbas+\text{Next})\times 188 \times 8/R_{TS}1] \times 27000000 \leq ATS\_b\#(n+1)-ATS\_b\#n \text{ (Equation 4)}$$

Here, the unit of the bit rates Rba1 and the basis of $R_{TS}$ is bits/second, and 27000000 stands for the clock frequency in ATS time precision. The values of Nbas and Next can be calculated from information such as the maximum bit rate for each Codec.

For example, for DTS++, when the sampling frequency is 48 KHz with 512 samples/Access Unit(DTS_type1), the Core (Base) has a fixed rate of 1 Mbps, XLL (Level2) is 24 Mbps on its own and the XLL data length is 24 Mbpsx512/48K=32000 bytes. In order to store the DTS++, 174 TS packets that include overhead in the TS/PES header are needed.

Multiplex processing must be performed so that the above Equations 3 and 4 are satisfied; an appropriate ATS is added to the TS packets, which includes Base and Level2, and is multiplexed. Thus, the buffer does not fail.

Note that the buffer fails not only when data overflows, but also when underflow occurs. Base and Level2 must be multiplexed so that data does not underflow. Therefore, Base and Level 2 are multiplexed based on the buffer size, the size of the data inputted into each buffer, the speed of inputting the data into each buffer and the speed of outputting the data from each buffer so that the data does not underflow, in the same way as the data is prevented from overflowing.

Essentially, Base and Level 2 are multiplexed in consideration of the buffer size, the size of the data inputted into the buffer, the speed of inputting the data into the buffer and the speed of outputting the data from the buffer, in each decoder model so that each decoder model does not fail.

Industrial Applicability

The information recording medium of the present invention is useful as an optical disc or the like on which video data and audio data are recorded. The data sorting device of the present invention is useful as a device or the like for extracting, from data recorded on the information recording medium of the present invention such as an optical disc, basic compressed data compatible with an existing decoder or an existing digital I/F. The data reproduction device of the present invention is useful as a device or is the like that extracts the above basic compressed data above from the information recording medium of the present invention, such as an optical disc, and reproduces the extracted data. The data reproduction device of the present invention is also useful as a reproduction device or the like that reproduces not only data from the information recording medium of the present invention such as an optical disc, but also audio data supplied via broadcasting or a network, as well as audio data on a recording medium such as a hard disk and a semiconductor memory.

The invention claimed is:

1. A non-transitory information recording medium on which a stream, having plural access units and which includes at least one of image and audio, is recorded, wherein:
   each of the access units has: a first packet which includes basic data; and a second packet which includes extension data related to the basic data;
   the basic data is data that can be decoded in a completed state without requiring the extension data and the extension data is data for improving the quality of data generated from the basic data;
   wherein the first packet and the second packet in the stream are assigned with time stamps indicating relative times at which the first packet is inputted to a buffer and the second packet is inputted to a buffer, so that a buffer model of a first decoder does not fail and a buffer model of a second decoder does not fail, the first decoder decoding only the basic data, and the second decoder decoding the basic data and the extension data,
   the buffer model of the first decoder includes a first buffer and a second buffer in an order of processing the basic data,
   the buffer model of the second decoder includes a third buffer and a fourth buffer in an order of processing the basic data and the extension data,
   the second buffer has a size different from a size of the fourth buffer,
   the basic data is transferred from the first buffer to the second buffer at a first transfer Rate,
   the basic data and the extension data are transferred from the third buffer to the fourth buffer at a second transfer rate, and
   the first transfer rate is different than the second transfer rate.

2. The information recording medium according to claim 1,
   wherein values of the time stamps are each determined based on the following items related to the respective buffer models of the first decoder and the second decoder: a buffer size; a speed at which data is inputted to the buffer; a speed at which data is outputted from the buffer; a size of the first packet; and a size of the second packet.

3. The information recording medium according to claim 1, wherein each of the access units is data of a fixed time span.

4. A multiplexing device which multiplexes a first packet including basic data and a second packet including extension data related to the basic data, wherein:
   the first packet and the second packet constitute an access unit stored in a non-transitory information recording medium,
   the basic data is data that can be decoded in a completed state without requiring the extension data and the extension data is data for improving the quality of data generated from the basic data,
   said multiplexing device multiplexes the first packet and the second packet by assigning, to the first and second packets, time stamps indicating relative times at which the first packet is inputted to a buffer and the second packet is inputted to a buffer, so that a buffer model of a first decoder does not fail and a buffer model of a second decoder does not fail, said first decoder decoding only the basic data, and said second decoder decoding the basic data and the extension data,
   the buffer model of the first decoder includes a first buffer and a second buffer in an order of processing the basic data,
   the buffer model of the second decoder includes a third buffer and a fourth buffer in an order of processing the basic data and the extension data,
   the second buffer has a size different from a size of the fourth buffer,
   the basic data is transferred from the first buffer to the second buffer at a first transfer rate,
   the basic data and the extension data are transferred from the third buffer to the fourth buffer at a second transfer rate, and
   the first transfer rate is different than the second transfer rate.

5. A multiplexing method for multiplexing a first packet including the basic data and a second packet including extension data related to the basic data, wherein:
   the first packet and the second packet constitute an access unit stored in a non-transitory information recording medium,
   the basic data is data that can be decoded in a completed state without requiring the extension data and the extension data is data for improving the quality of data generated from the basic data,
   said method comprises assigning, to the first and second packets, time stamps indicating relative times at which the first packet is inputted to a buffer and the second packet is inputted to a buffer, so that a buffer model of a first decoder does not fail and a buffer model of a second decoder does not fail, the first decoder decoding only the basic data, and the second decoder decoding the basic data and the extension data,
   the buffer model of the first decoder includes a first buffer and a second buffer in an order of processing the basic data,
   the buffer model of the second decoder includes a third buffer and a fourth buffer in an order of processing the basic data and the extension data,
   the second buffer has a size different from a size of the fourth buffer,
   the basic data is transferred from the first buffer to the second buffer at a first transfer rate,
   the basic data and the extension data are transferred from the third buffer to the fourth buffer at a second transfer rate, and
   the first transfer rate is different than the second transfer rate.

6. A non-transitory computer-readable recording medium for use in a computer, the recording medium having a computer program recorded thereon for causing the computer to execute a multiplexing method for multiplexing the first packet including the basic data and the second packet including the extension data which constitute the access unit stored in the information recording medium according to claim 1, the method which includes
   assigning, to the first and second packets, time stamps indicating relative times at which the first packet is inputted to a buffer and a second packet is inputted to a buffer so that a buffer model of a first decoder does not fail and a buffer model of a second decoder does not fail, the first decoder decoding only the basic data, and the second decoder decoding the basic data and the extension data.

7. A method of recording information onto a non-transitory information recording medium, said method comprising recording, onto the non-transitory information recording medium, a stream having plural access units and which includes at least one of image and audio, wherein, in said recording, each of the access units has: a first packet which includes basic data; and a second packet which includes extension data related to the basic data;

the basic data is data that can be decoded in a completed state without requiring the extension data and the extension data is data for improving the quality of data generated from the basic data;

the first packet and the second packet in the stream are assigned with time stamps indicating relative times at which the first packet is inputted to a buffer and the second packet is inputted to a buffer, so that a buffer model of a first decoder does not fail and a buffer model of a second decoder does not fail, the first decoder decoding only the basic data, and the second decoder decoding the basic data and the extension data, the buffer model of the first decoder includes a first buffer and a second buffer in an order of processing the basic data, the buffer model of the second decoder includes a third buffer and a fourth buffer in an order of processing the basic data and the extension data, the second buffer has a size different from a size of the fourth buffer, the basic data is transferred from the first buffer to the second buffer at a first transfer rate, the basic data and the extension data are transferred from the third buffer to the fourth buffer at a second transfer rate, and the first transfer rate is different than the second transfer rate.

\* \* \* \* \*